United States Patent [19]

Saitoh et al.

[11] Patent Number: 4,863,832
[45] Date of Patent: Sep. 5, 1989

[54] OPTICAL RECORDING EMPLOYING DIACETYLENE COMPOUND AND DYE TO CHANGE COLOR AND FORM PITS

[75] Inventors: Kenji Saitoh, Tokyo; Toshihiko Miyazaki; Ken Eguchi, both of Atsugi; Yukuo Nishimura, Sagamihara; Kunihiro Sakai, Yamato; Haruki Kawada; Hiroshi Matsuda, both of Atsugi; Takashi Nakagiri, Tokyo; Yoshinori Tomida, Atsugi; Toshiaki Kimura, Sagamihara, all of Japan

[73] Assignee: Canon Kabushiki Kaisha, Tokyo, Japan

[21] Appl. No.: 941,366

[22] Filed: Dec. 15, 1986

[30] Foreign Application Priority Data

| Dec. 16, 1985 | [JP] | Japan | 60-282217 |
| Dec. 17, 1985 | [JP] | Japan | 60-283993 |
| Dec. 17, 1985 | [JP] | Japan | 60-283994 |
| Jan. 28, 1986 | [JP] | Japan | 61-14707 |
| Jan. 28, 1986 | [JP] | Japan | 61-14709 |
| Jan. 28, 1986 | [JP] | Japan | 61-14710 |
| Jan. 29, 1986 | [JP] | Japan | 61-15853 |
| Jan. 29, 1986 | [JP] | Japan | 61-15854 |
| Jan. 29, 1986 | [JP] | Japan | 61-15857 |
| Jan. 29, 1986 | [JP] | Japan | 61-15858 |
| Jan. 30, 1986 | [JP] | Japan | 61-16874 |
| Jan. 30, 1986 | [JP] | Japan | 61-16875 |
| Jan. 30, 1986 | [JP] | Japan | 61-16876 |
| Jan. 31, 1986 | [JP] | Japan | 61-17990 |
| Jan. 31, 1986 | [JP] | Japan | 61-17991 |
| Jan. 31, 1986 | [JP] | Japan | 61-17992 |

[51] Int. Cl.[4] .......... G03C 1/68; G03C 5/00
[52] U.S. Cl. .......... 430/281; 430/945; 430/944; 430/495; 430/270; 430/288; 369/284; 369/285; 346/76 R; 346/76 PH; 346/76 L; 346/135.1
[58] Field of Search .......... 430/945, 944, 495, 270, 430/281, 286; 369/284, 285; 346/76 R, 76 PH, 76 L, 135.1

[56] References Cited

U.S. PATENT DOCUMENTS

| 3,772,028 | 11/1973 | Fico et al. | 430/495 |
| 4,215,208 | 7/1980 | Yee et al. | 526/285 |
| 4,439,514 | 3/1984 | Garito | 430/495 |
| 4,536,450 | 8/1985 | Garito | 428/411.1 |
| 4,562,141 | 12/1985 | Tieke | 430/281 |

Primary Examiner—Paul R. Michl
Assistant Examiner—Cynthia Hamilton
Attorney, Agent, or Firm—Fitzpatrick, Cella, Harper & Scinto

[57] ABSTRACT

An optical recording method is provided which comprises a step of irradiating light corresponding to recording information on the optical recording medium having a recording layer containing at least one selected from the group consisting of azulenium salt compounds, pyrylium dyes, diene compounds, croconic methine dyes or polymethine compounds and a diacetylene derivative compound to thereby form a pit on said recording layer.

20 Claims, 1 Drawing Sheet

OPTICAL RECORDING EMPLOYING DIACETYLENE COMPOUND AND DYE TO CHANGE COLOR AND FORM PITS

BACKGROUND OF THE INVENTION

1. Field of the Invention

This invention relates to an optical recording method by use of an optical recording medium, particularly to an optical recording method advantageous in aspect of energy saving, which is capable of high speed pit recording of high density and high sensitivity even when a semiconductor laser of low output is used. Further, the present invention relates to an optical recording method which has rendered three-value recording possible with one sheet of an optical disc by using color change recording and pit recording in combination, namely by use of two kinds of dots.

2. Description of the Related Art

Recently, optical recording media such as optical disc, optical tape, optical card, etc. (hereinafter called comprehensively optical discs) are of primary interest among office automations. For example, since an optical disc is capable of recording and storing a large amount of documents and literature in one sheet, they have the advantage that documents in an office can be pigeonhold or managed with good efficiency.

The recording layer to be used in such optical disc technique can retain a high density of information in the form of a spiral or circular track of small dots (e.g. about 1 μm) which are optically detectable.

A typical example of the disc to be used in this optical disc technique is constituted of a recording layer comprising a material sensitive to laser provided on a substrate. For writing of information into this disc, the laser converged onto the laser sensitive layer (recording layer) is scanned to form dots only on the surface irradiated with the laser beam, thereby forming the dots in the form of a spiral or circular track corresponding to the recording information. Thus, the laser sensitive layer is capable of forming optically detectable dots by absorption of laser energy. For example, according to the heat mode recording system, the laser sensitive layer can absorb heat energy to form dots comprising small concavities (pits) by evaporation or melting on that site. Alternatively, according to another heat mode recording system, it is possible to form dots comprising optically detectable color changed portions at that site irradiated by absorption of the laser energy.

The information recorded on the optical disc is detected by reading the optical change of the portion where dots are formed from the portion where no dot is formed by scanning a laser along the track. For example, when a disc with a constitution having a recording layer provided on the reflective surface of a substrate, a laser is scanned along the track and the energy reflected by the disc is monitored by a photodetector. During this operation, in the case of pit recording, the output of the photodetector will be lowered at the position where no pit is formed, while the laser beam will be sufficiently reflected by the reflective surface at the position where pits are formed to make the output of the photodetector greater.

As the recording layer of such optical disc, investigations have been made concerning various kinds of materials employing primarily inorganic substances, including metal thin films such as aluminum vapor deposited film, etc., bismuth thin films, tellurium oxide thin films or chalcogenide type amorphous glass films, etc., but those employing organic materials are now attracting attention in aspect of lower cost as well as ease in manufacturing.

As the organic material to be used in optical recording medium, U.S. Pat. Nos. 4,501,801, 4,500,978 and 4,577,208 disclose organic coatings containing pyrylium dyes, croconic methine dyes, polymethine compounds, etc., of specific structures having good thermal stability. Since the organic coatings containing these compounds can generate heat by absorption of radiation in the radiated wavelength region of semiconductor laser, it has been known that the so called heat mode recording to form pits by laser energy can be practiced.

However, in the pit recording system of the prior art, although there is the advantage that recording is clear, that is, contrast is good, as compared with the recording system which forms dots by color change, there have been involved the drawbacks that more energy is required for recording. Further recording speed is slower. Further, since pits are formed physically on the surface of a recording medium, the recording medium surface at the initial stage is required to be sufficiently smooth and at the same time sufficient care is needed so that the recording medium surface is not damaged even after recording. It has been also difficult to practice recording at high density and high sensitivity.

On the other hand, since the heat mode system is a two-value recording whether a dot is formed or not, it is limited in practicing recording of higher density.

SUMMARY OF THE INVENTION

The present invention has been accomplished for solving the problems of the prior art, and the present inventors have found that by forming a recording layer of an optical recording medium by combining a compound selected from azulenium salt compounds, pyrylium dyes, diene compounds, croconic methine dyes or polymethine compounds with a diacetylene derivative compound, even when a semiconductor laser of low output may be used, ① pit forming speed under photoirradiation can be markedly accelerated, and ② color change recording and pit recording are possible with one sheet of optical disc, and ③ the color change recording and pit recording can be done at substantially the same speed.

An object of the present invention is to provide an optical recording method which enables three-value recording by two kinds of dots with one sheep of optical disc.

Another object of the present invention is to provide an optical recording method which is capable of optical writing with a small scale lightweight semiconductor laser of low output, and is also capable of high speed recording.

Still another object of the present invention is to provide an optical recording method which is capable of recording at high density and high sensitivity.

Still another object of the present invention is to provide an optical recording method which can obtain recorded images of high quality excellent in stability.

According to an aspect of the present invention, there is provided an optical recording method comprising a step of irradiating light corresponding to recording information on an optical recording medium having a recording layer containing at least one selected from the group consisting of azulenium salt compounds, pyrylium dyes, diene compounds, croconic methine dyes or polymethine compounds (hereinafter called the group B) and a diacetylene derivative compound to thereby form a pit on said recording layer.

According to another aspect of the present invention, there is provided an optical recording method comprising a step of irradiating light controlled in a dose corresponding to recording information onto an optical recording medium having a recording layer containing at least one selected from the group consisting of azulenium salt compounds, pyrylium dyes, diene compounds, croconic methine dyes and polymethine compounds (hereinafter called the group B) and a diacetylene derivative compound to thereby change the color at the exposed portion with a dose of $Q_1$, to form a pit at the exposed portion with a dose of $Q_2$ (with proviso that $Q_1 < Q_2$).

DETAILED DESCRIPTION OF PREFERRED EMBODIMENTS

Figure 1A:
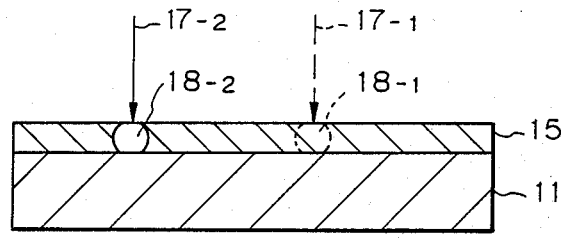
FIGS. 1(A), (B) are schematic sectional views showing one embodiment of the constitution of the optical recording medium (one layer mixed system) to be used in the method of the present invention and an example of the optical recording process, and FIGS. 2(A), (B) are schematic sectional views of one embodiment of the constitution of the optical recording medium (two layer separated system) to be used in the method of the present invention and an example of the optical recording process.

The diacetylene derivative compound (hereinafter abbreviated as DA compound) contained in the optical recording medium to be used in the method of the present invention are compounds represented by the formula shown below and polymers of these:

$$R^7-C\equiv C-C\equiv C-R^8$$

(wherein $R^7$ and $R^8$ represent polar groups; saturated aliphatic hydrocarbon groups such as alkyl, cyclohexyl, etc., which may be substituted with a polar group; olefinic hydrocarbon groups such as vinyl, propenyl, etc., which may be substituted with a polar group; or aromatic hydrocarbon groups such as phenyl, naphthyl, alkylphenyl, etc., which may be substituted with a polar group, the polar groups as herein mentioned including, for example, a carboxyl group or its metal or amine salt, a sulfoamide group, an amide group, an amino group, an imino group, a hydroxy group, an oxyamino group, a diazonium group, a guanidine group, a hydrazine group, a phosphoric acid, group, a silicic acid group, an aluminic acid group, a nitrile group, a thioalcohol group, a nitro group and a halogen atom).

Further, among the DA compounds in the case of forming a recording layer of a monomolecular film or a built-up monomolecular films as described below, there may be included the compounds capable of 1,4-addition polymerization reaction between the $C\equiv C-C\equiv C-C$ functional groups in the adjacent molecules, typically the compounds represented by the formula shown below.

$$H(CH_2)_m-C\equiv C-C\equiv C-(CH_2)_n-X$$

(wherein X is a hydrophilic group for forming a hydrophilic site, and m, n are integers).

Examples of the hydrophilic group X may include a carboxyl group, an amino group, a hydroxy group, a nitrile group, a thioalcohol group an imino group. a sulfonic acid group, a sulfinyl group or metal or amine salt thereof. As the alkyl group represented by $H(CH_2)_m-$ for forming the hydrophobic site, a long chain alkyl group having 1 to 30 carbon atoms is preferred. Also, n+m should preferably be an integer of 1 to 30.

On the other hand, the azulenium salt compounds which have the frame represented by the following formula (1) (hereinafter called briefly AZ compounds) are compounds having absorption spectral peak in the wavelength region of 750 nm or longer and generate heat by infrared rays of this wavelength.

Formula:

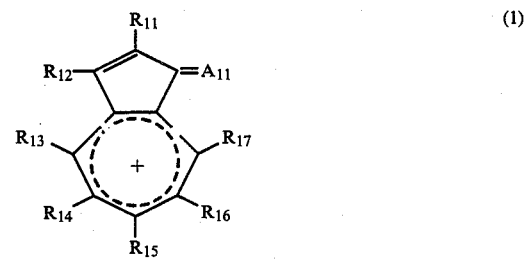

(1)

wherein $R_{11}-R_{17}$ each represent atom, halogen atom or monovalent organic radical and $A_{11}$ represents divalent organic residue bonded through a double bond.

The AZ compounds including the above formula (1) can be classified broadly into the three kinds as shown below.

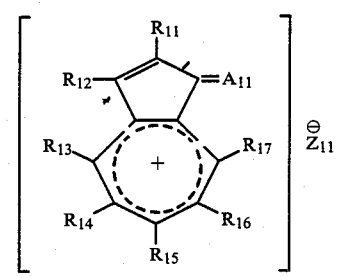

1-1

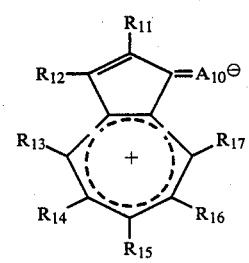

1-2

-continued

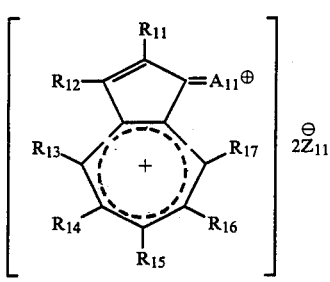

1-3

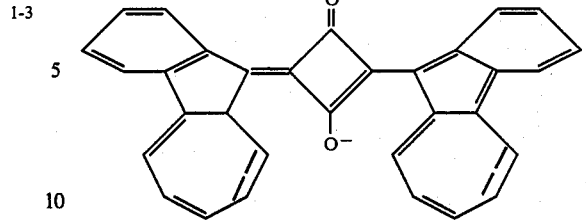

1-1-4

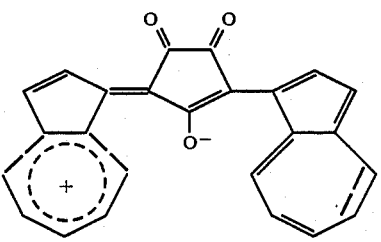

1-1-5

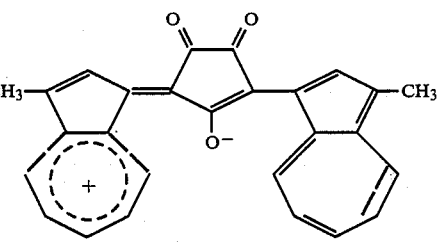

1-1-6

In the compound shown by the formulae 1-1 to 1-3, each of $R_{11}$ to $R_{17}$ represents a hydrogen atom, a halogen atom or a monovalent organic radical.

Examples of the monovalent organic radical may include alkyl, alkoxy, substituted or unsubstituted aryl, acyl, substituted or unsubstituted amino, nitro, hydroxy, carboxy, cyano or substituted or unsubstituted arylazo radicals.

$A_{11}$ represents a divalent organic radical bonded through a double bond as shown in the following specific examples.

$Z_{10}^{\ominus}$ represents an anionic radical such as perchlorate, fluoroborate, p-toluenesulfonate, periodide, chloride, bromide or iodide.

Specific examples of the AZ compounds to be used in the present invention are set forth below.

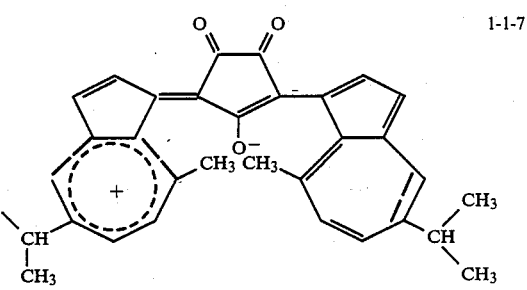

1-1-7

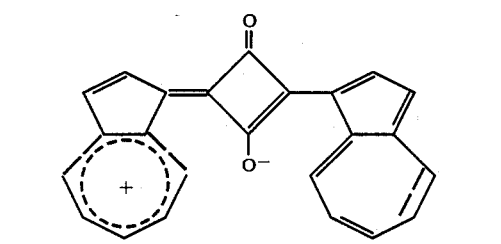

1-1-1

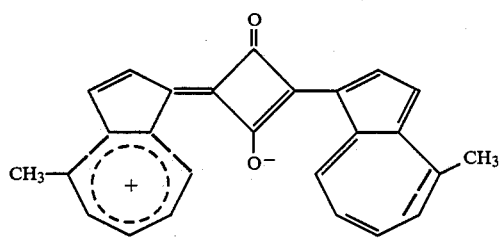

1-1-2

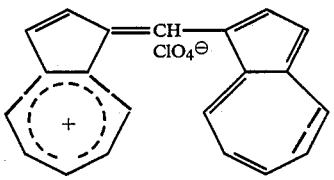

1-1-8

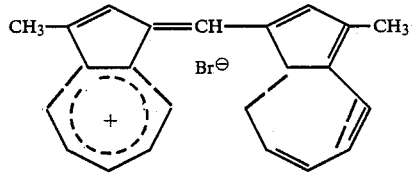

1-1-9

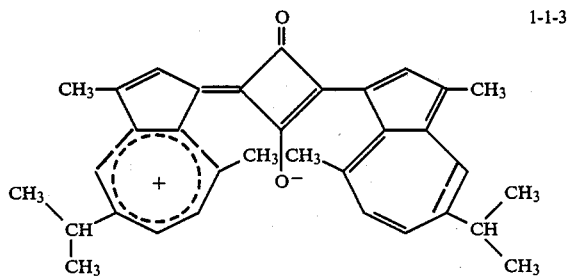

1-1-3

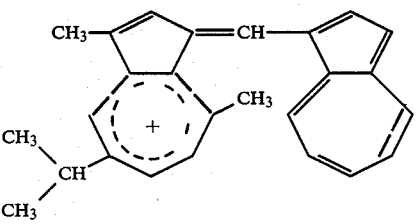

1-1-10

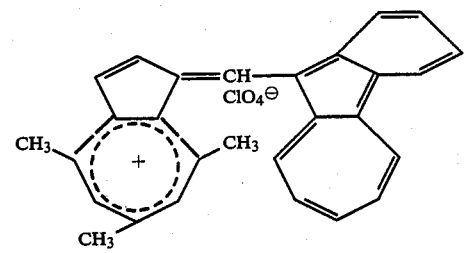

1-1-11

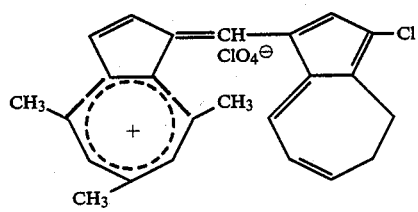

1-1-12

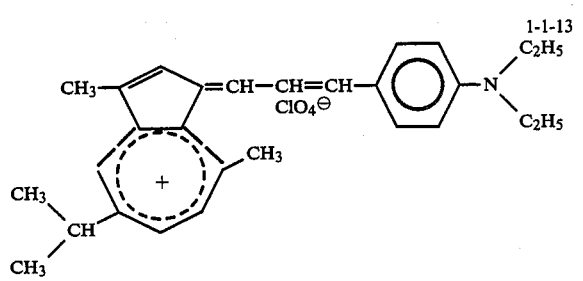

1-1-13

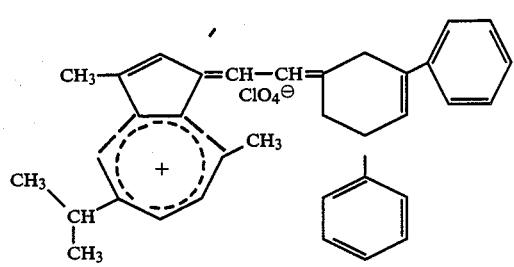

1-1-14

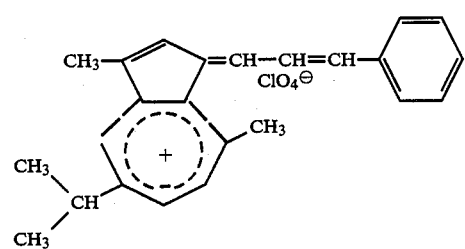

1-1-15

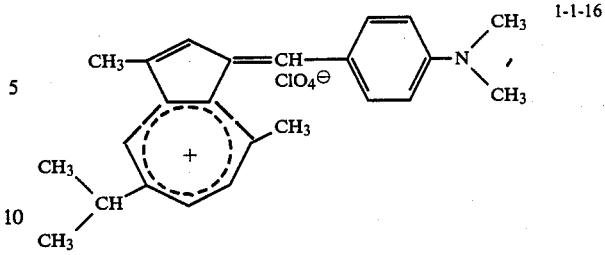

1-1-16

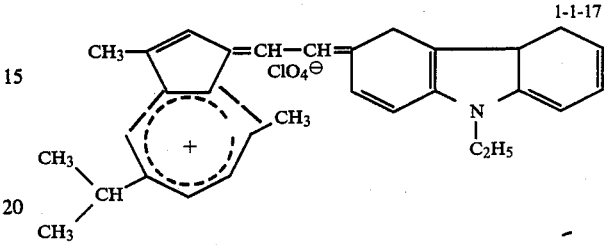

1-1-17

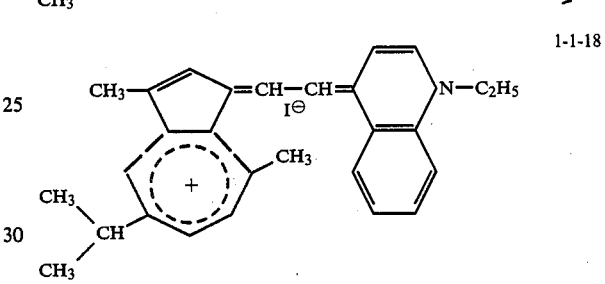

1-1-18

The pyrylium dyes, thiopyrylium dyes and selenapyrylium dyes included in the optical recording meida which is employed in the method of the invention (hereinafter called generally pyrylium dyes) are compounds represented by the following basic structure, having absorption peak at 780–900 nm, which can generate heat by infrared rays of this wavelength:

Basic structure:

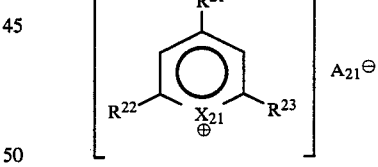

(wherein $X_{21}$ represents an oxygen atom, a sulfur atom or selenium atom, $R^{21}$, $R^{22}$ and $R^{23}$ represent various organic radicals and $A_{21}$ represents an anion). Typical examples of the pyrylium dyes are represented by the following formulae 2-1 to 2-3:

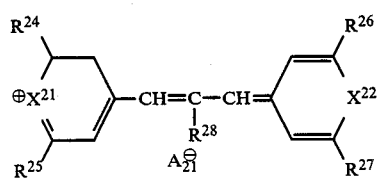

Formula 2-1

-continued

Formula 2-2

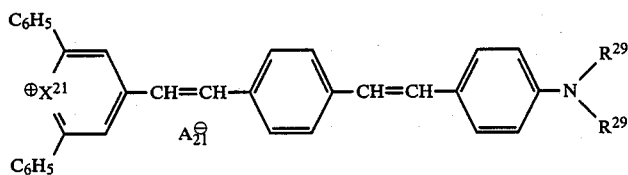

Formula 2-3

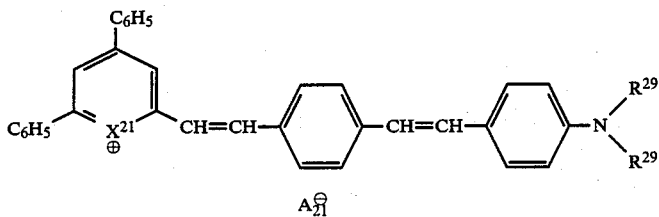

(wherein $R^{24}$, $R^{25}$, $R^{26}$ and $R^{27}$ represent substituted or unsubstituted aryl radicals such as phenyl, tolyl, xylyl, chlorophenyl, methoxyphenyl and the like, or substituted or unsubstituted heterocyclic radicals such as 2-pyridyl, 3-pyridyl, 2-furyl, 2-thienyl, 2-thiazolyl, 3-carbazolyl, 2-quinolyl, 3-quinolyl, 2-imidazolyl, 2-lepidyl, 3-methoxy-2-pyridyl, 6-methyl-2-pyridyl, 4,5-dimethyl-2-thiazolyl, 4,5-diphenyl-2-thiazolyl, 4-phenyl-2-thiazolyl, 9-ethyl-3-carbazolyl, and the like, at least one of $R^{24}$, $R^{25}$, $R^{26}$ and $R^{27}$ representing substituted or unsubstituted heterocyclic radical; $R^{28}$ represents a hydrogen atom, an alkyl such as methyl, ethyl, propyl, butyl, etc., or substituted or unsubstituted aryl radical such as phenyl, tolyl, xylyl, chlorophenyl, methoxyphenyl, etc.; $R^{29}$ represents methyl or ethyl; $X^{21}$ and $X^{22}$ represent oxygen atom, sulfur atom or selenium atom; $A_{21}$ represents an anion such as chloride, bromide, iodide, perchlorate, benzenesulfonate, p-toluenesulfonate, methylsulfate, ethylsulfate, propylsulfate, etc.).

Specific examples of these pyrylium dyes are set forth below. For the purpose of convenience, anions were represented all by perchlorates.

2-1-1

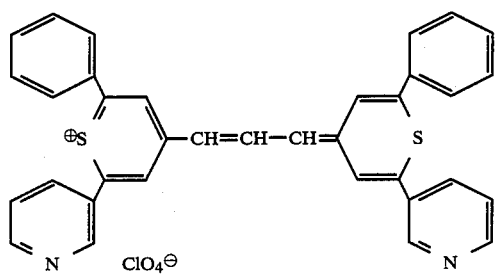

2-1-2

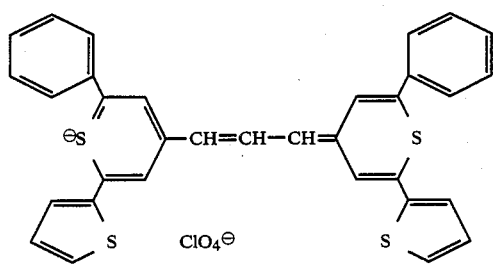

2-1-3

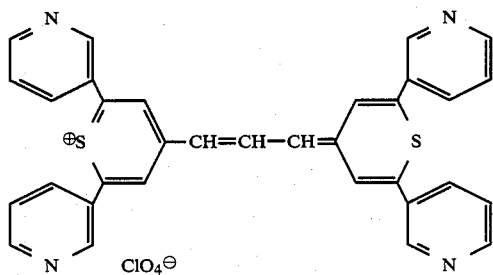

-continued
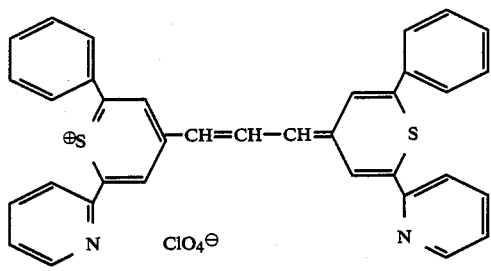
2-1-4
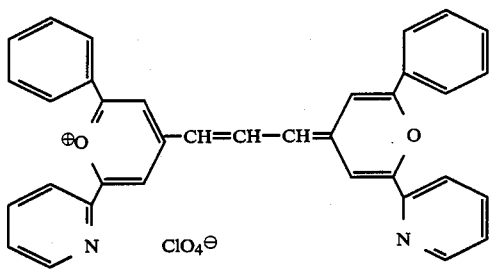
2-1-5
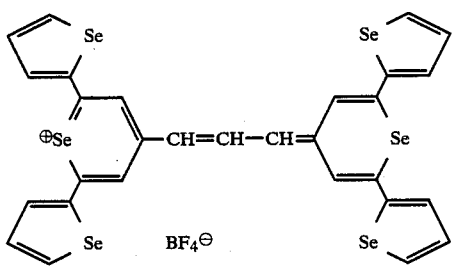
2-1-6
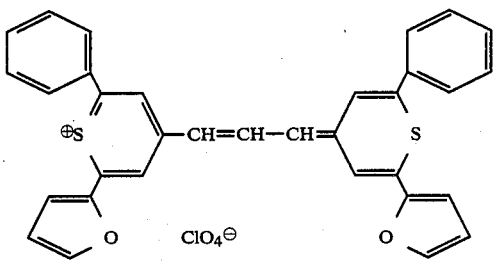
2-1-7
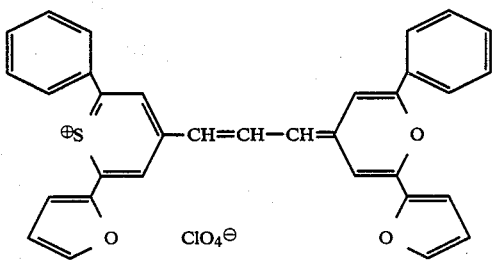
2-1-8

-continued
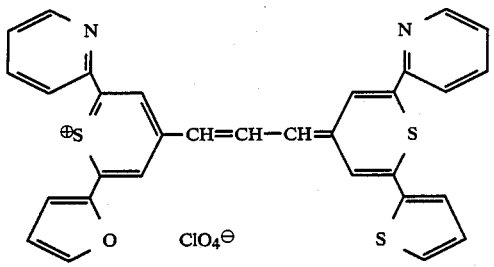
2-1-9
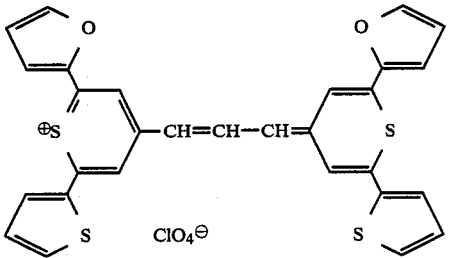
2-1-10
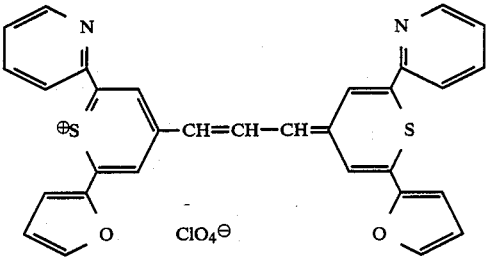
2-1-11
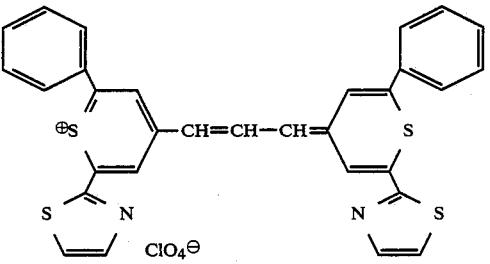
2-1-12
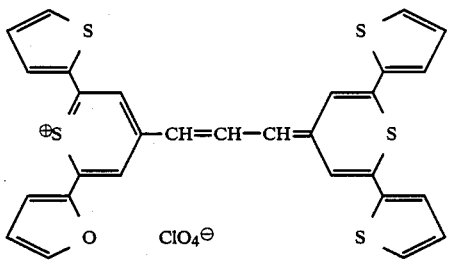
2-1-13
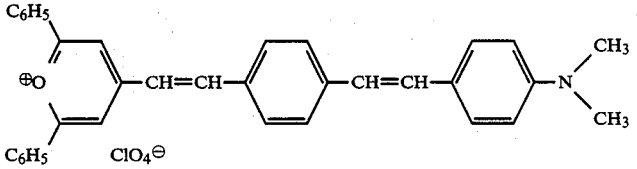
2-1-14

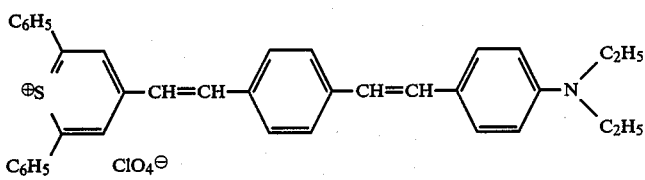

2-1-15

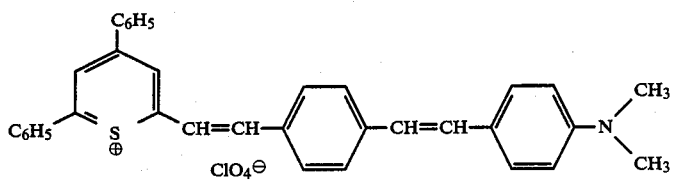

2-1-16

The compound to be used in the present invention (hereinafter called briefly diene compound salts) are compounds having absorption peak in the wavelength region of 750 nm or more which can generate heat by infrared ray of this wavelength, as represented by the following formula 3-1 or 3-2:

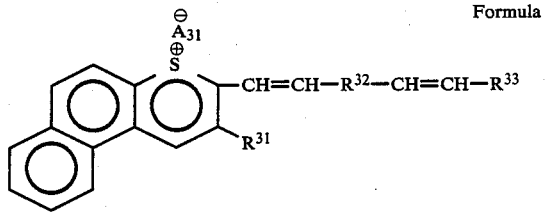

Formula 3-1

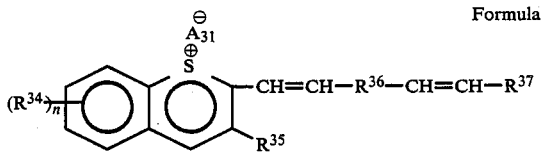

Formula 3-2

To describe in more detail about the diene compound salts, in the formula 3-1 and 3-2, $R^{31}$ represents an alkyl radical such as methyl, ethyl, propyl, isopropyl, butyl, hexyl, etc., or a phenyl radical or a styryl radical which may have substituent. Here, examples of the substituent may include alkoxy radicals such as methoxy, ethoxy, butoxy, etc.; halogen atoms such as chlorine, bromine, iodine, etc.; alkyl radicals such as methyl, ethyl, propyl, isopropyl, etc.; and nitro radical. $R^{32}$ and $R^{36}$ each represent an arylene radical which may have substituent and can form a conjugated double bond system with the two —CH=CH— groups adjacent thereto such as p-phenylene, 1,4-naphthylene, etc. Here, examples of the substituent may include halogen aotms such as chlorine, bromine, iodine, etc.; alkyl radicals such as methyl, ethyl, etc.; and alkoxy radicals such as methoxy, ethoxy, etc. $R^{33}$ and $R^{37}$ each represent a phenyl radical or a naphthyl radical which may have substituent. Examples of the substituent may include substituted amino radicals such as dimethylamino, diethylamino, dipropylamino, dibutylamino, diphenylamino, phenylamino, phenylbenzylamino, phenylethylamino, etc.; cyclic amino radical such as morpholino, piperidinyl, pyrrolidino, etc.; and alkoxy radical such as methoxy, ethoxy, butoxy, etc. $R^{34}$ represents an alkoxy radical such as methoxy, ethoxy, butoxy, etc. $R^{35}$ represents an alkyl radical such as methyl, ethyl, propyl, isopropyl, butyl, hexyl, etc.

$A_{31}^\ominus$ represents an anion residue, including for example:

$BF_4^\ominus$, $ClO_4^\ominus$, $CF_3COO^\ominus$, $PF_6^\ominus$, $Cl^\ominus$, $Br^\ominus$, $I^\ominus$, $ClSO_3^\ominus$, $CH_3SO_3^\ominus$, $C_2H_5SO_3^\ominus$, $C_3H_7SO_3^\ominus$, $C_4H_9SO_3^\ominus$, $C_5H_{11}SO_3^\ominus$, $C_6H_{13}SO_3^\ominus$, $CH_3CHClSO_3^\ominus$, $ClCH_2CH_2SO_3^\ominus$,

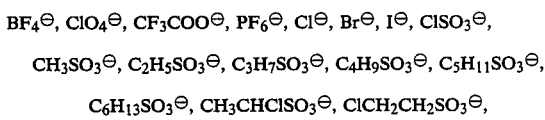

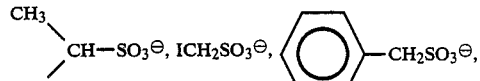

$^\ominus O_3SCH_2SO_3^\ominus$, $^\ominus O_3SCH_2CH_2SO_3^\ominus$, $^\ominus O_3SCH_2CH_3$—$CH_2SO_3^\ominus$, $^\ominus O_3SCH_2CH_2CH_2SO_3^\ominus$, $^\ominus O_3SCH_2CH_2CH_2CH_2CH_2CH_2SO_3^\ominus$, $^\ominus O_3SCH_2CH_2$—O—$CH_2CH_2SO_3^\ominus$,

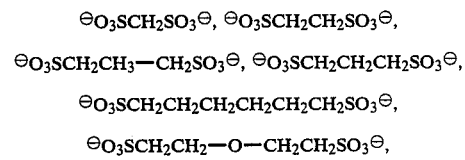

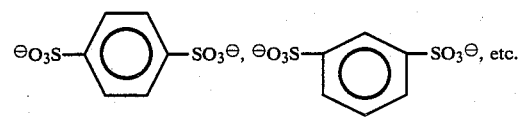

Specific examples of the diene compounds are shown below.

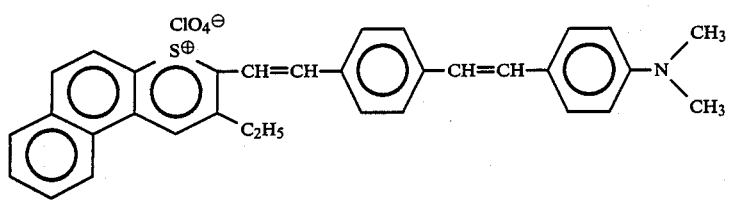 3-1-1
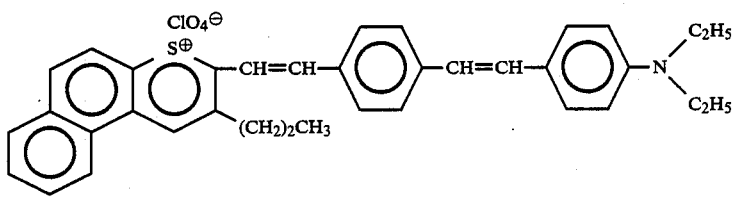 3-1-2
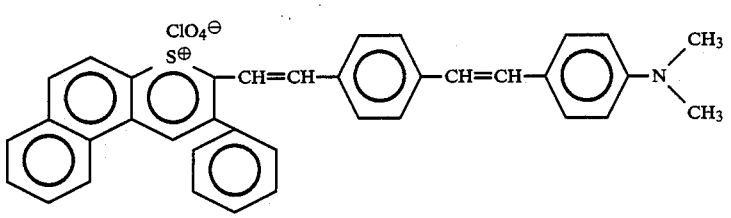 3-1-3
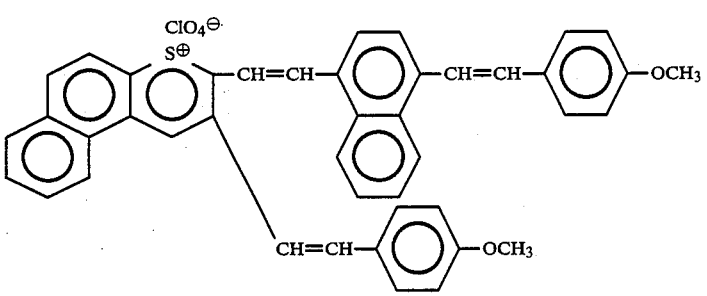 3-1-4
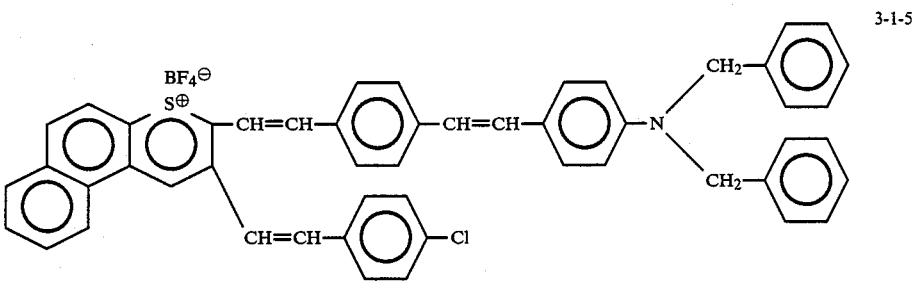 3-1-5
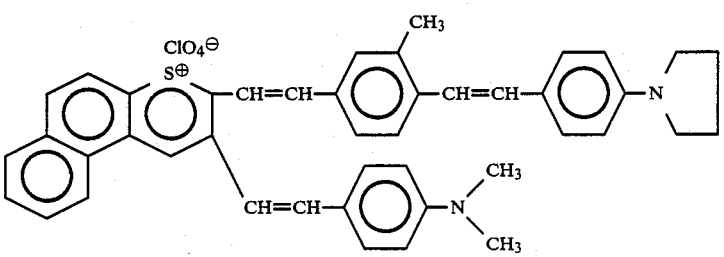 3-1-6

-continued
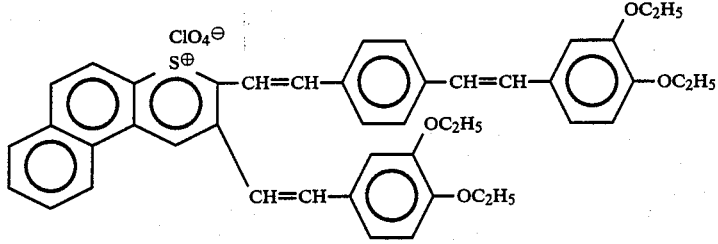 3-1-7
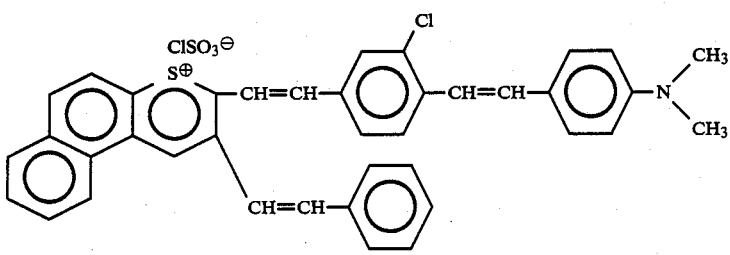 3-1-8
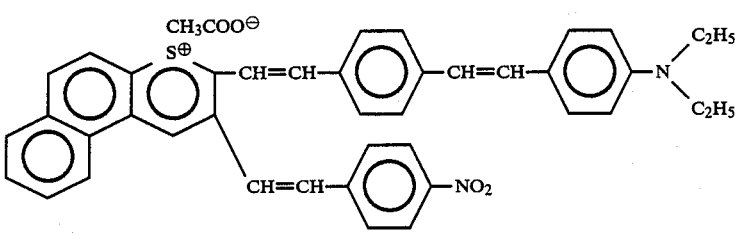 3-1-9
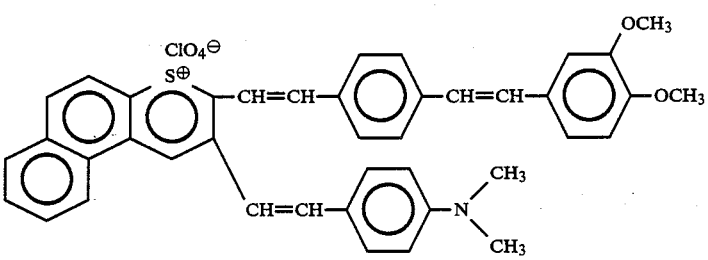 3-1-10
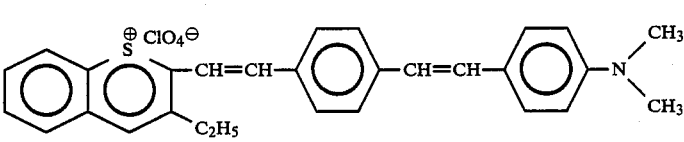 3-1-11
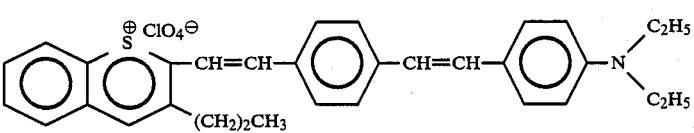 3-1-12
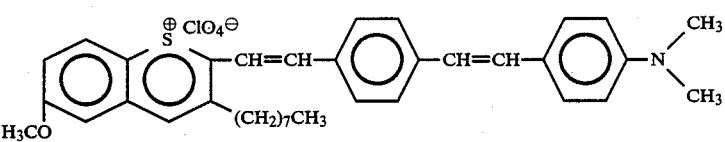 3-1-13
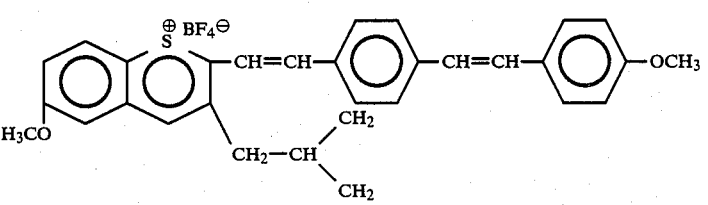 3-1-14

-continued

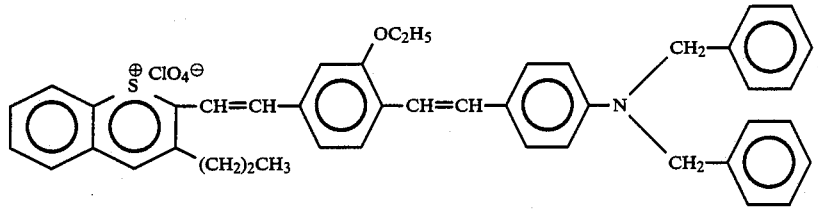
3-1-15

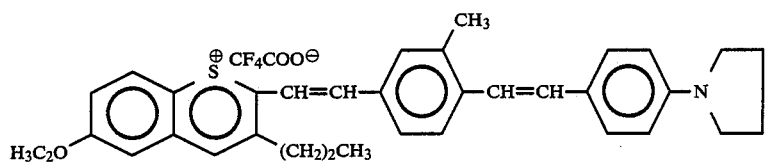
3-1-16

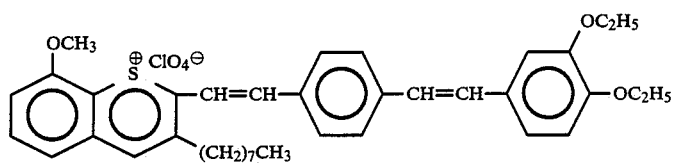
3-1-17

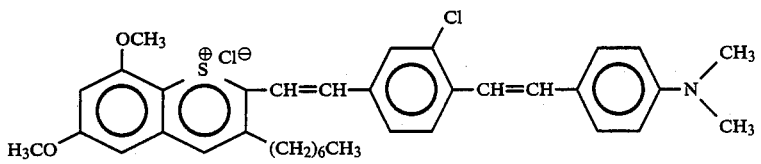
3-1-18

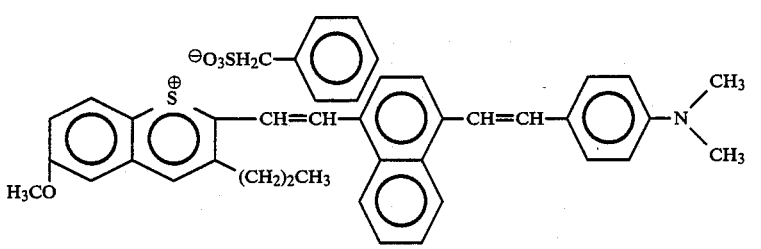
3-1-19

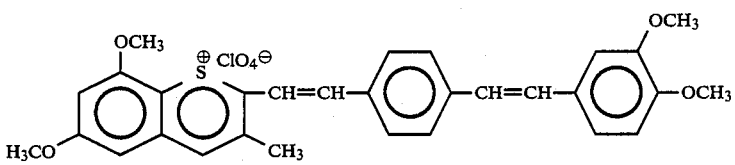
3-1-20

The croconic methine dyes to be used in the present invention are compounds having the following basic structure (including intramolecular salts), having an absorption peak at 800 to 900 nm, which can generate heat by infrared ray of this wavelength:

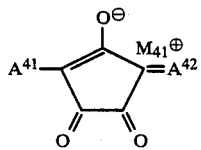

$M_{41}^{\oplus}$: metal cation,
$A^{41}$, $A^{42}$: substituent containing aromatic ring and/or heterocyclic ring.

Typical examples of the croconic methine dyes may include the dyes represented by the following formulae 4-1 to 4-4.

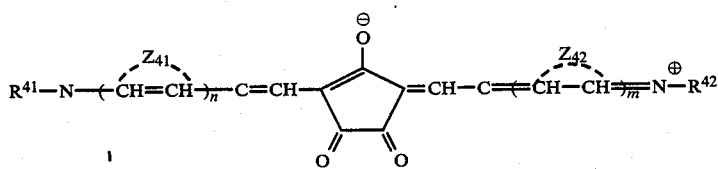

Formula 4-1

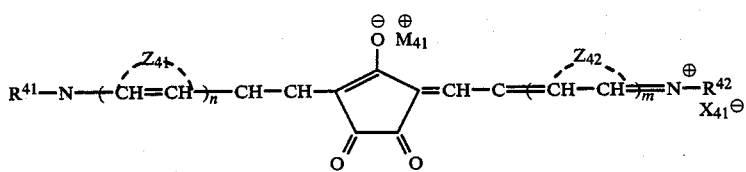

Formula 4-2

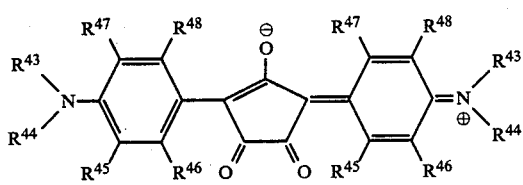

Formula 4-3

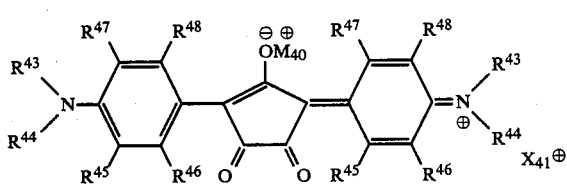

Formula 4-4

In the above formulae, 4-1, 4-2, $R^{41}$ and $R^{42}$ each represent an alkyl radical (e.g. methyl, ethyl, n-propyl), isopropyl, n-butyl, sec-butyl, isobutyl, t-butyl, n-amyl, t-amyl, n-hexyl, n-octyl, t-octyl, etc.), a substituted alkyl radical (e.g. 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfatopropyl, 4-sulfatobutyl, N-(methylsulfonyl)-carbamylmethyl, 3-(acetylsulfamyl)-propyl, 4-(acetylsulfamyl)butyl, etc.), a cyclic alkyl radical (e.g. cyclohexyl, etc.), an allyl group ($CH_2=CH-CH_2-$), and aralkyl radical (e.g. benzyl, phenethyl, α-naphthylmethyl, β-naphthylmethyl, etc.), a substituted aralkyl radical (e.g. carboxybenzyl, sulfobenzyl, hydroxybenzyl, etc.), an aryl radical (e.g. phenyl, etc.) or a substituted aryl radical (e.g. carboxyphenyl, sulfophenyl, hydroxyphenyl, etc.). Particularly, in the present invention, of these organic radicals, hydrophobic ones are preferred.

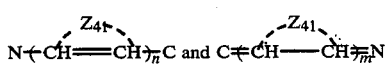

each represent a group of non-metallic atoms necessary for completing a substituted or unsubstituted heterocyclic ring such as a nucleus of thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc.), a nucleus of benzothiazole series (e.g. benzothiazole, 5-chlorobenzothiazole, 5-methylbenzothiazole, 6-methylbenzothiazole, 5,6-dimethylbenzothiazole, 5-bromobenzothiaZole, 5-phenylbenzothiazole, 5-methoxybenzothiazole, 6-methoxybenzothiazole, 5,6-dimethoxybenzothiazole, 5,6-dioxymethylenebenzothiazole, 5-hydroxybenzothiazole, 6-hydroxybenzothiazole, 4,5,6,7-tetrahydrobenzothiazole, etc.), a nucleus of naphthothiazole series (e.g. naphtho[2,1-d]thiazole, naphtho[1,2-d]thiazole, 5-methoxynaphtha[1,2-d]thiazole, 5-ethoxynaphtho[1,2-d]thiazole, 8-methoxynaphtho[2,1-d]thiazole, 7-methoxynaphtho[2,1-d]thiazole, etc.), a nucleus of thionaphthene[7,6-d]thiazole series (e.g. 7-methoxythionaphthene[7,6-d]thiazole), a nucleus of oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole), a nucleus of benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 5-methoxybenzoxazole, 6-methoxybenzoxazole, 5-hydroxybenzoxazole, 6-hydroxybenzoxazole, etc.), a nucleus of naphthoxazole series (e.g. naphtho[2,1-d]oxazole, naphtho[1,2-d]oxazole, etc.), a nucleus of selenazole series (e.g. 4-methylselenazole, 4-phenylselenazole, etc.), a nucleus of benzoselenazole series (e.g. benzoselenazole, 5-chlorobenzoselenazole, 5-methylbenzoselenazole, 5,6-dimethylbenzoselenazole, 5-methoxybenzoselenazole, 5-methyl-6-methoxybenzoselenazole, 5,6-dioxymethylenebenzoselenazole, 5-hydroxybenzoselenazole, 4,5,6,7-tetrahydrobenzoselenazole, etc.), a nucleus of naphthoselenazole series (e.g. naphtho[2,1-d]selenazole, naphtho[1,2-d]selenazole), a nucleus of thiazoline series (e.g. thiazoline, 4-methylthiazoline, 4-hydroxymethyl-4-methylthiazoline, 4,4-bis-hydroxymethylthiazoline, etc.), a nucleus of oxazoline series (e.g. oxazoline), a nucleus of selenazoline series (e.g. selenazoline), a nucleus of 2-quinoline series (e.g. quinoline, 6-methylquinoline, 6-chloroquinoline, 6-methoxyquinoline, 6-ethoxyquinoline, 6-hydroxyquinoline), a nucleus of 4-quinoline series (e.g. quinoline, 6-methoxyquinoline, 7-methylquinoline, 8-methylquinoline), a nucleus of 1-isoquinoline series (e.g. isoquinoline, 3,4-dihydroisoquinoline), a nucleus of 3-isoquinoline series (e.g. isoquinoline), a nucleus of 3,3-dialkylindolenine series (e.g. 3,3-dimethylindolenine, 3,3-dimethyl-5-chloroindolenine, 3,3,5-trimethylindolenine, 3,3,7-triemthylindolenine), a nucleus of pyridine series (e.g. pyridine, 5-methylpyridine), a nucleus of benzimidazole series (e.g. 1-ethyl-5,6-dichlorobenzimidazole, 1-hydroxyethyl-5,6-dichlorobenzimidazole, 1-ethyl-5-chlorobenzimidazole, 1-ethyl-5,6-dibromobenzimidazole, 1-ethyl-5-phenylbenzimidazole, 1-ethyl-5-fluorobenzimidazole, 1-ethyl-5-cyanobenzimidazole, 1-($\beta$-acetoxyethyl)-5-cyanobenzimidazole, 1-ethyl-5-chloro-6-cyanobenzimidazole, 1-ethyl-5-fluoro-6-cyanobenzimidazole, 1-ethyl-5-acetylbenzimidazole, 1-ethyl-5-carboxybenzimidazole, 1-ethyl-5-ethoxycarbonylbenzimidazole, 1-ethyl-5-sulfamylbenzimidazole, 1-ethyl-5-N-ethylsulfamylbenzimidazole, 1-ethyl-5,6-difluorobenzimidazole, 1-ethyl-5,6-dicyanobenzimidazole, 1-ethyl-5-ethylsulfonylbenzimidazole, 1-ethyl-5-methylsulfonylbenzimidazole, 1-ethyl-5-trifluoromethylbenzimidazole, 1-ethyl-5-trifluoromethylsulfonylbenzimidazole, 1-ethyl-5-trifluoromethylsulfinylbenzimidazole, etc.).

$X_{41}^{\ominus}$ represents an anion such as ions of chloride, bromide, iodide, perchlorate, benzenesulfonate, p-toluenesulfonate, methylsulfate, ethylsulfate, propylsulfate, etc., with proviso that no $X_{41}^{\ominus}$ exists when $R^{41}$ and/or $R^{42}$ itself contains an anion group such as —$SO_3^{\ominus}$, —$OSO_3^{\ominus}$, —$COO^{\ominus}$, $SO_2^{\ominus}NH$—, —$SO_2$—$N^{\ominus}$—$CO$— and —$SO_2$—$N^{\ominus}$—$SO_2$—$M_{41}^{\oplus}$ represents a cation such as hydrogen, sodium, ammonium, potassium, pyridium cation, etc. n and m are 0 or 1.

In the formulae 4-3 and 4-4, $R^{43}$ and $R^{44}$ each represents an alkyl radical such as methyl, ethyl, propyl, butyl, etc. $R^{43}$ and $R^{44}$ can also form a ring such as morpholino, piperidinyl, pyrrolidino, etc., together with the nitrogen atom. $R^{45}$, $R^{46}$, $R^{47}$ and $R^{48}$ each represent a hydrogen atom, an alkyl radical (methyl, ethyl, propyl, butyl, etc.), an alkoxy radical (methoxy, ethoxy, propoxy, butoxy, etc.) or a hydroxy radial. Also, $R^{45}$ and $R^{46}$ can be bonded to form a benzene ring, and further $R^{45}$ and $R^{46}$, and $R^{47}$ and $R^{48}$ may be bonded to each other, respectively, to form a benzene ring.

In the following, typical examples of the croconic methine dyes to be used in the present invention are enumerated. For the purpose of convenience, they are represented by betaine structures of the formula 4-1 or 4-3. However, in preparation of these dyes, mixtures of dyes in the betaine form or salt form are obtained, and therefore they are used as mixtures. Typical examples of the formulae 4-1, and 4-2;

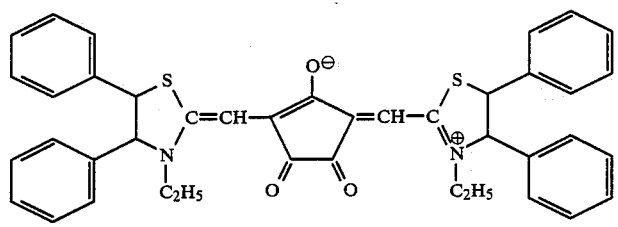

4-1-1

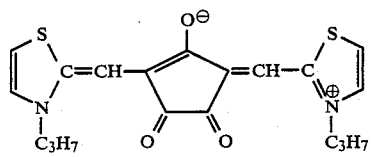

4-1-2

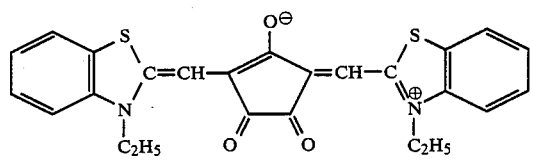

4-1-3

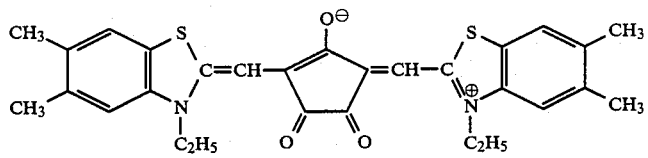

4-1-4

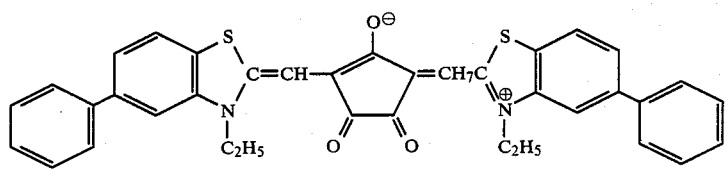

4-1-5

-continued
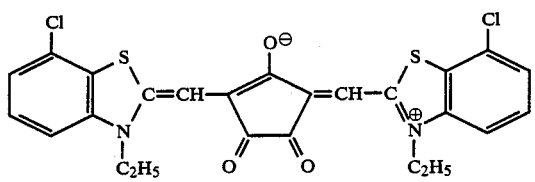
4-1-6
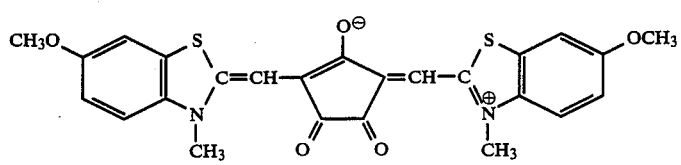
4-1-7
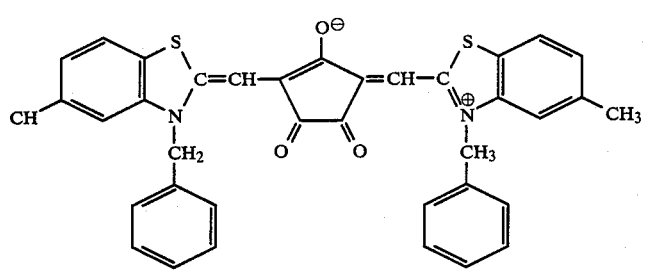
4-1-8
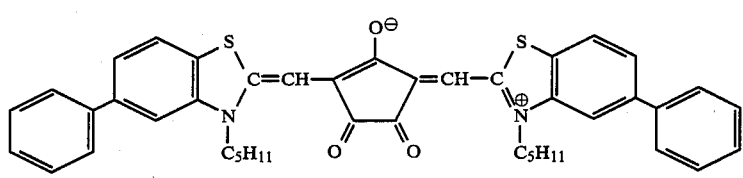
4-1-9
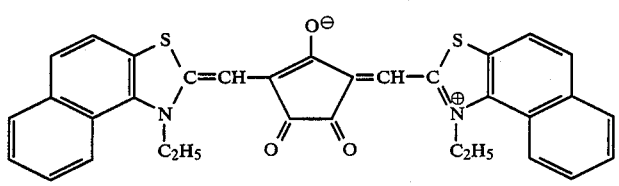
4-1-10
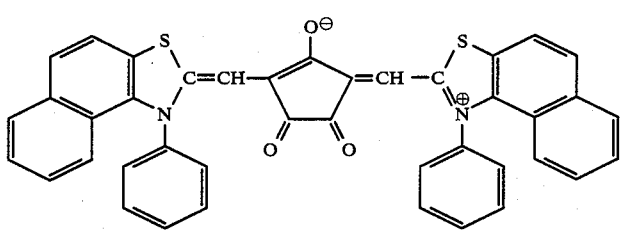
4-1-11
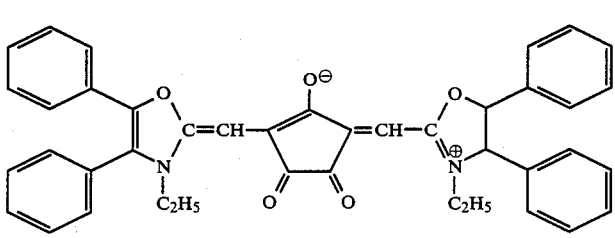
4-1-12

-continued
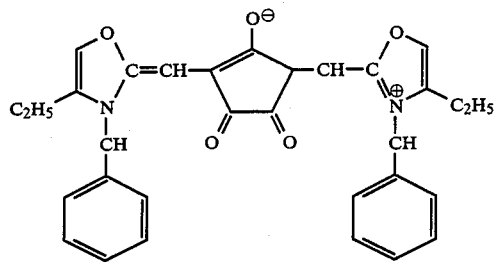
4-1-13
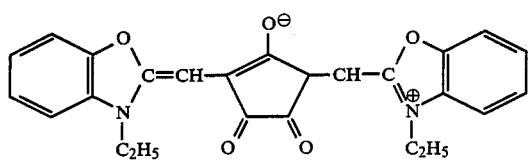
4-1-14
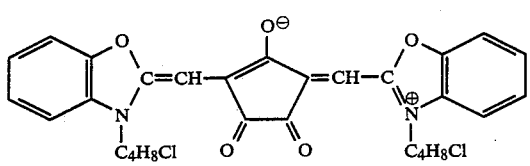
4-1-15
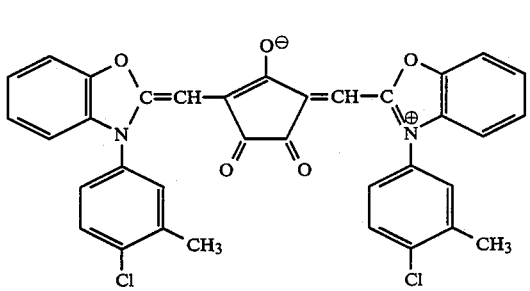
4-1-16
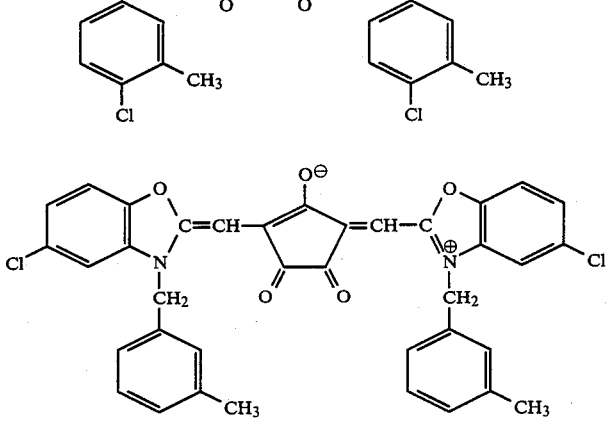
4-1-17
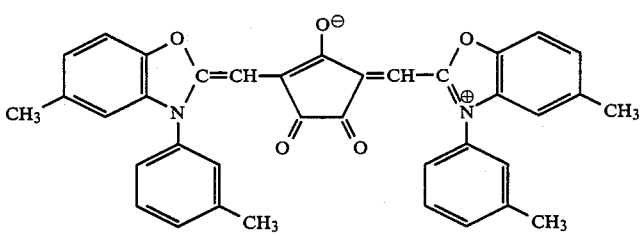
4-1-18
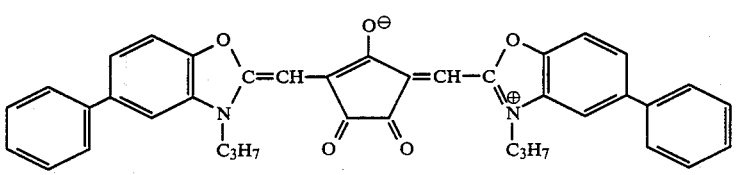
4-1-19

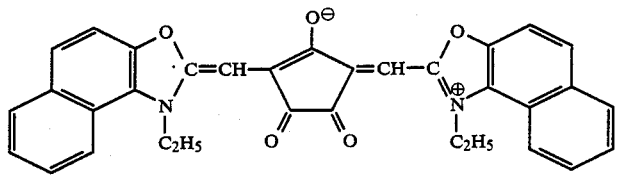
4-1-20
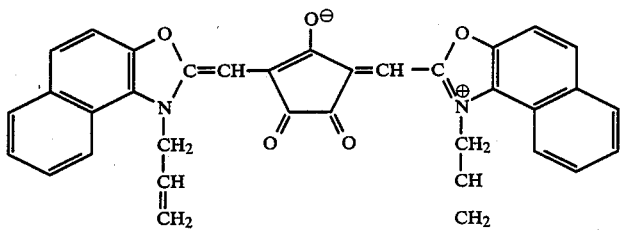
4-1-21
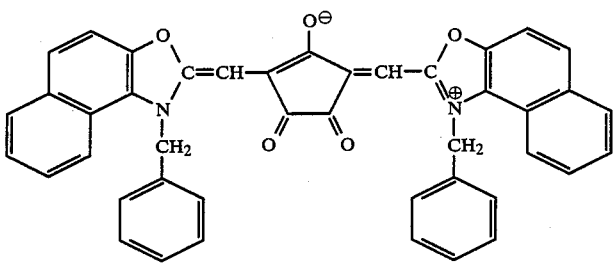
4-1-22
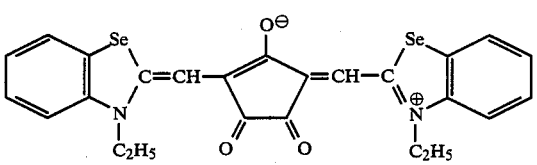
4-1-23
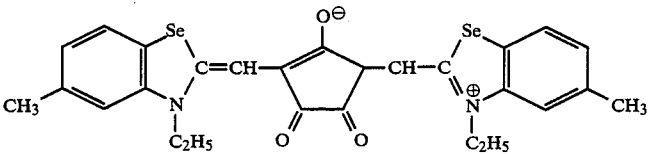
4-1-24
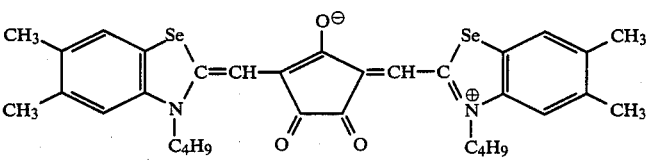
4-1-25
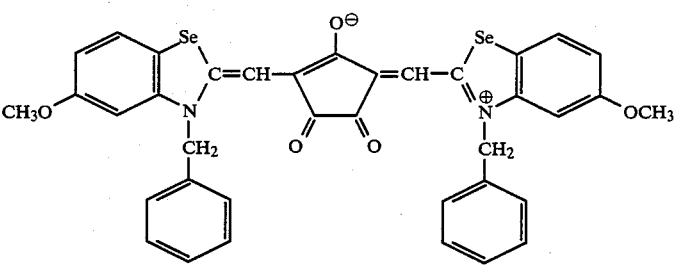
4-1-26
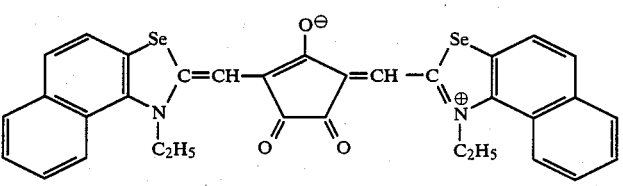
4-1-27

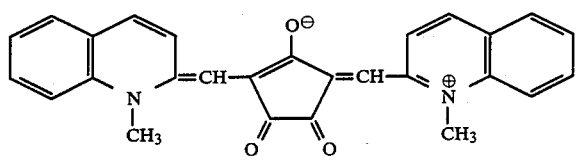
4-1-28
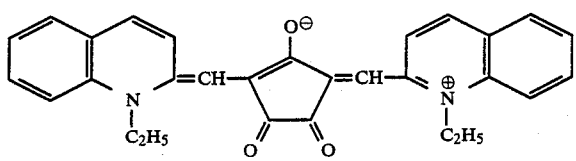
4-1-29
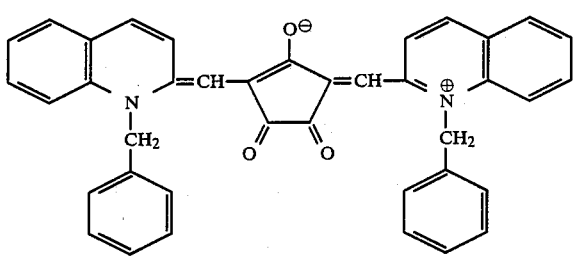
4-1-30
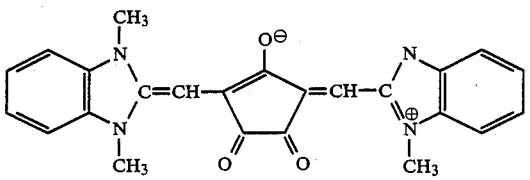
4-1-31
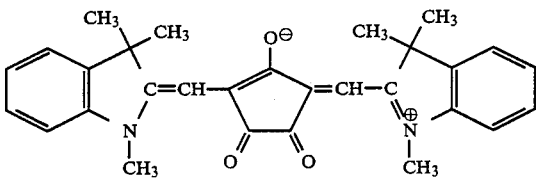
4-1-32
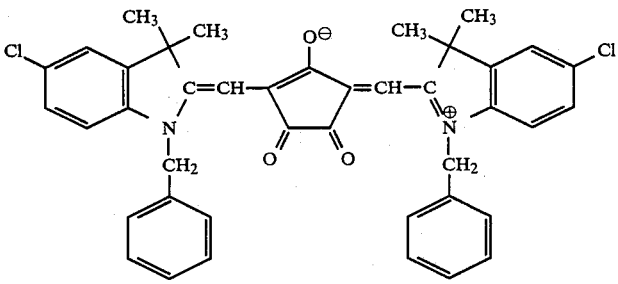
4-1-33
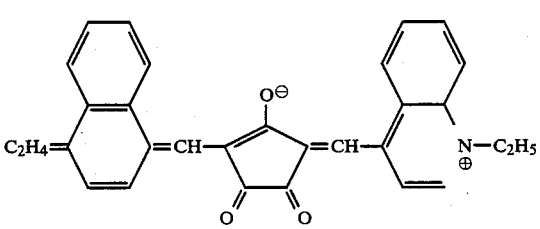
4-1-34
Typical examples of the formulae 4-3 and 4-4:

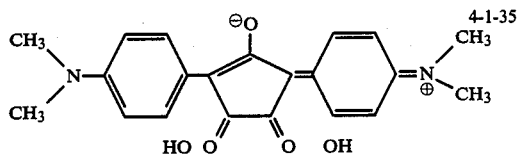
4-1-35

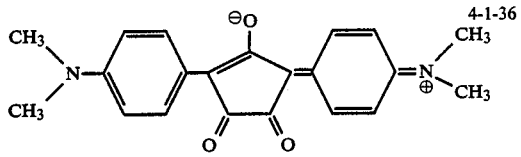
4-1-36

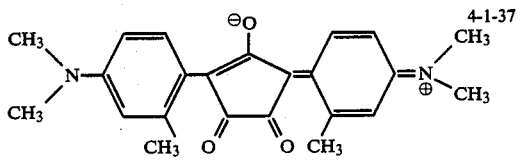
4-1-37

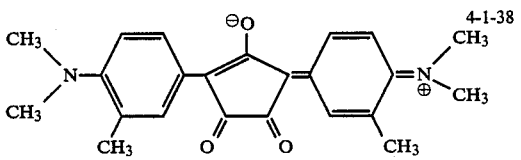
4-1-38

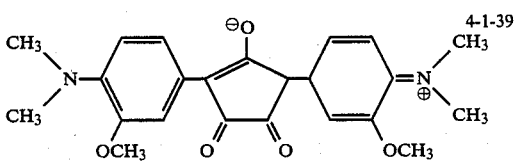
4-1-39

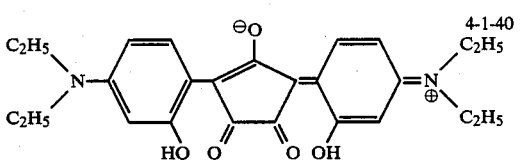
4-1-40

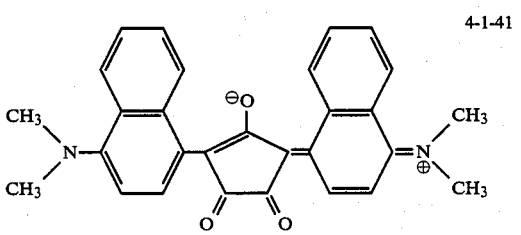
4-1-41

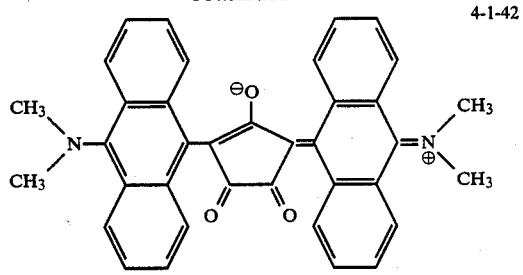
4-1-42

The compounds represented by the following formula 5-1 and 5-2 to be used in the present invention are compounds having an absorption peak in the wavelength region of 800 nm or longer which can generate heat by infrared rays of such wavelength.

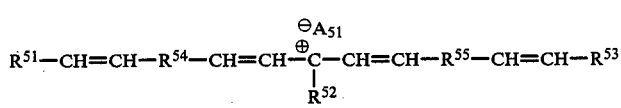
Formula 5-1

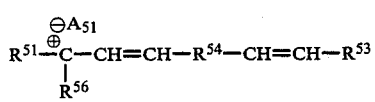
Formula 5-2

To describe in more detail about the polymethine compounds, in the formulae 5-1 and 5-2, $R^{51}$, $R^{52}$ and $R^{53}$ each independently represent an aryl radical such as phenyl, naphthyl, etc., which may have substituent. Here, examples of the substituent may include substituted amino radicals such as dimethylamino, diethylamino, dipropylamino, dibutylamino, diphenylamino, phenylbenzylamino, phenylethylamino, etc., cyclic amino radical such as morpholino, piperidinyl, pyrrolidino, etc., alkoxy radical such as methoxy, ethoxy, butoxy, etc. $R^{54}$ and $R^{55}$ each represents an arylene radical which may be substituted and can form a conjugated double bond system with two —CH=CH— radicals adjacent thereto such as p-phenylene, 1,4-naphthylene, etc. Here, examples of the substituent may include halogen atoms such as chlorine, bromine, iodine, etc., alkyl group such as methyl, ethyl, etc., and alkoxy radicals such as methoxy, ethoxy, etc. $R^{56}$ represents hydrogen or an aryl radical such as phenyl, naphthyl, etc., which may be substituted. Examples of the substituents may include those as exemplified for $R^{51}$ to $R^{53}$. $A_{51}^{\ominus}$ represents an anion radical, including, for example, $BF_4^{\ominus}$, $ClO_4^{\ominus}$, $CF_3COO^{\ominus}$, $PF_6^{\ominus}$; halogen radicals such as $Cl^{\ominus}$, $Br^{\ominus}$, $I^{\ominus}$, etc.; $ClSO_3^{\ominus}$; alkyl sulfonic acid radicals such as $CH_3SO_3^{\ominus}$, $C_2H_5SO_3^{\ominus}$, $C_3H_7SO_3^{\ominus}$, $C_4H_9SO_3^{\ominus}$, $C_5H_{11}SO_3^{\ominus}$, $C_6H_{13}SO_3^{\ominus}$, $CH_3CHClSO_3^{\ominus}$, $ClCH_2CH_2SO_3^{\ominus}$,

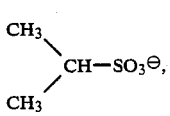

ICH$_2$SO$_3^\ominus$, etc.; benzenesulfonic acid radicals such as
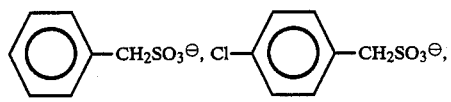
etc.; alkyldisulfonic acid radicals such as $^\ominus$O$_3$SCH$_2$SO$_3^\ominus$, $^\ominus$O$_3$SCH$_2$CH$_2$SO$_3^\ominus$, $^\ominus$O$_3$S(CH$_2$)$_6$SO$_3^\ominus$, $^\ominus$O$_3$SCH$_2$CH$_2$—O—CH$_2$CH$_2$SO$_3^\ominus$, etc.; benzenedisulfonic acid radicals such as
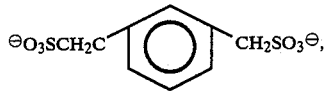

Specific examples are shown below.
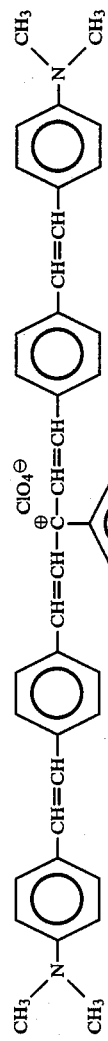
5-1-1
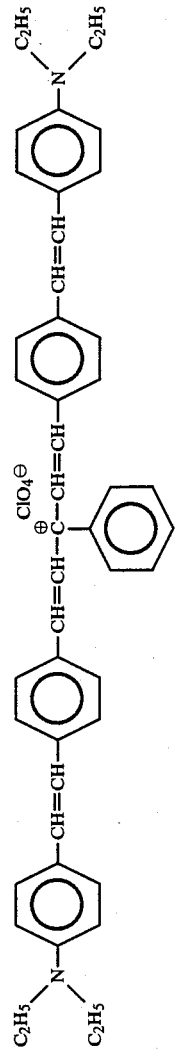
5-1-2
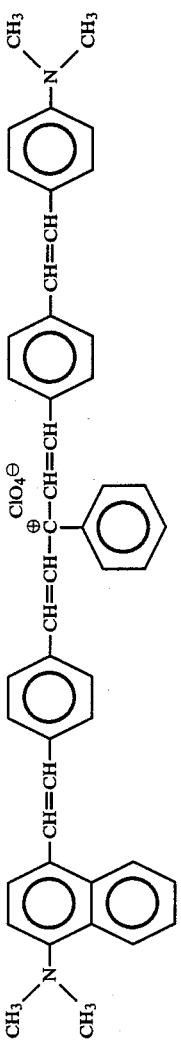
5-1-3
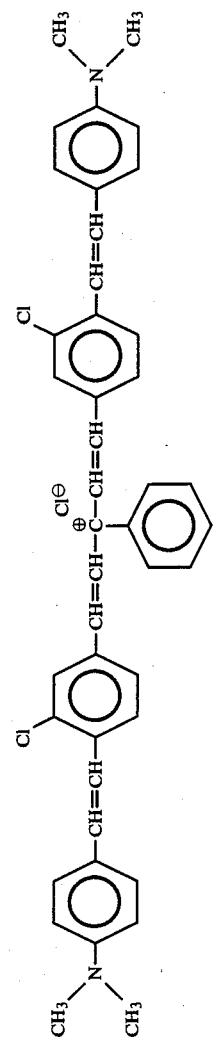
5-1-4
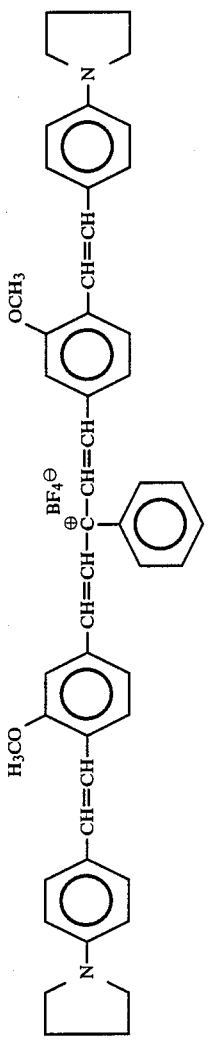
5-1-5

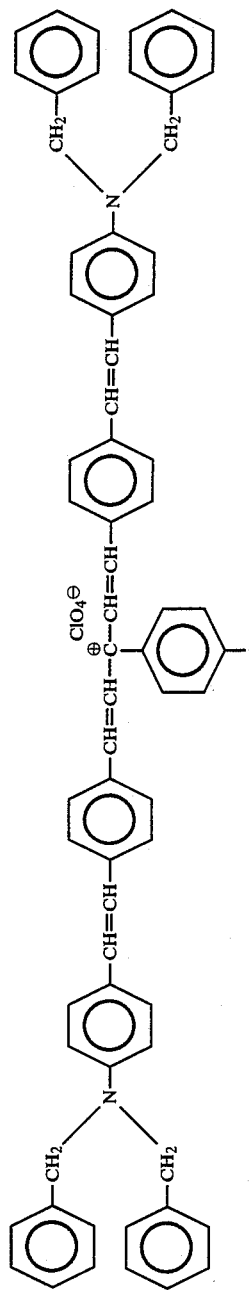
5-1-6
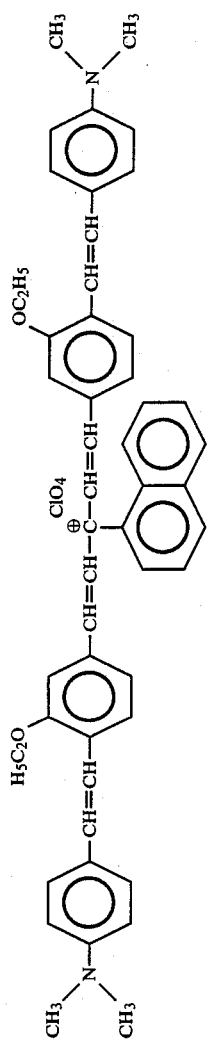
5-1-7
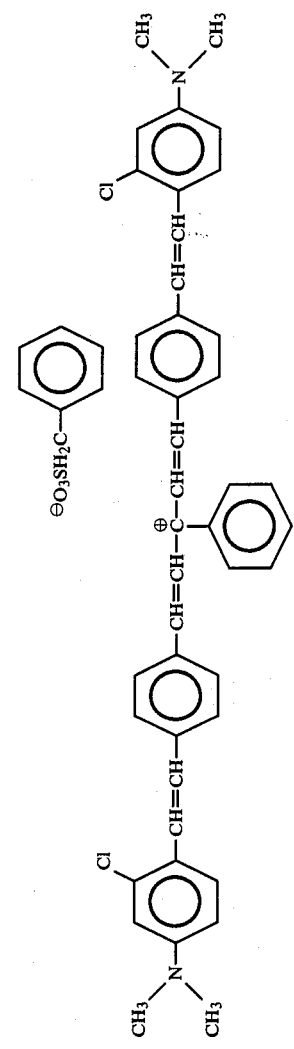
5-1-8
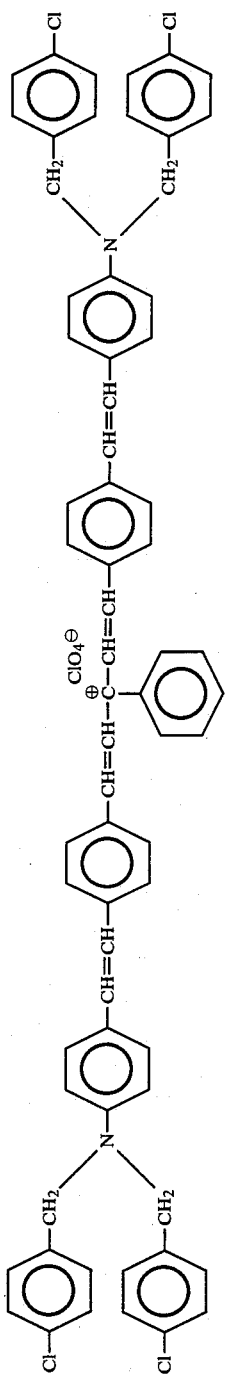
5-1-9

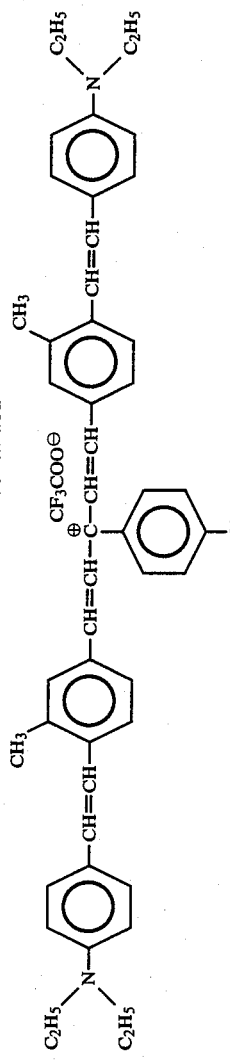 5-1-10
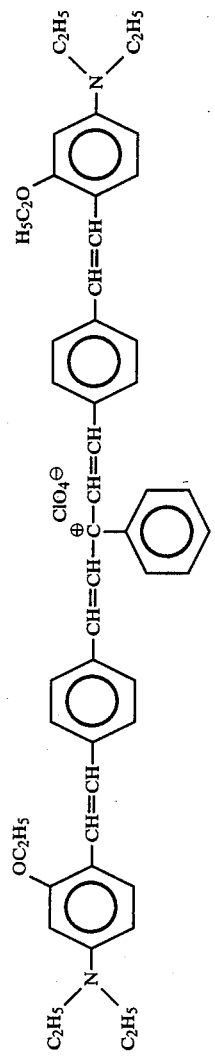 5-1-11
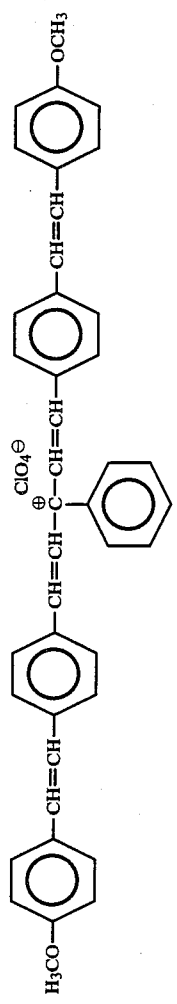 5-1-12
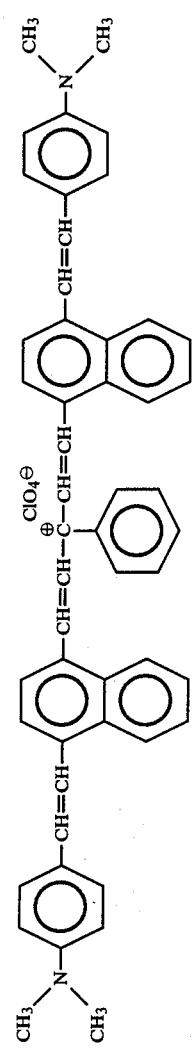 5-1-13
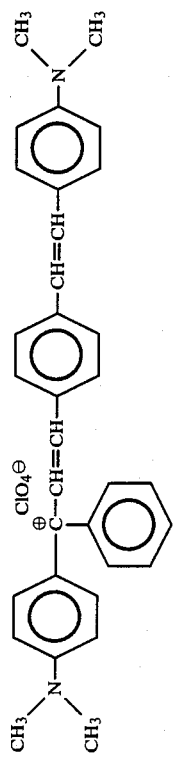 5-1-14

5-1-15
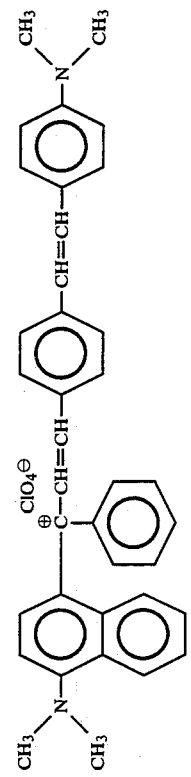
5-1-16
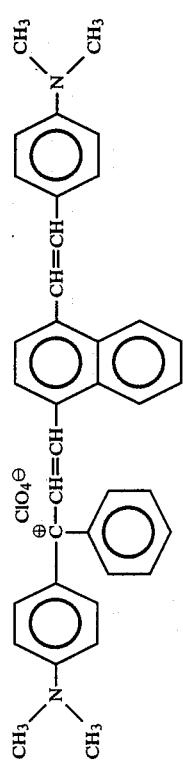
5-1-17
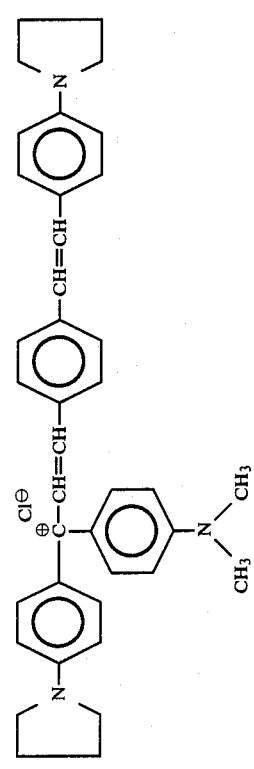
5-1-18
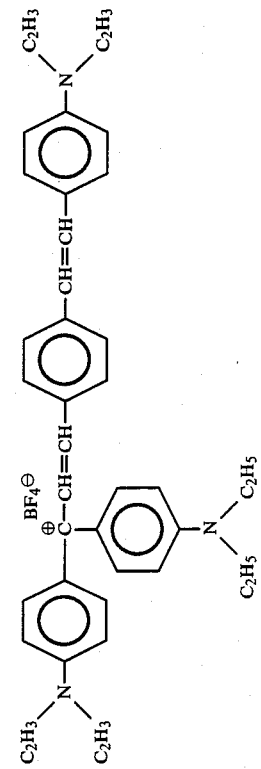

-continued
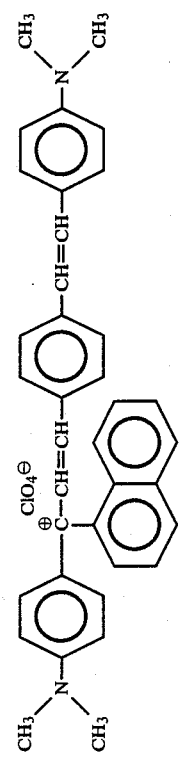
5-1-19
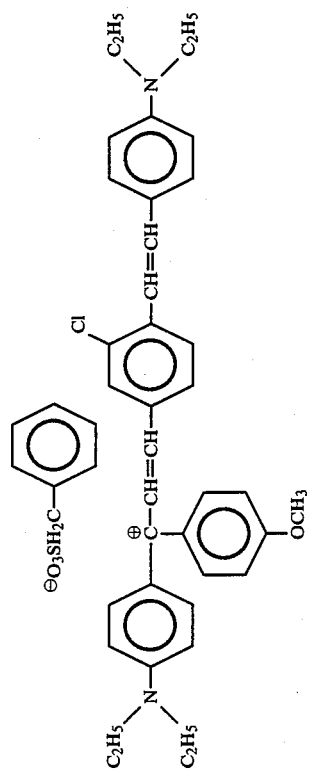
5-1-20
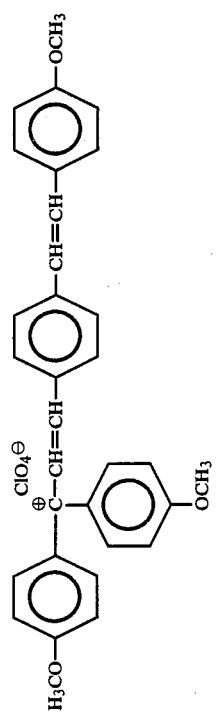
5-1-21
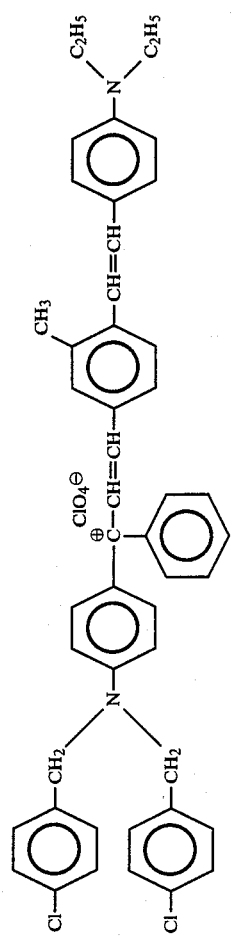
5-1-22

-continued
5-1-23 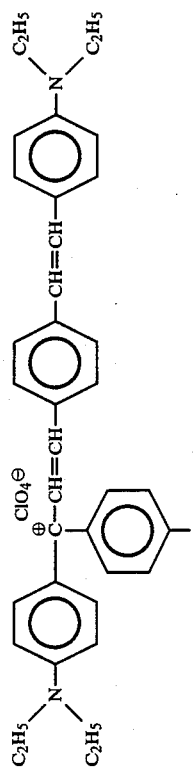
5-1-24 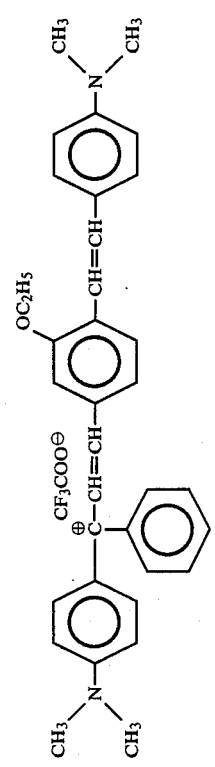
5-1-25 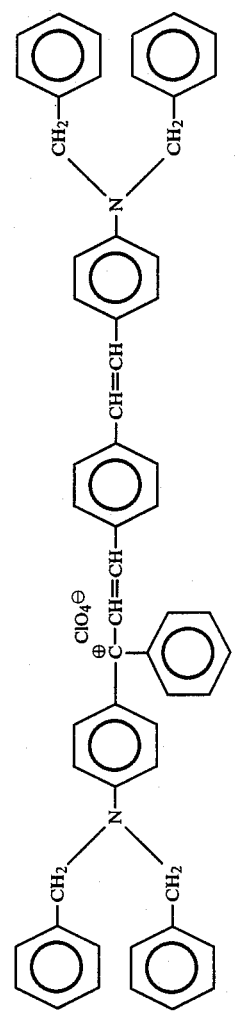
5-1-26 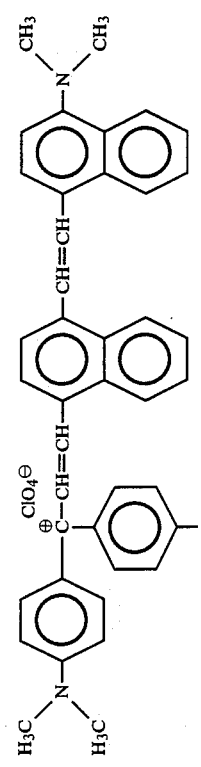
5-1-27 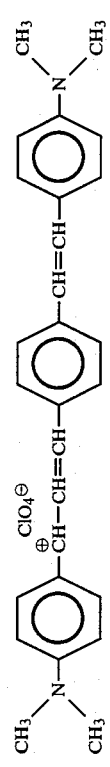

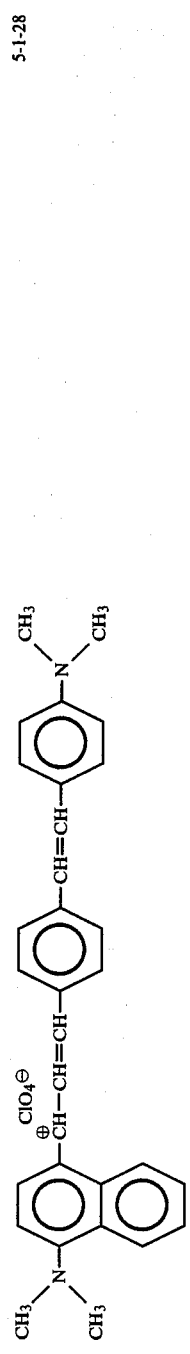
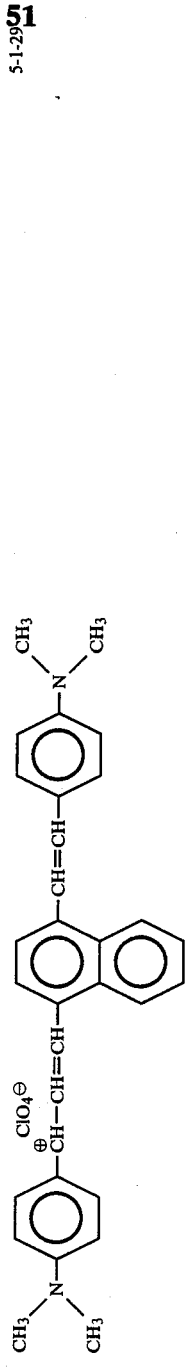
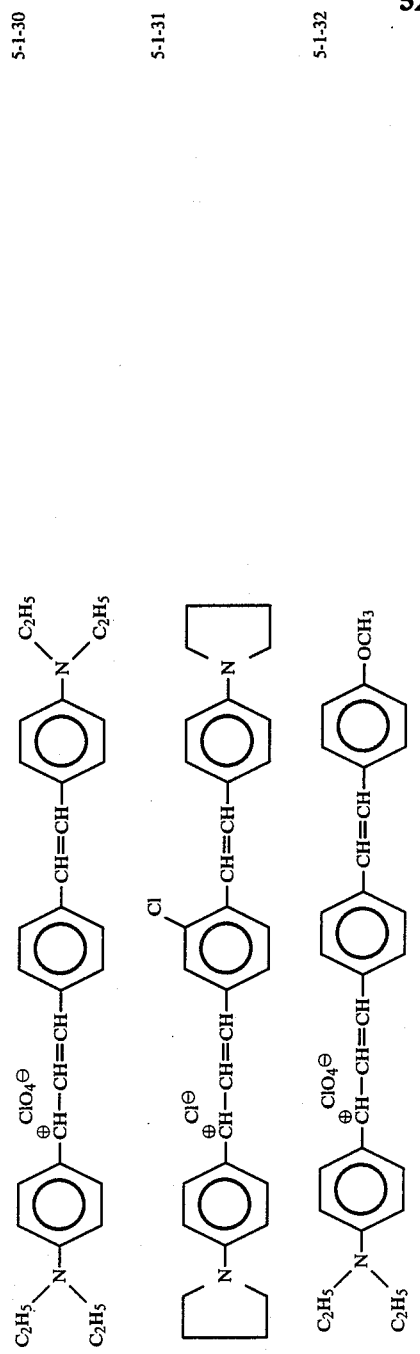
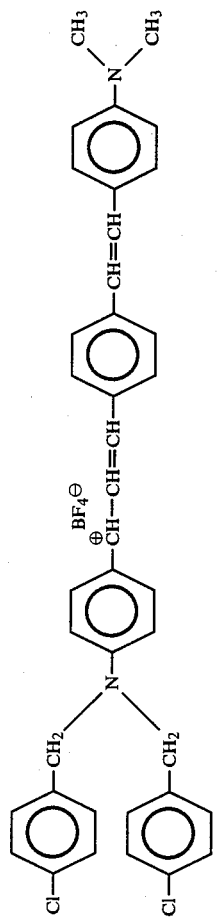

-continued
5-1-34
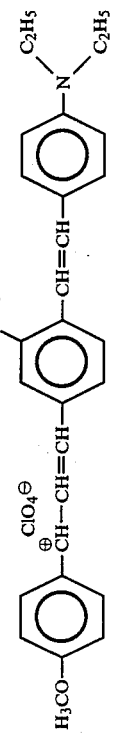
5-1-35
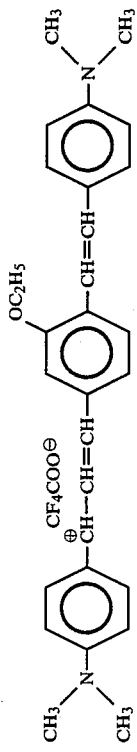
5-1-36
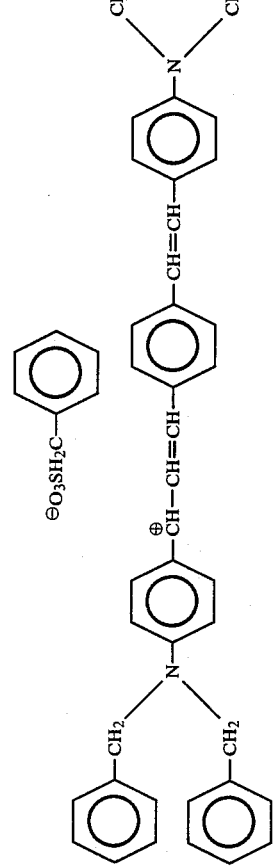

The optical recording medium to be used in the present invention contains the above DA compound and at least one selected from the AZ compounds or pyrylium dyes or diene compounds or croconic methine dyes or polymethine compounds (hereinafter called the group B), and may have either constitution of the one layer mixed system, the two layer separated system or the multi-layer separated system.

Here, the one layer mixed system refers to the constitution comprising a mixed layer of the DA compound and at least one compound selected from the group B, the two layer separated system the constitution comprising separately a layer containing the DA compound and a layer containing the compound selected from the group B laminated on one another, and further the multi-layer laminated system the constitution not including the above two layer separated system, comprising one or more layers containing the DA compound and one or more layers containing the compound selected from the group B laminated in desired layer number.

Figure 2A:
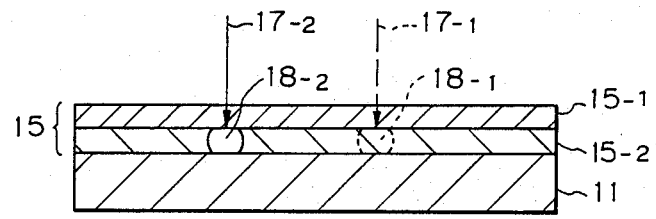

Typical constitution of the optical recording medium to be used in the present invention are shown in FIG. 1(a), (b) and FIG. 2(a), (b).

FIG. 1(a), (b) show a constitution having a one layer mixed system recording layer 15 provided on a substrate 11, and FIG. 2(a), (b) a constitution having a two layer separated system, namely a recording layer 15 comprising a layer 15-1 containing the DA compound and a layer 15-2 containing the compound selected from the group B, provided on the substrate 11.

As the substrate 11 of the optical recording medium to be used in the present invention, there may be employed various supporting materials such as plastic films of glass, acrylic resins, etc., plastic films of polyesters, etc., paper, metal and others. When recording is practiced by irradiating a radiation, from the substrate side, a substrate capable of transmitting a radiation for recording of a specific wavelength is used.

The layer containing the DA compound and at least one compound selected from the group B formed on the substrate 11 may be formed either by coating or as a monomolecular film or a built-up monomolecular films.

First, for formation of a recording layer as a monomolecular film or monomolecular built-up films, for example, the Langmuir-Blodgett method (hereinafter abbreviated as LB method) developed by I. Langmuir et al may be used.

The LB method is a method in which a monomolecular film or a film having monomolecular layers built-up is prepared by utilizing the phenomenon that, in a molecule with a structure having a hydrophilic moiety and a hydrophobic moiety in the molecule, when the balance between the both (amphiphilic balance) is adequately maintained, the molecule becomes a monomolecular layer on the surface with the hydrophilic moiety directed downward. The monomolecular layer on the water surface has the characteristics of the two-dimensional system. When the molecules are scattered sparsely, the following formula of the two-dimensional ideal gas is valid between the area A per one molecule and the surface pressure $\pi$:

$$\pi A = kT,$$

thus becoming "gas film". Here, k is the Boltzmann's constant and T is an absolute temperature. When A is made sufficiently small, intermolecular interactions are strengthened, whereby the molecules become "condensed film (or solid film)" of a two-dimensional solid.

The condensed films can be transferred one layer by one layer onto the surface of a substrate such as glass.

For constituting a mixed monomolecular film or mixed monomolecular built-up films comprising two or more compounds, at least one of the two or more compounds may have hydrophilic site and hydrophobic site in combination, and it is not necessarily required that all the compounds should have hydrophilic site and hydrophobic site in combination. That is, provided that amphiphilic balance is maintained in at least one compound, a monomolecular layer can be formed on the water surface and the other compound can be sandwiched between the amphiphilic compound, whereby a monomolecular layer having molecular orderliness can be consequently formed.

By use of this method, a mixed monomolecular film of the DA compound and the compound selected from the group B or a mixed monomolecular built-up films thereof can be prepared, for example, as follows.

First, the DA compound and the compound selected from the group B are dissolved in a solvent such as chloroform, and the resulting solution is spread on an aqueous phase to form a spreading layer in which these compounds are spread in a film. Next, a partitioning plate (or a buoy) is provided to prevent too broad expansion of the spreading layer through free diffusion on the aqueous phase whereby the area of the spreading layer is restricted to control the gathered state of these compounds and obtain a surface pressure $\pi$ in proportion to the gathered state. By moving this partitioning plate, the gathered state of the film substance can be controlled by reducing the spreading area, whereby the surface pressure can be gradually elevated to be set at a surface pressure $\pi$ suitable for preparation of built-up films. At the surface pressure constantly maintained, by moving vertically a clean substrate gently, a mixed monomolecular film of the DA compound and the compound selected from the group B is transferred onto the substrate. A mixed monomolecular film can be thus produced, built-up films of mixed monomolecular layers can be formed to a desired built-up degree by repeating the above operation.

For transfer of the monomolecular film onto a substrate, other than the above vertical dipping method, such methods as the horizontal lifting method, the rotating cylinder method, etc., may be employed. The horizontal lifting method is a method in which transfer is effected with the substrate being contacted horizontally on the water surface, and the rotating cylinder method is a method in which the monomolecular layer is transferred onto the substrate surface by rotating a cylindrical substrate on the water surface. In the vertical dipping method as described above, when a substrate having a hydrophilic surface is withdrawn in the direction transversing the water surface, a monomolecular layer with the hydrophilic groups faced toward the substrate side is formed in the first layer on the substrate. When the substrate is moved up and down vertically, mixed monomolecular films are laminated one layer by one layer in the respective steps. Since the direction of the film forming molecules in the withdrawing step becomes opposite to that of the dipping step, according to this method, there is formed a Y-type film in which hydrophilic moieties and hydrophilic moieties, or hydrophobic moieties and hydrophobic moieties are faced toward each other between the respective layers.

In contrast, the horizontal lifting method is a method in which monomolecular film is transferred with the substrate contacted horizontally on the water surface, whereby a monomolecular film is formed on the substrate with the hydrophobic moiety faced toward the substrate side. According to this method, even when a film is built up, there is no change in direction of the molecules of the DA compound, but there is formed an X-type film in which the hydrophobic groups are faced toward the substrate side in all of the layers. On the contrary, a built-up film in which the hydrophilic groups in all the layers are faced toward the substrate side is called a Z-type film.

In a rotating cylinder method, a monomolecular layer is transferred onto the substrate surface by rotating a cylindrical substrate on the water surface. The method for transferring monomolecular layers onto a substrate is not limited to these, but it is also possible to employ a method in which a substrate is extruded into an aqueous phase from substrate roll, when employing a large area substrate. Also, the direction of the hydrophilic moiety and the hydrophobic moiety toward the substrate as described above are given as general rules. However, they are also modified by the surface treatment of the substrate, etc.

Details of the transferring operation of these monomolecular films are already known and described in, for example, "Shin Jikken Kagaku Koza (New Experimental Chemical Course) 18 Interface and Colloid" P. 498–507, published by Maruzen.

Thus, the mixed monomolecular film or built-up mixed monomolecular films formed on the substrate have high density as well as high degree of orderliness, and therefore, variation in light absorption from place to place is very small. Accordingly, by constituting a recording layer with such a film, there can be obtained a recording medium to be used in the present invention having high density and recording performance of high resolution capable of effecting optical recording and thermal recording depending on the functions of the DA compound and the compound selected from the group B.

When a recording layer 15 of the two layer separated system or the multi-layer laminated system is formed, one or more layers of the DA compound and one or more layers of the compound selected from the group B may be laminated in desired layer number and order on a substrate.

The layer comprising a monomolecular film or a built-up monomolecular films of the DA compound can be formed on the substrate 11 or other layers by preparing a solution containing the DA compound for spreading according to the above LB method.

Since it is impossible to form a monomolecular film from at least one compound selected from the group B alone, the formation is made possible by using organic molecules having a well-balanced amphiphilicity such as higher fatty acids (e.g. stearic acid, arachic acid, etc.) in an appropriate proportion, thus forming a monomolecular film or built-up monomolecular films according to the LB method as described above.

Of course, a combination of a layer of a monomolecular film or built-up monomolecular films of the DA compound and a layer obtained by coating of the compound selected from the group B may be employed.

On the other hand, for formation of a recording layer by coating, the following methods may be employed.

In the case of the one layer mixed system, fine crystalline powder of the DA compound and at least one compound selected from the group B may be dissolved in an appropriate volatile solvent to prepare a coating liquid and this coating liquid applied on the substrate 11. Alternatively, in the case of the two layer separated system or the multi-layer laminated system, a coating liquid containing fine crystalline powder of the DA compound and a coating liquid containing the compound selected from the group B may be prepared separately and these coated on the substrate 11 in a desired order.

The solvent for the coating liquid to be used in formation of a recording layer of the one layer mixed system may be generally selected suitably depending on the kind of the binder, the DA compound and the compound selected from the group B, but may, generally, include alcohols such as methanol, ethanol, isopropanol, etc., ketones such as acetone, methyl ethyl ketone, cyclohexanone, etc.; amides such as N,N-dimethylformamide, N,N-dimethylacetamide, etc.; sulfoxides such as dimethyl sulfoxide, etc.; ethers such as tetrahydrofuran, dioxane, ethyleneglycol monomethyl ether, etc.; esters such as methyl acetate, ethyl acetate, butyl acetate, etc.; aliphatic halogenated hydrocarbons such as chloroform, methylene chloride, dichloroethylene, carbon tetrachloride, trichloroethylene, etc.; aromatic hydrocarbons such as benzene, toluene, xylene, monochlorobenzene, dichlorobenzene, etc.

In the case of croconic methine dyes, the solvent used may be selected suitably depending on the state of the croconic methine dye. For example, in the case of a croconic methine dye under amorphous state, there may be employed alcohols such as methanol, ethanol, isopropanol, etc.; ketones such as acetone, methyl ethyl ketone, cyclohexanone, etc.; amides such as N,N-dimethylformamide, N,N-dimethylacetamide, etc.; sulfoxides such as dimethyl sulfoxide, etc.; ethers such as tetrahydrofuran, dioxane, ethylene glycol monomethyl ether, etc.; esters such as methyl acetate, ethyl acetate, etc.; benzene derivatives such as benzene, toluene, xylene, ligroin, etc. On the other hand, in the case of a croconic methine in a particulate state, there may be selected halogenated hydrocarbons such as dichloromethane, chloroform, carbon tetrachloride, 1,1-dichloromethane, 1,2-dichloromethane, 1,1,2-trichloromethane, chlorobenzene, bromobenzene, 1,2-dichlorobenzene, etc.

Also, the solvent for coating liquid to be used for formation of the two layer separated system or the multi-layer laminated system may include alcohols such as methanol, ethanol, isopropanol, etc., ketones such as acetone, methyl ethyl ketone, cyclohexanone, etc.; aliphatic nitriles such as acetonitrile, etc.; aliphatic halogenated hydrocarbons such as chloroform, methylene chloride, dichloroethylene, carbon tetrachloride, trichloroethylene, etc.; and others. Methylene chloride and acetonitrile are particularly preferred.

As a preferable medium for dispersing the DA compound, there may be employed aliphatic hydrocarbons such as n-hexane, n-heptane, n-octane, cyclohexane, etc. Also, each coating liquid may incorporate suitably a binder comprising a natural or synthetic polymer for improvement of adhesion to the substrate 11 or other layers. Further, various additives may be also added for improving stability and quality of the recording layer 15.

For coating of the substrate 11 with such coating liquid, there may be employed various methods such as spinner rotatory coating, dip coating, spray coating, bead coating, wire bar coating, blade coating, roller coating, curtain coating, etc.

When the recording layer 15 is the one layer mixed system, its film thickness may be suitably about 200 Å to 2 μm, particularly preferably within the range from 400 to 5000 Å. In the case of the two separated layer system, the film thickness of each layer may be preferably about 100 Å to 1 μm, particularly preferably in the range from 200 to 5000 Å. Further, in the case of the multi-layer laminated system, the total of the film thickness of the layers containing the individual DA compounds and the total of the film thickness of the layers containing the individual compounds selected from the group B should be both suitably about 100 Å to 1μ, particularly preferably 200 to 5000 Å.

The mixing ratio of the DA compound to the compound selected from the group B may be preferably about 1/15 to 15/1, optimally 1/10 to 10/1.

If necessary, various protective layers may be also provided on the recording layer thus constituted.

The present invention can be effective regardless of the order in which the respective layers are laminated in the two layer separated system or the multi-layer laminated system.

By use of the optical recording medium thus constituted, the optical recording method of the present invention can be practiced.

In the optical recording medium, by applying light on the DA compound, the wavelength absorbed by the recording layer will change to cause change in apparent color. That is, the DA compound (excluding polymer) which is substantially colorless and transparent at the initial state is polymerized on irradiation of UV-rays to be changed to a polydiacetylene derivative compound. This polymerization occurs by irradiation of UV-rays. As the result of this polymerization, the recording layer has the maximum absorption wavelength at 620 to 660 nm and is changed to blue color or dark color. The change in hue based on this polymerization is an irreversible change, and the recording layer once changed to blue color or dark color will never be returned to the colorless transparent film.

Further, the recording layer containing the polyacetylene derivative compound and the polymethine compound changed to blue color or dark color will generate heat at a temperature corresponding to the dose of light irradiated. In this case, when the recording layer 2 is not melted and the polydiacetylene derivative compound is heated to about 50° C. or higher, the exposed portion of the recording layer has the maximum absorption wavelength at about 540 nm and is changed to a red film. This change to the red film is also an irreversible change.

Further, when the dose is elevated until the dose exceeds a predetermined limit, the exposed portion of the recording layer will be melted.

The optical recording method of the present invention practices recording by utilizing such characteristic obtained by the combination of the DA compound and the polymethine compound. This recording method is described in detail below.

As the semiconductor laser to be used in the method of the present invention, it is particularly preferable to use a GaAs junction laser with an output wavelength of 800 to 900 nm.

In practicing the optical recording method of the present invention, when an optical recording medium having an optical recording layer constituted by use of a DA compound (excluding a polymer) and a polymethine compound, first UV-ray is irradiated on the whole recording layer. By irradiation of the UV-ray, the DA compound (excluding a polymer) in the recording layer is polymerized to be changed to a polydiacetylene derivative compound, whereby the recording layer is changed in color to a blue or dark film (of course, this operation is not required for a recording medium having a recording layer by use of a polydiacetylene derivative compound as the DA compound).

On the other hand, input (recording) information is converted to an optical signal by a semiconductor laser via a control circuit. The optical signal is placed on, for example, an optical recording medium placing means via an optical system and is converged at a predetermined position of the recording medium under synchronous rotation as shown in FIG. 1(A). The converged position is in the recording layer 15 of the recording medium. The doses at the converged points (sites) 18-1, 18-2 are controlled to a dose ($Q_1$) which is sufficient to heat the polydiacetylene derivative compound to about 50° C. or higher for color change recording but will not melt the recording layer 15 and a dose ($Q_2$) sufficient for melting the recording layer 15 for pit recording (provided that $Q_1 < Q_2$).

Desirably, heating for recording by color change is conducted to a temperature approximately ranging from 50° C. to 120° C., and that for recording by pit formation to a temperature approximately ranging from 250° C. to 300° C.

For changing thus the dose at the converged point, the intensity of the semiconductor laser may be changed or the irradiation time of laser is changed, or both of these methods may be used in combination. In practicing irradiation of two kinds of doses, controlling as described above may be practiced by use of one semiconductor laser, or alternatively a plural number of semiconductor lasers capable of giving different doses may be used.

The compound of the group B existing at the converged points (sites) 18-1 and 18-2 will generate heat by absorption of the laser beams 17-1 and 17-2.

Here, the converged point 18-1 receiving the dose $Q_1$ as described above is changed to red by heating of the polydiacetylene derivative compound by heat generation of the compound of the group B, whereby it becomes a dot 19 comprising a color changed portion distinguishable from the blue color of the unexposed portion. On the other hand, in the optical recording medium having a recording layer comprising only the DA compound, since the polydiacetylene derivative compound has no sensitivity to the laser or the wavelength 800–900 nm, optical recording has been impossible by use of the semiconductor laser of this wavelength.

Figure 1B:
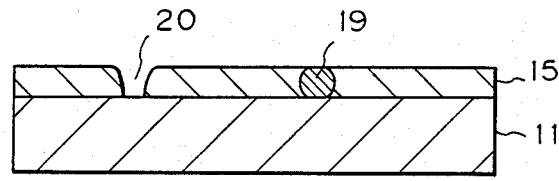

On the other hand, the converged point 18-2 receiving the dose $Q_2$ as described above is melted at that portion by heat generation of the compound of the group B, whereby a pit comprising a convacity as shown in FIG. 1(B) is formed.

During that process, since the recording layer 15 of the recording medium to be used in the present invention is constituted of a combination of the compound selected from the group B and the polydiacetylene derivative compound, namely due to the presence of the polydiacetylene derivative compound, energy required for melting of the recording layer can be remarkably reduced to promote a pit formation as described above by the compound of the group B to a great extent. Thus, corresponding to the input information, optical recording by formation of pit is practiced on the recording layer.

Thus, corresponding to the input information, optical recording by the dots of two different kinds of modes of the color changed portion 19 and the pit 20, namely the three-value recording is practiced on the recording layer 15. Besides, since the optical recording medium used in the present invention has high sensitivity to both color change recording and pit recording, such three-value recording can be done at high speed.

Figure 2B:
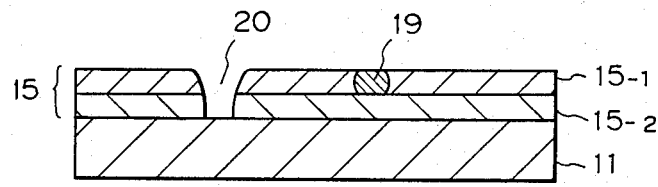

Having described above about the case when using an optical recording medium having the one layer mixed system recording layer, when the two layer separated system as shown in FIG. 2(A), (B) is used, the converged points 18-1 and 18-2 are made the layer 15-2 containing the compound of the group B as shown in FIG. 2(A). When laser 17-1 and 17-2 are thus irradiated, the compound of the group B will generate heat corresponding to the doses $Q_1$, $Q_2$ at the converged points 18-1, 18-2 corresponding to the input information, whereby a dot 19 comprising a color changed portion or a pit 20 comprising a convacity will be formed as shown in FIG. 2(B).

The two kinds of dots recorded as described above can be subjected to reading of either both of them at once or only one of them, as desired.

In the above example, a disc (optical disc) was used in the above example as the optical recording medium, but of course it is possible to use an optical tape, an optical card, etc., depending on the kind of the substrate supporting the recording layer containing the DA compound and the compound of the group B.

The effects of the optical recording method of the present invention are enumerated below.

(1) Since at least one of the compounds selected from the group B and a diacetylene derivative compound are contained in combination in the recording layer, color change recording and pit recording can be performed as desired with one sheet of a recording medium by use of a small scale and lightweight semiconductor laser. That is, high density recording by three-value recording is possible with one sheet of recording medium. Moreover, the recording layer is highly sensitive in both color change recording and pit recording, and therefore high speed recording is possible.

(2) Since the recording layer is formed homogeneously and with good surface characteristic, optical recording of high quality excellent in stability can be practiced.

(3) Optical recording by use of an inexpensive recording medium having highly homogeneous and large area recording layer is rendered possible.

EXAMPLE 1-1

One part by weight of fine crystalline powder of a diacetylene derivative represented by the formula $C_{12}H_{25}-C\equiv C-C\equiv C-C_8C_{16}-COOH$ and 1 parts by weight of the azulenium salt compound represented by the formula 1-1-1 were added to 4 parts by weight of methylene chloride, followed by thorough stirring, to prepare a coating solution.

Next, a disc substrate made of a glass (thickness 1.5 mm, diameter 200 mm) was mounted on a spinner coating machine, and the above coating solution was added in a small amount dropwise at the central portion of the disc substrate and thereafter the spinner was rotated at a predetermined rotational number for a predetermined time to effect coating, followed by drying at normal temperature, to prepare optical recording media with thicknesses of coated films after drying of 500 Å, 1000 Å and 2000 Å, respectively.

On the recording media thus obtained, first UV-rays of 254 nm were irradiated uniformly and sufficiently to make the recording layers blue films.

Next, optical recording was practiced on the recording media having recording layers made into blue films under the following recording conditions except for changing variously the laser beam irradiation time per one pit between 400 ns and 5 μs.
Semiconductor laser wavelength: 830 nm
Laser beam diameter: 1 μm
Laser output: 3 mW After completion of writing under the above conditions, the recording results on the respective recording media were observed by use of a microscope, and the laser beam irradiation time (sensitivity) necessary for formation of pits comprising distinct concavities at the laser beam irradiated portion was examined. The results are shown in Table 1.

Next, overall evaluation was conducted about resolution and contrast ratio of the pit portion to the non-pit portion (sharpness) for the recording media recorded at an irradiation time of 900 ns/pit, and particularly good one was rated as , good one as , and incapability of recording and bad one as x. The results are shown in Table 1-1.

EXAMPLE 1-2

By use of a mixed solution containing 5 parts by weight of the diacetylene derivative compound, 1 part by weight of the azulenium salt compound and 12 parts by weight of methylene chloride as the coating solution, following otherwise the same procedure as in Example 1-1, recording media were obtained, recording was performed thereon and evaluated. The recording results are shown in Table 1-1.

COMPARATIVE EXAMPLE 1-1

Without use of the azulenium salt compound and by use of a coating solution containing 1 part by weight of the diacetylene derivative compound added to 2 parts by weight of methylene chloride, following otherwise the same procedure as in Example 1-1, recording media were obtained, recording was performed thereon and evaluated. The recording results are shown in Table 1-1.

COMPARATIVE EXAMPLE 1-2

Without use of the diacetylene derivative compound and by use of a coating solution containing 1 part by weight of the azulenium compound dissolved in 2 parts by weight of methylene chloride, following otherwise the same procedure as in Example 1-1, recording media were obtained, recording was performed thereon and evaluated. The recording results are shown in Table 1-1.

EXAMPLE 1-3

By use of a mixed solution containing 1 part by weight of the diacetylene derivative compound, 1 parts by weight of the AZ compound and 4 parts by weight of methylene chloride and further by use of 2 parts by weight of nitrocellulose as the binder, following otherwise the same procedure as in Example 1-1, a recording medium with a thickness of the recording layer of 4000 Å was prepared.

On the recording medium, UV-rays of 254 nm were irradiated uniformly and sufficiently to convert the recording layer to a blue film, and recording was practiced under the recording conditions shown below following an input information. The laser beam irradiation time per one bit was changed variously between 400 ns and 5 $\mu$s.

Semiconductor laser wavelength: 840 nm
Laser beam diameter: 1 $\mu$m
Laser output: 3 mW.

COMPARATIVE EXAMPLE 1-3

Except for using no diacetylene derivative compound and a solution of 2 parts by weight of the azulenium salt compound and 2 parts by weight of nitrocellulose dissolved in 4 parts by weight of methylene chloride, a recording medium was obtained according to the same procedure as in Example 1-3, and recording was performed thereon and evaluated.

For the recording medium of Example 1-3, as the result of observation by a microscope, good recording could be practiced when the irradiation time was 1000 ns/pit or longer, but in the case of the recording medium of Comparative example 1-3, an irradiation time of 2000 ns/pit or longer was required for forming distinctly one pit.

EXAMPLE 1-4

According to the same procedure as in Example 1-1 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, an optical recording medium was prepared, optical recording was performed thereon and the recording results were evaluated. The results are shown in Table 1-1.

EXAMPLE 1-5

According to the same procedure as in Example 1-4 except for using an azuelenium salt compound represented by the formula 1-1-6 in place of the azulenium salt compound represented by the formula 1-1-1, an optical recording medium was prepared, optical recording was performed thereon and the recording results were evaluated. The results are shown in Table 1-1.

EXAMPLE 1-6

A solution of 1 part by weight of a diacetylene derivative compound represented by $C_{12}H_{25}-C\equiv C-C\equiv C-C_8H_{16}-COOH$ and 1 part by weight of an azulenium salt compound represented by the above formula 1-1-1 dissolved at a concentration of $1\times 10^{-3}$ mole/liter in chloroform was spread on an aqueous phase with pH 6.5 and a cadmium chloride concentration of $1\times 10^{-3}$ mole/liter. After removal of the solvent chloroform, at a surface pressure maintained constantly, a glass substrate sufficiently cleaned having a hydrophilic surface was moved vertically in the direction transversing the water surface gently at a speed of 1.0 cm/min to have a mixed monomolecular film of the diacetylene derivative compound and the azulenium salt compound transferred onto the substrate. Thus, optical recording media having a mixed monomolecular film and mixed monomolecular built-up films built up in 21 layers, 41 layers and 81 layers formed on the substrate, respectively, were prepared.

By use of the recording media thus prepared, optical recording was practiced and evaluated in the same manner as in Example 1-1. The results are shown in Table 1-2.

EXAMPLE 1-7

According to the same procedure as in Example 1-6 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, an optical recording medium was prepared, optical recording was performed thereon and the recording results were evaluated. The results are shown in Table 1-2.

EXAMPLE 1-8

According to the same procedure as in Example 1-6 except for using an azulenium salt compound represented by the formula 1-1-14 in place of the azulenim salt compound represented by the formula 1-1-1, an optical recording medium was prepared, optical recording was performed thereon and the recording results were evaluated. The results are shown in Table 1-2.

TABLE 1-1

| Recording medium | Film thickness | Sensitivity | Resolution | Sharpness |
|---|---|---|---|---|
| Example 1-1 | 500Å | 500 ns | ⊚ | ○ |
|  | 1000Å | 600 | ⊚ | ⊙ |
|  | 2000Å | 600 | ⊚ | ⊚ |
| Example 1-2 | 500Å | 550 | ⊚ | ○ |
|  | 1000Å | 650 | ⊚ | ⊙ |
|  | 2000Å | 700 | ⊚ | ⊚ |
| Comparative Example 1-1 | 500Å | X | X | X |
|  | 1000Å | X | X | X |
|  | 2000Å | X | X | X |
| Comparative Example 1-2 | 500Å | 1800 | X | X |
|  | 1000Å | 1900 | X | X |
|  | 2000Å | 1950 | X | X |
| Example 1-4 | 500Å | 700 ns | ⊚ | ○ |
|  | 1000Å | 750 | ⊚ | ⊙ |
|  | 2000Å | 800 | ⊚ | ⊚ |
| Example 1-5 | 500Å | 750 | ⊚ | ○ |
|  | 1000Å | 800 | ⊚ | ○ |
|  | 2000Å | 900 | ⊚ | ⊚ |

TABLE 1-2

| Recording medium | Built-up number | Sensitivity | Resolution | Sharpness |
|---|---|---|---|---|
| Example 1-6 | 1 | 500 ns | ⊚ | ○ |
|  | 21 | 600 | ⊚ | ○ |
|  | 41 | 650 | ⊚ | ⊙ |
|  | 81 | 700 | ⊚ | ⊚ |
| Example 1-7 | 1 | 500 | ⊚ | ○ |
|  | 21 | 600 | ⊚ | ○ |
|  | 41 | 600 | ⊚ | ⊙ |
|  | 81 | 700 | ⊚ | ⊚ |
| Example 1-8 | 1 | 500 | ⊚ | ○ |
|  | 21 | 600 | ⊚ | ○ |
|  | 41 | 700 | ⊚ | ⊙ |
|  | 81 | 800 | ⊚ | ⊚ |

EXAMPLE 2-1

The same experiments as in Example 1-1 were conducted except for changing the azulenium salt compound in Example 1-1 to 15 parts by weight of the pyrylium dye represented by the formula 2-1-5 and 4 parts of methylene chloride in Example 1-1 to 20 parts by weight.

EXAMPLE 2-2

By use of a mixed solution containing 1 part by weight of the diacetylene derivative compound, 10 parts by weight of the pyrylium dye and 12 parts by weight of methylene chloride as the coating solution, experiments were conducted according to the same method as in Example 2-1.

Example 2-3

By use of a mixed solution containing 1 part by weight of the diacetylene derivative compound, 5 parts by weight of the pyrylium dye and 12 parts by weight of methylene chloride as the coating solution, experiments were conducted according to the same method as in Example 2-1.

EXAMPLE 2-4

By use of a mixed solution containing 1 part by weight of the diacetylene derivative compound, 1 part by weight of the pyrylium dye and 4 parts by weight of methylene chloride as the coating solution, experiments were conducted according to the same method as in Example 2-1.

EXAMPLE 2-5

By use of a mixed solution containing 5 parts by weight of the diacetylene derivative compound, 1 part by weight of the pyrylium dye and 12 parts by weight of methylene chloride as the coating solution, experiments were conducted according to the same method as in Example 2-1.

EXAMPLE 2-6

By use of a mixed solution containing 10 parts by weight of the diacetylene derivative compound, 1 part by weight of the pyrylium dye and 20 parts by weight of methylene chloride as the coating solution, experiments were conducted according to the same method as in Example 2-1.

EXAMPLE 2-7

By use of a mixed solution containing 15 parts by weight of the diacetylene derivative compound, 1 part by weight of the pyrylium dye and 30 parts by weight of methylene chloride as the coating solution, experiments were conducted according to the same method as in Example 2-1.

COMPARATIVE EXAMPLE 2-1

According to the same method as in Example 2-1 except for using no pyrylium dye and a coating solution of 1 part by weight of the diacetylene derivative compound added to 2 parts by weight of methylene chloride, optical recording media were prepared and subsequently the same experiments as in Example 2-1 were conducted.

COMPARATIVE EXAMPLE 2-2

According to the same method as in Example 2-1 except for using no diacetylene derivative compound and a coating solution of 1 part by weight of the pyrylium dye dissolved in 2 parts by weight of methylene chloride as the coating solution, optical recording media were prepared and subsequently the same experiments as in Example 2-1 were conducted.

The evaluation results of Examples 2-1 to 2-7 and Comparative examples 2-1 and 2-2 are shown in Table 2-1.

TABLE 2-1

| Optical recording medium | Film thickness ($\text{Å}$) | Light irradiation time required for clear pit formation (ns) | Resolution | Contrast ratio |
|---|---|---|---|---|
| Example 2-1 | 500 | 1000 | ◎ | × |
|  | 1000 | 1200 | ◎ | × |
|  | 2000 | 1200 | ◎ | × |
| Example 2-2 | 500 | 800 | ◎ | ○ |
|  | 1000 | 900 | ◎ | ◎ |
|  | 2000 | 900 | ◎ | ◎ |
| Example 2-3 | 500 | 600 | ◎ | ○ |
|  | 1000 | 700 | ◎ | ◎ |
|  | 2000 | 700 | ◎ | ◎ |
| Example 2-4 | 500 | 600 | ◎ | ○ |
|  | 1000 | 700 | ◎ | ◎ |
|  | 2000 | 700 | ◎ | ◎ |
| Example 2-5 | 500 | 600 | ◎ | ○ |
|  | 1000 | 750 | ◎ | ◎ |
|  | 2000 | 750 | ◎ | ◎ |
| Example 2-6 | 500 | 1200 | ○ | × |
|  | 1000 | 1500 | ○ | × |
|  | 2000 | 1500 | ○ | × |
| Example 2-7 | 500 | 1500 | ○ | × |
|  | 1000 | 1900 | ○ | × |
|  | 2000 | 1900 | ○ | × |
| Comparative Example 2-1 | 500 | × | × | × |
|  | 1000 | × | × | × |
|  | 2000 | × | × | × |
| Comparative Example 2-2 | 500 | 1800 | × | × |
|  | 1000 | 2000 | × | × |
|  | 2000 | 2000 | × | × |

EXAMPLE 2-8

Example 1-3 was repeated except for changing the azulenium salt compound represented by Example 1-3 to the pyrylium dye represented by the formula 2-1-5.

COMPARATIVE EXAMPLE 2-3

Comparative example 1-3 was repeated except for changing the azulenium salt compound represented by Example 1-3 to the pyrylium dye represented by the formula 2-1-5.

For the recording medium of Example 2-8, as the result of observation by a microscope, good recording could be practiced when the irradiation time was 1000 ns/pit or longer, but in the case of the recording medium of Comparative example 2-3, an irradiation time of 2000 ns/1 pit or longer was required for forming distinctly one pit.

EXAMPLE 2-9

Experiments were conducted according to the same procedure as in Example 2-3 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$.

EXAMPLE 2-10

According to the same procedure as in Example 2-9 except for using the selenapyrylium dye represented by the formula 2-1-6 in place of the pyrylium dye represented by the formula 2-1-5, experiments were conducted.

EXAMPLES 2-11

According to the same procedure as in Example 2-9 except for using the thiopyrylium dye represented by the formula 2-1-7 in place of the pyrylium dye represented by the formula 2-1-5, experiments were conducted.

EXAMPLE 2-12

According to the same procedure as in Example 2-9 except for using the pyrylium dye represented by the formula 2-1-14 in place of the pyrylium dye represented by the formula 2-1-5, experiments were conducted.

EXAMPLE 2-13

According to the same procedure as in Example 2-9 except for using the thiopyrylium dye represented by the formula 2-1-16 in place of the pyrylium dye represented by the formula 2-1-5, experiments were conducted.

The evaluation results in Examples 2-9 to 2-13 are shown in Table 2-2.

TABLE 2-2

| Optical recording medium | Film thickness | Light irradiation time required for clear pit formation (ns) | Resolution | Contrast ratio |
|---|---|---|---|---|
| Example 2-9 | 500 Å | 800 | ◉ | ○ |
| | 1000 Å | 900 | ◉ | ◉ |
| | 2000 Å | 900 | ◉ | ◉ |
| Example 2-10 | 500 Å | 900 | ◉ | ○ |
| | 1000 Å | 1000 | ○ | ○ |
| | 2000 Å | 1000 | ○ | ○ |
| Example 2-11 | 500 Å | 600 | ◉ | ○ |
| | 1000 Å | 700 | ◉ | ◉ |
| | 2000 Å | 700 | ◉ | ◉ |
| Example 2-12 | 500 Å | 700 | ◉ | ○ |
| | 1000 Å | 800 | ◉ | ◉ |
| | 2000 Å | 800 | ◉ | ◉ |
| Example 2-13 | 500 Å | 600 | ◉ | ○ |
| | 1000 Å | 700 | ◉ | ◉ |
| | 2000 Å | 700 | ◉ | ◉ |

EXAMPLE 2-14

A solution of 1 part by weight of a diacetylene derivative compound represented by $C_{12}H_{25}$—C≡C—C≡C—$C_8H_{16}$—COOH and 1 part by weight of the pyrylium dye represented by the above formula 2-1-5 dissolved at a concentration of $3 \times 10^{-3}$ mole/liter in chloroform was spread on an aqueous phase with pH 6.5 and a cadmium chloride concentration of $1 \times 10^{-3}$ mole/liter. After removal of the solvent chloroform, at a surface pressure maintained constantly, a glass substrate sufficiently cleaned surface was moved vertically in the direction transversing the water surface gently at a speed of 1.0 cm/min to have a mixed monomolecular film of the DA compound and the pyrylium dye transferred onto the substrate. Thus, optical recording media having a mixed monomolecular film and mixed monomolecular built-up films built up in 5 layers, 21 layers and 41 layers formed on the substrate, respectively, were prepared.

On each of the optical recording media thus prepared, UV-ray of 254 nm were irradiated uniformly and sufficiently to convert the recording layer to a blue film, and thereafter optical recording was practiced in the same manner as in Example 2-1 and evaluated. Evaluations of the recording results are shown in Table 2-3.

EXAMPLE 2-15 TO 2-17

The experiments were conducted according to the same method as in Example 2-14 except for changing the amount of the diacetylene derivative compound to 2, 10 and 15 parts by weight per 1 part by weight of the pyrylium dye, respectively.

COMPARATIVE EXAMPLE 2-4

The experiments were conducted according to the same method as in Example 2-14 except for using only the diacetylene derivative compound without use of the pyrylium dye.

The evaluation results in Examples 2-15 to 2-17 and Comparative example 2-4 are shown in Table 2-3.

TABLE 2-3

| Optical recording medium | Built-up number of mono-molecular films | Light irradiation time required for clear pit formation | Resolution | Contrast ratio |
|---|---|---|---|---|
| Example 2-14 | 1 | 500 | ◉ | × |
| | 5 | 500 | ◉ | × |
| | 21 | 600 | ◉ | ◉ |
| | 41 | 600 | ◉ | ◉ |
| Example 2-15 | 1 | 500 | ◉ | × |
| | 5 | 500 | ◉ | × |
| | 21 | 600 | ◉ | ◉ |
| | 41 | 600 | ◉ | ◉ |
| Example 2-16 | 1 | 800 | ◉ | × |
| | 5 | 900 | ◉ | × |
| | 21 | 1000 | ◉ | ◉ |
| | 41 | 1100 | ◉ | ◉ |
| Example 2-17 | 1 | 700 | ◉ | × |
| | 5 | 900 | ◉ | × |
| | 21 | 1000 | ◉ | ◉ |
| | 41 | 1200 | ◉ | ◉ |
| Comparative Example 2-4 | 1 | × | × | × |
| | 5 | × | × | × |
| | 21 | × | × | × |
| | 41 | × | × | × |

EXAMPLE 2-18

According to the same procedure as in Example 2-14 except for using a diacetylene derivative compound represented by $C_8H_{17}$—C≡C—C≡C—$C_2H_4$—COOH in place of the diacetylene derivative compound represented by $C_{12}H_{25}$—C≡C—C≡C—$C_8H_{16}$—COOH, the same experiments were conducted.

EXAMPLES 2-19 to 2-22

According to the same procedure as in Example 2-18 except for using the pyrylium dyes represented by the formulae 2-1-6, 2-1-7, 2-1-14 and 2-1-16, respectively, in place of the pyrylium dye represented by the formula 2-1-5, the experiments were conducted.

The evaluation results of Examples 2-18 to 2-22 are shown in Table 2-4.

TABLE 2-4

| Optical recording medium | Built-up number of mono-molecular films | Light irradiation time required for clear pit formation (ns) | Resolution | Contrast ratio |
|---|---|---|---|---|
| Example 2-18 | 1 | 500 | ◎ | × |
| | 5 | 500 | ◎ | × |
| | 21 | 600 | ◎ | ◎ |
| | 41 | 600 | ◎ | ◎ |
| Example 2-19 | 1 | 500 | ◎ | × |
| | 5 | 600 | ◎ | × |
| | 21 | 600 | ◎ | ◎ |
| | 41 | 700 | ◎ | ◎ |
| Example 2-20 | 1 | 500 | ◎ | × |
| | 5 | 600 | ◎ | × |
| | 21 | 600 | ◎ | ◎ |
| | 41 | 700 | ◎ | ◎ |
| Example 2-21 | 1 | 500 | ◎ | × |
| | 5 | 500 | ◎ | × |
| | 21 | 600 | ◎ | ◎ |
| | 41 | 600 | ◎ | ◎ |
| Example 2-22 | 1 | 500 | ◎ | × |
| | 5 | 500 | ◎ | × |
| | 21 | 600 | ◎ | ◎ |
| | 41 | 700 | ◎ | ◎ |

EXAMPLE 3-1

The same experiments as in Example 1-1 were conducted except for changing the azuelenium salt compound in Example 1-1 to 15 parts by weight of the diene compound represented by the formula 3-1-1 and 4 parts of methylene chloride in Example 1-1 to 30 parts by weight.

EXAMPLE 3-2

By use of a mixed solution containing 1 part by weight of the diacetylene derivative compound, 10 parts by weight of the diene compound salt and 20 parts by weight of methylene chloride as the coating solution, experiments were conducted according to the same method as in Example 3-1.

EXAMPLE 3-3

By use of a mixed solution containing 1 part by weight of the diacetylene derivative compound, 5 parts by weight of the diene compound salt and 12 parts by weight of methylene chloride as the coating solution, experiments were conducted according to the same method as in Example 3-1.

EXAMPLE 3-4

By use of a mixed solution containing 1 part by weight of the diacetylene derivative compound, 1 part by weight of the diene compound and 4 parts by weight of methylene chloride as the coating solution, experiments were conducted according to the same method as in Example 3-1.

EXAMPLE 3-5

By use of a mixed solution containing 5 parts by weight of the diacetylene derivative compound, 1 part by weight of the diene compound salt and 12 parts by weight of methylene chloride as the coating solution, experiments were conducted according to the same method as in Example 3-1.

EXAMPLE 3-6

By use of a mixed solution containing 10 parts by weight of the diacetylene derivative compound, 1 part by weight of the diene compound salt and 20 parts by weight of methylene chloride as the coating solution, experiments were conducted according to the same method as in Example 3-1

EXAMPLE 3-7

By use of a mixed solution containing 15 parts by weight of the diacetylene derivative compound, 1 part by weight of the diene compound salt and 30 parts by weight of methylene chloride as the coating solution, experiments were conducted according to the same method as in Example 3-1.

COMPARATIVE EXAMPLE 3-1

According to the same method as in Example 3-1 except for using no diene compound salt and a coating solution of 1 part by weight of the diacetylene derivative compound added to 2 parts by weight of methylene chloride, optical recording media were prepared and subsequently the same experiments as in Example 3-1 were conducted.

COMPARATIVE EXAMPLE 3-2

According to the same method as in Example 3-1 except for using no diacetylene derivative compound and a coating solution of 1 part by weight of the diene compound salt dissolved in 2 parts by weight of methylene chloride, optical recording media were prepared and subsequently the same experiments as in Example 3-1 were conducted.

The evaluation results of Examples 3-1 to 3-7 and Comparative examples 3-1 and 3-2 are shown in Table 3-1.

TABLE 3-1

| Optical recording medium | Film thickness | Light irradiation time required for clear pit formation | Resolution | Contrast ratio |
|---|---|---|---|---|
| Example 3-1 | 500 Å | 1200 | ◎ | ○ |
| | 1000 Å | 1200 | ◎ | ○ |
| | 2000 Å | 1100 | ○ | ○ |
| Example 3-2 | 500 Å | 900 | ◎ | ○ |
| | 1000 Å | 900 | ◎ | ◎ |
| | 2000 Å | 800 | ◎ | ◎ |
| Example 3-3 | 500 Å | 700 | ◎ | ○ |
| | 1000 Å | 700 | ◎ | ◎ |
| | 2000 Å | 600 | ◎ | ◎ |
| Example 3-4 | 500 Å | 750 | ◎ | ○ |
| | 1000 Å | 700 | ◎ | ◎ |
| | 2000 Å | 650 | ◎ | ◎ |
| Example 3-5 | 500 Å | 800 | ◎ | ○ |
| | 1000 Å | 800 | ◎ | ○ |
| | 2000 Å | 700 | ◎ | ○ |
| Example 3-6 | 500 Å | 1500 | ○ | × |
| | 1000 Å | 1400 | ○ | × |
| | 2000 Å | 1300 | ○ | × |
| Example 3-7 | 500 Å | 1900 | ○ | × |
| | 1000 Å | 1700 | ○ | × |
| | 2000 Å | 1600 | ○ | × |
| Comparative Example 3-1 | 500 Å | × | × | × |
| | 1000 Å | × | × | × |
| | 2000 Å | × | × | × |
| Comparative Example 3-2 | 500 Å | 2000 | ○ | × |
| | 1000 Å | 1800 | ○ | × |
| | 2000 Å | 1800 | ○ | × |

EXAMPLE 3-8

Example 1-3 was repeated except for changing the azulenium salt compound represented by Example 1-3 to the diene compound represented by the formula 3-1-1.

COMPARATIVE EXAMPLE 3-3

Comparative example 1-3 was repeated except for changing the azulenium salt compound represented by Example 1-3 to the diene compound represented by the formula 3-1-1.

For the recording medium of Example 3-8, as the result of observation by a microscope, good recording could be practiced when the irradiation time was 1000 ns/pit or longer, but in the case of the recording medium of Comparative example 3-3, an irradiation time of 1800 ns/pit on longer was required for forming distinctly one pit.

EXAMPLE 3-9

Experiments were conducted according to the same procedure as in Example 3-3 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$.

EXAMPLES 3-10 to 3-14

Experiments were conducted according to the same procedure as in Example 3-9 except for using the diene compound salts represented by the formulae 3-1-3, 3-1-8, 3-1-13, 3-1-15 and 3-1-20, respectively, in place of the diene compound represented by the formula 3-1-1.

The evaluation results in Examples 3-9 to 3-14 are shown in Table 3-2.

TABLE 3-2

| Optical recording medium | Film thickness (Å) | Light irradiation time required for clear pit formation (ns) | Resolution | Contrast ratio |
| --- | --- | --- | --- | --- |
| Example 3-9 | 500 Å | 750 | ◉ | ○ |
|  | 1000 Å | 700 | ◉ | ◉ |
|  | 2000 Å | 700 | ◉ | ◉ |
| Example 3-10 | 500 Å | 800 | ◉ | ○ |
|  | 1000 Å | 800 | ◉ | ○ |
|  | 2000 Å | 750 | ◉ | ◉ |
| Example 3-11 | 500 Å | 700 | ◉ | ◉ |
|  | 1000 Å | 700 | ◉ | ◉ |
|  | 2000 Å | 600 | ◉ | ◉ |
| Example 3-12 | 500 Å | 750 | ◉ | ○ |
|  | 1000 Å | 750 | ◉ | ◉ |
|  | 2000 Å | 700 | ◉ | ◉ |
| Example 3-13 | 500 Å | 800 | ◉ | ○ |
|  | 1000 Å | 800 | ◉ | ○ |
|  | 2000 Å | 750 | ○ | ◉ |
| Example 3-14 | 500 Å | 700 | ◉ | ◉ |
|  | 1000 Å | 700 | ◉ | ◉ |
|  | 2000 Å | 650 | ◉ | ◉ |

EXAMPLE 3-15

Experiments were conducted according to the same procedure as in Example 2-14 except for changing the pyrylium dye in Example 2-14 to 15 parts by weight of the diene compound represented by the formula 3-1-1. However, the built-up layers of the mixed monomolecular film were made 21, 41 or 81 in these experiments.

EXAMPLES 3-16 to 3-18

The experiments were conducted according to the same method as in Example 3-15 except for changing the amount of the diene compound to 10, 5 and 1 part by weight per 1 part by weight of the diacetylene derivative compound, respectively.

COMPARATIVE EXAMPLE 3-4

The experiments were conducted according to the same method as in Example 3-14 except for using only the diacetylene derivative compound without use of the diene compound.

The evaluation results in Examples 3-15 to 3-18 and Comparative example 3-4 are shown in Table 3-3.

TABLE 3-3

| Optical recording medium | Built-up number of monomolecular films | Light irradiation time required for clear pit formation (ns) | Resolution | Contrast ratio |
| --- | --- | --- | --- | --- |
| Example 3-15 | 1 | 1100 | ◉ | × |
|  | 21 | 1050 | ◉ | × |
|  | 41 | 1000 | ◉ | × |
|  | 81 | 950 | ◉ | ○ |
| Example 3-16 | 1 | 950 | ◉ | × |
|  | 21 | 950 | ◉ | ◉ |
|  | 41 | 900 | ◉ | ◉ |
|  | 81 | 850 | ◉ | ◉ |
| Example 3-17 | 1 | 700 | ◉ | × |
|  | 21 | 600 | ◉ | ○ |
|  | 41 | 600 | ◉ | ◉ |
|  | 81 | 500 | ◉ | ◉ |
| Example 3-18 | 1 | 800 | ◉ | × |
|  | 21 | 750 | ◉ | ○ |
|  | 41 | 650 | ◉ | ◉ |
|  | 81 | 600 | ◉ | ◉ |
| Comparative Example 3-4 | 1 | × | × | × |
|  | 21 | × | × | × |
|  | 41 | × | × | × |
|  | 81 | × | × | × |

EXAMPLE 3-19

According to the same procedure as in Example 3-17 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, experiments were conducted.

EXAMPLES 3-20 to 3-24

According to the same procedure as in Example 3-19 except for using the diene compounds represented by the formulae 3-1-3, 3-1-8, 3-1-12, 3-1-15 and 3-1-20, respectively, in place of the diene compound represented by the formula 3-1-1, the experiments were conducted.

The evaluation results of Examples 3-19 to 3-24 are shown in Table 3-4.

TABLE 3-4

| Optical recording medium | Built-up number of monomolecular films | Light irradiation time required for clear pit formation (ns) | Resolution | Contrast ratio |
|---|---|---|---|---|
| Example 3-19 | 1 | 750 | ◎ | × |
|  | 21 | 600 | ◎ | ◎ |
|  | 41 | 550 | ◎ | ◎ |
|  | 81 | 500 | ◎ | ◎ |
| Example 3-20 | 1 | 700 | ◎ | × |
|  | 21 | 600 | ◎ | ○ |
|  | 41 | 600 | ◎ | ◎ |
|  | 81 | 500 | ◎ | ◎ |
| Example 3-21 | 1 | 750 | ◎ | × |
|  | 21 | 700 | ◎ | ○ |
|  | 41 | 650 | ◎ | ◎ |
|  | 81 | 600 | ◎ | ◎ |
| Example 3-22 | 1 | 750 | ◎ | × |
|  | 21 | 700 | ◎ | ○ |
|  | 41 | 700 | ◎ | ◎ |
|  | 81 | 650 | ◎ | ◎ |
| Example 3-23 | 1 | 700 | ◎ | × |
|  | 21 | 600 | ◎ | ○ |
|  | 41 | 600 | ◎ | ◎ |
|  | 81 | 500 | ◎ | ◎ |
| Example 3-24 | 1 | 750 | ◎ | × |
|  | 21 | 600 | ◎ | ◎ |
|  | 41 | 550 | ◎ | ◎ |
|  | 81 | 500 | ◎ | ◎ |

EXAMPLE 4-1

The same experiments as in Example 3-1 were conducted except for changing the diene compound in Example 3-1 to 15 parts by weight of the croconic methine dye represented by the formula 4-1-25.

EXAMPLE 4-2

By use of a mixed solution containing 1 part by weight of the diacetylene derivative compound, 10 parts by weight of the croconic methine dye and 20 parts by weight of methylene chloride as the coating solution, experiments were conducted according to the same method as in Example 4-1.

EXAMPLE 4-3

By use of a mixed solution containing 1 part by weight of the diacetylene derivative compound, 5 parts by weight of the croconic methine dye and 12 parts by weight of methylene chloride as the coating solution, experiments were conducted according to the same method as in Example 4-1.

EXAMPLE 4-4

By use of a mixed solution containing 1 part by weight of the diacetylene derivative compound, 1 part by weight of the croconic methine dye and 4 parts by weight of methylene chloride as the coating solution, experiments were conducted according to the same method as in Example 4-1.

EXAMPLE 4-5

By use of a mixed solution containing 5 parts by weight of the diacetylene derivative compound, 1 part by weight of the croconic methine dye and 12 parts by weight of methylene chloride as the coating solution, experiments were conducted according to the same method as in Example 4-1.

EXAMPLE 4-6

By use of a mixed solution containing 10 parts by weight of the diacetylene derivative compound, 1 part by weight of the croconic methine dye and 20 parts by weight of methylene chloride as the coating solution, experiments were conducted according to the same method as in Example 4-1.

EXAMPLE 4-7

By use of a mixed solution containing 15 parts by weight of the diacetylene derivative compound, 1 part by weight of the croconic methine dye and 30 parts by weight of methylene chloride as the coating solution, experiments were conducted according to the same method as in Example 4-1.

COMPARATIVE EXAMPLE 4-1

According to the same method as in Example 4-1 except for using no croconic methine dye and a coating solution of 1 part by weight of the diacetylene derivative compound added to 2 parts by weight of methylene chloride, the same experiments as in Example 4-1 were conducted.

COMPARATIVE EXAMPLE 4-2

According to the same method as in Example 4-1 except for using no diacetylene derivative compound and a coating solution of 1 part by weight of the croconic methine dye dissolved in 2 parts by weight of methylene chloride, the same experiments as in Example 4-1 were conducted.

The evaluation results of Example 4-1 to 4-7 and Comparative examples 4-1 and 4-2 are shown in Table 4-1.

TABLE 4-1

| Optical recording medium | Film thickness | Light irradiation time required for clear pit formation (ns) | Resolution | Contrast ratio |
|---|---|---|---|---|
| Example 4-1 | 500 Å | 1100 | ◎ | ○ |
|  | 1000 Å | 1100 | ◎ | ○ |
|  | 2000 Å | 1000 | ◎ | ○ |
| Example 4-2 | 500 Å | 900 | ◎ | ◎ |
|  | 1000 Å | 800 | ◎ | ◎ |
|  | 2000 Å | 800 | ◎ | ◎ |
| Example 4-3 | 500 Å | 700 | ◎ | ◎ |
|  | 1000 Å | 600 | ◎ | ◎ |
|  | 2000 Å | 600 | ◎ | ◎ |
| Example 4-4 | 500 Å | 700 | ◎ | ○ |
|  | 1000 Å | 600 | ◎ | ◎ |
|  | 2000 Å | 600 | ◎ | ◎ |
| Example 4-5 | 500 Å | 800 | ◎ | ○ |
|  | 1000 Å | 750 | ◎ | ○ |
|  | 2000 Å | 700 | ◎ | ◎ |
| Example 4-6 | 500 Å | 1400 | ◎ | ○ |
|  | 1000 Å | 1350 | ◎ | ○ |
|  | 2000 Å | 1300 | ◎ | ○ |
| Example 4-7 | 500 Å | 1800 | ◎ | ○ |
|  | 1000 Å | 1600 | ○ | ○ |
|  | 2000 Å | 1500 | ○ | ○ |
| Comparative Example 4-1 | 500 Å | × | × | × |
|  | 1000 Å | × | × | × |
|  | 2000 Å | × | × | × |
| Comparative Example 4-2 | 500 Å | 1900 | ○ | × |
|  | 1000 Å | 1800 | ○ | × |
|  | 2000 Å | 1800 | ○ | × |

EXAMPLE 4-8

By use of a mixed solution containing 1 part by weight of the diacetylene derivative compound, 1 part by weight of the croconic methine dye and 4 parts by weight of methylene chloride and further by use of 2 parts by weight of nitrocellulose as the binder, following otherwise the same procedure as in Example 4-1, an optical recording medium with a thickness of the recording layer of 3000 Å was prepared.

COMPARATIVE EXAMPLE 4-3

Experiments were conducted in the same manner as in Example 4-1 except for using no diacetylene derivative compound and a mixed solution of 2 parts by weight of the croconic methine dye and 2 parts by weight of nitrocellulose dissolved in 4 parts by weight of methylene chloride as the coating solution.

For the optical recording medium of Example 4-8, as the result of observation by a microscope, good recording could be practiced when the irradiation time was 1000 ns/pit or longer, but in the case of the optical recording medium of Comparative example 4-3, an irradiation time of 1800 ns/pit or longer was required for forming distinctly one pit.

EXAMPLE 4-9

Experiments were conducted according to the same procedure as in example 4-3 except for using a diacetylene derivative compound represented by $C_8H_{17}$—C≡C—C≡C—$C_2H_4$—COOH in place of the diacetylene derivative compound represented by $C_{12}H_{25}$—C≡C—C≡C—$C_8H_{16}$—COOH.

EXAMPLES 4-10 to 4-13

According to the same procedure as in Example 4-9 except for using the croconic methine dye represented by the formulae 4-1-2, 4-1-29, 4-1-37 and 4-1-42 in place of the croconic methine dye represented by the formula 4-1-25, experiments were conducted.

The evaluation results in Examples 4-9 to 4-13 are shown in Table 4-2.

TABLE 4-2

| Optical recording medium | Film thickness | Light irradiation time required for clear pit formation (ns) | Resolution | Contrast ratio |
| --- | --- | --- | --- | --- |
| Example 4-9 | 500 Å | 750 | ◎ | ○ |
|  | 1000 Å | 750 | ◎ | ◎ |
|  | 2000 Å | 700 | ◎ | ◎ |
| Example 4-10 | 500 Å | 700 | ◎ | ◎ |
|  | 1000 Å | 600 | ◎ | ◎ |
|  | 2000 Å | 600 | ◎ | ◎ |
| Example 4-11 | 500 Å | 750 | ◎ | ○ |
|  | 1000 Å | 650 | ◎ | ◎ |
|  | 2000 Å | 600 | ◎ | ◎ |
| Example 4-12 | 500 Å | 700 | ◎ | ◎ |
|  | 1000 Å | 650 | ◎ | ◎ |
|  | 2000 Å | 600 | ◎ | ○ |
| Example 4-13 | 500 Å | 750 | ◎ | ○ |
|  | 1000 Å | 650 | ◎ | ◎ |
|  | 2000 Å | 650 | ◎ | ◎ |

EXAMPLE 4-14

Example 3-15 was repeated except that the diene compound used in Example 3-15 was changed to 15 parts by weight of the croconic methine dye represented by the formula 4-1-6.

EXAMPLES 4-15 to 4-17

The experiments were conducted according to the same method as in Example 4-14 except for changing the amount of the croconic methine dye to 10, 5 and 1 parts by weight per 1 part by weight of the diacetylene derivative compound, respectively.

COMPARATIVE EXAMPLE 4-4

The experiments were conducted according to the same method as in Example 4-14 except for using only the diacetylene derivative compound without use of the croconic methine dye.

The evaluation results in Example 4-14 to 4-17 and Comparative example 4-4 are shown in Table 4-3.

TABLE 4-3

| Optical recording medium | Bilt-up number of monomolecular films | Light irradiation time required for clear pit formation (ns) | Resolution | Contrast ratio |
| --- | --- | --- | --- | --- |
| Example 4-14 | 1 | 1100 | ◎ | × |
|  | 21 | 1000 | ◎ | ○ |
|  | 41 | 900 | ◎ | ◎ |
|  | 81 | 900 | ◎ | ◎ |
| Example 4-15 | 1 | 900 | ◎ | × |
|  | 21 | 800 | ◎ | ◎ |
|  | 41 | 800 | ◎ | ◎ |
|  | 81 | 700 | ◎ | ◎ |
| Example 4-16 | 1 | 800 | ◎ | × |
|  | 21 | 700 | ◎ | ◎ |
|  | 41 | 600 | ◎ | ◎ |
|  | 81 | 500 | ◎ | ◎ |
| Example 4-17 | 1 | 800 | ◎ | × |
|  | 21 | 700 | ◎ | ○ |
|  | 41 | 600 | ◎ | ◎ |
|  | 81 | 550 | ◎ | ◎ |
| Comparative Example 4-4 | 1 | × | × | × |
|  | 21 | × | × | × |
|  | 41 | × | × | × |
|  | 81 | × | × | × |

EXAMPLE 4-18

According to the same procedure as in Example 4-16 except for using a diacetylene derivative compound represented by $C_8H_{17}$—C≡C—C≡C—$C_2H_4$—COOH in place of the diacetylene derivative compound represented by $C_{12}H_{25}$—C≡C—C≡C—$C_8H_{16}$-COOH, the same experiments were conducted.

EXAMPLES 4-19 to 4-22

According to the same procedure as in Example 4-18 except for using the croconic methine dyes represented by the formulae 4-1-14, 4-1-24, 4-1-35 and 4-1-39, respectively, in place of the croconic methine dye represented by the formula 4-1-6, the experiments were conducted.

The evaluation results of Examples 4-18 to 4-22 are shown in Table 4-4.

TABLE 4-4

| Optical recording medium | Bilt-up number of monomolecular films | Light irradiation time required for clear pit formation (ns) | Resolution | Contrast ratio |
| --- | --- | --- | --- | --- |
| Example 4-18 | 1 | 850 | ◎ | × |
|  | 21 | 750 | ◎ | ◎ |
|  | 41 | 700 | ◎ | ◎ |

TABLE 4-4-continued

| Optical recording medium | Built-up number of mono-molecular films | Light irradiation time required for clear pit formulation (ns) | Resolution | Contrast ratio |
|---|---|---|---|---|
| | 81 | 600 | ◎ | ◎ |
| | 1 | 800 | ◎ | × |
| | 21 | 700 | ◎ | ◎ |
| Example 4-19 | 41 | 600 | ◎ | ◎ |
| | 81 | 500 | ◎ | ◎ |
| | 1 | 750 | ◎ | × |
| | 21 | 700 | ◎ | ◎ |
| Example 4-20 | 41 | 850 | ◎ | ◎ |
| | 81 | 550 | ◎ | ◎ |
| | 1 | 800 | ◎ | × |
| | 21 | 800 | ◎ | ○ |
| Example 4-21 | 41 | 750 | ◎ | ◎ |
| | 81 | 650 | ◎ | ◎ |
| | 1 | 800 | ◎ | × |
| | 21 | 750 | ◎ | ◎ |
| Example 4-22 | 41 | 700 | ◎ | ◎ |
| | 81 | 600 | ◎ | ◎ |

EXAMPLE 5-1

The same experiments as in Example 3-1 were conducted except for changing the diene compound in Example 3-1 to 15 parts by weight of the polymethine compound represented by the formula 5-1-5.

EXAMPLE 5-2

By use of a mixed solution containing 1 part by weight of the diacetylene derivative compound, 10 parts by weight of the polymethine compound and 20 parts by weight of methylene chloride as the coating solution, experiments were conducted according to the same method as in Example 5-1.

EXAMPLE 5-3

By use of a mixed solution containing 1 part by weight of the diacetylene derivative compound, 5 parts by weight of the polymethine compound and 12 parts by weight of methylene chloride as the coating solution, experiments were conducted according to the same method as in Example 5-1.

EXAMPLE 5-4

By use of a mixed solution containing 1 part by weight of the diacetylene derivative compound, 1 part by weight of the polymethine compound and 4 parts by weight of methylene chloride as the coating solution, experiments were conducted according to the same method as in Example 5-1.

EXAMPLE 5-5

By use of a mixed solution containing 5 parts by weight of the diacetylene derivative compound, 1 part by weight of the polymethine compound and 12 parts by weight of methylene chloride as the coating solution, experiments were conducted according to the same method as in Example 5-1.

EXAMPLE 5-6

By use of a mixed solution containing 10 parts by weight of the diacetylene derivative compound, 1 part by weight of the polymethine compound and 20 parts by weight of methylene chloride as the coating solution, experiments were conducted according to the same method as in Example 5-1.

EXAMPLE 5-7

By use of a mixed solution containing 15 parts by weight of the diacetylene derivative compound, 1 part by weight of the polymethine compound and 30 parts by weight of methylene chloride as the coating solution, experiments were conducted according to the same method as in Example 5-1.

COMPARATIVE EXAMPLE 5-1

According to the same method as in Example 5-1 except for using no polymethine compound and a coating solution of 1 part by weight of the diacetylene derivative compound added to 2 parts by weight of methylene chloride, optical recording media were prepared and subsequently the same experiments as in Example 5-1 were conducted.

COMPARATIVE EXAMPLE 5-2

According to the same method as in Example 5-1 except for using no diacetylene derivative compound and a coating solution of 1 part by weight of the polymethine compound dissolved in 2 parts by weight of methylene chloride, optical recording media were prepared and subsequently the same experiments as in Example 5-1 were conducted.

The evaluation results of Examples 5-1 to 5-7 and Comparative examples 5-1 and 5-2 are shown in Table 5-1.

TABLE 5-1

| Optical recording medium | Film thickness | Light irradiation time required for clear pit formation (ns) | Resolution | Contrast ratio |
|---|---|---|---|---|
| Example 5-1 | 500 Å | 1200 | ◎ | ○ |
| | 1000 Å | 1150 | ◎ | ○ |
| | 2000 Å | 1100 | ◎ | ○ |
| Example 5-2 | 500 Å | 950 | ◎ | ○ |
| | 1000 Å | 900 | ◎ | ◎ |
| | 2000 Å | 850 | ◎ | ◎ |
| Example 5-3 | 500 Å | 750 | ◎ | ◎ |
| | 1000 Å | 700 | ◎ | ◎ |
| | 2000 Å | 600 | ◎ | ◎ |
| Example 5-4 | 500 Å | 800 | ◎ | ◎ |
| | 1000 Å | 750 | ◎ | ◎ |
| | 2000 Å | 700 | ◎ | ◎ |
| Example 5-5 | 500 Å | 850 | ◎ | ◎ |
| | 1000 Å | 750 | ◎ | ◎ |
| | 2000 Å | 700 | ○ | ◎ |
| Example 5-6 | 500 Å | 1550 | ○ | ○ |
| | 1000 Å | 1450 | ○ | ○ |
| | 2000 Å | 1350 | ○ | ○ |
| Example 5-7 | 500 Å | 1900 | ○ | ○ |
| | 1000 Å | 1800 | ○ | ○ |
| | 2000 Å | 1700 | ○ | ○ |
| Comparative Example 5-1 | 500 Å | × | × | × |
| | 1000 Å | × | × | × |
| | 2000 Å | × | × | × |
| Comparative Example 5-2 | 500 Å | 2000 | ◎ | × |
| | 1000 Å | 1900 | ◎ | × |
| | 2000 Å | 1800 | ○ | × |

EXAMPLE 5-8

Example 1-3 was repeated except for changing the azulenium salt compound represented by Example 1-3 to the polymethine compound represented by the formula 5-1-5.

COMPARATIVE EXAMPLE 5-3

Example 5-1 was repeated except for using a solution of 2 parts by weight of the polymethine compound and 2 parts by weight of nitrocellulose dissolved in 4 parts by weight of methylene chloride as the coating solution without use of the diacetylene derivative compound.

For the recording medium of Example 5-8, as the result of observation by a microscope, good recording could be practiced when the irradiation time was 1100 ns/pit or longer, but in the case of the optical recording medium of Comparative example 5-3, an irradiation time of 2200 ns/pit or longer was required for forming distinctly one pit.

EXAMPLE 5-9

Experiments were conducted according to the same procedure as in EXample 5-3 except for using a diacetylene derivative compound represented by $C_8H_{17}—C\equiv C—C\equiv C—C_2H_4—COOH$ in place of the diacetylene derivative compound represented by $C_{12}H_{15}—C\equiv C—C\equiv C—C_8H_{16}—COOH$.

EXAMPLES 5-10 TO 5-14

According to the same procedure as in Example 5-9 except for using the selenapolymethine compound represented by the formulae 5-1-1, 5-1-13, 5-1-20, 5-1-27 and 5-1-35 in place of the polymethine compound represented by the formula 5-1-5, experiments were conducted.

The evaluation results in Examples 5-9 to 5-14 are shown in Table 5-2.

TABLE 5-2

| Optical recording medium | Film thickness | Light irradiation time required for clear pit formation (ns) | Resolution | Contrast ratio |
|---|---|---|---|---|
| Example 5-9 | 500Å | 800 | ◎ | ○ |
|  | 1000Å | 750 | ◎ | ◎ |
|  | 2000Å | 750 | ◎ | ◎ |
| Example 5-10 | 500Å | 750 | ◎ | ◎ |
|  | 1000Å | 700 | ◎ | ◎ |
|  | 2000Å | 600 | ◎ | ◎ |
| Example 5-11 | 500Å | 800 | ◎ | ○ |
|  | 1000Å | 700 | ◎ | ◎ |
|  | 2000Å | 600 | ◎ | ◎ |
| Example 5-12 | 500Å | 850 | ◎ | ○ |
|  | 1000Å | 750 | ◎ | ◎ |
|  | 2000Å | 700 | ○ | ◎ |
| Example 5-13 | 500Å | 800 | ◎ | ○ |
|  | 1000Å | 750 | ◎ | ◎ |
|  | 2000Å | 750 | ○ | ◎ |
| Example 5-14 | 500Å | 750 | ◎ | ◎ |
|  | 1000Å | 750 | ◎ | ◎ |
|  | 2000Å | 650 | ◎ | ◎ |

EXAMPLE 5-15

The same experiments as in Example 3-15 were conducted except for changing the diene compound in Example 3-15 to 15 parts by weight of the polymethine compound represented by the formula 5-1-2.

EXAMPLES 5-16 TO 5-18

The experiments were conducted according to the same method as in Example 5-15 except for changing the amount of the polymethine compound to 10, 5 and 1 parts by weight per 1 part by weight of the diacetylene derivative compound, respectively.

COMPARATIVE EXAMPLE 5-4

The experiments were conducted according to the same method as in Example 5-15 except for using only the diacetylene derivative compound without use of the polymethine dye.

The evaluation results in Examples 5-15 to 5-18 and Comparative example 5-4 are shown in Table 5-3.

TABLE 5-3

| Optical recording medium | Built-up number of monomolecular films | Light irradiation time required for clear pit formation (ns) | Resolution | Contrast ratio |
|---|---|---|---|---|
| Example 5-15 | 1 | 1150 | ◎ | × |
|  | 21 | 1100 | ◎ | × |
|  | 41 | 1000 | ◎ | × |
|  | 81 | 950 | ◎ | ○ |
| Example 5-16 | 1 | 1000 | ◎ | × |
|  | 21 | 950 | ◎ | ○ |
|  | 41 | 900 | ◎ | × |
|  | 81 | 900 | ◎ | × |
| Example 5-17 | 1 | 800 | ◎ | × |
|  | 21 | 700 | ◎ | ◎ |
|  | 41 | 600 | ◎ | ◎ |
|  | 81 | 550 | ◎ | ◎ |
| Example 5-18 | 1 | 800 | ◎ | × |
|  | 21 | 700 | ◎ | ○ |
|  | 41 | 700 | ◎ | ◎ |
|  | 81 | 650 | ◎ | ◎ |
| Comparative Example 5-4 | 1 | × | × | × |
|  | 21 | × | × | × |
|  | 41 | × | × | × |
|  | 81 | × | × | × |

EXAMPLE 5-19

According to the same procedure as in Example 5-15 except for using a diacetylene derivative compound represented by $C_8H_{17}—C\equiv C—C\equiv C—C_2H_4—COOH$ in place of the diacetylene derivative compound represented by $C_{12}H_{25}—C\equiv C—C\equiv C—C_8H_{16}—COOH$, experiments were conducted.

EXAMPLES 5-20 TO 5-24

According to the same procedure as in Example 5-19 except for using the polymethine compounds represented by the formulae 5-1-3, 5-1-15, 5-1-17, 5-1-30 and 5-1-32, respectively, in place of the polymethine compound represented by the formula 5-1-2, the experiments were conducted.

The evaluation results of Examples 5-19 to 5-24 are shown in Table 5-4.

TABLE 5-4

| Optical recording medium | Built-up number of monomolecular films | Light irradiation time required for clear pit formation (ns) | Resolution | Contrast ratio |
|---|---|---|---|---|
| Example 5-19 | 1 | 800 | ◎ | × |
|  | 21 | 750 | ◎ | ○ |
|  | 41 | 650 | ◎ | ◎ |
|  | 81 | 550 | ◎ | ◎ |
| Example 5-20 | 1 | 750 | ◎ | × |
|  | 21 | 700 | ◎ | ○ |
|  | 41 | 650 | ◎ | ◎ |
|  | 81 | 550 | ◎ | ◎ |
| Example 5-21 | 1 | 700 | ◎ | × |
|  | 21 | 650 | ◎ | ◎ |
|  | 41 | 650 | ◎ | ◎ |
|  | 81 | 600 | ◎ | ◎ |
| Example 5-22 | 1 | 800 | ◎ | × |
|  | 21 | 750 | ◎ | ○ |
|  | 41 | 700 | ◎ | ◎ |
|  | 81 | 650 | ◎ | ◎ |
| Example 5-23 | 1 | 750 | ◎ | × |
|  | 21 | 700 | ◎ | ○ |
|  | 41 | 650 | ◎ | ◎ |
|  | 81 | 600 | ◎ | ◎ |
| Example 5-24 | 1 | 800 | ◎ | × |
|  | 21 | 750 | ◎ | ◎ |
|  | 41 | 650 | ◎ | ◎ |

TABLE 5-4-continued

| Optical recording medium | Built-up number of mono-molecular films | Light irradiation time required for clear pit formation (ns) | Resolution | Contrast ratio |
|---|---|---|---|---|
| | 81 | 550 | ◎ | ◎ |

EXAMPLE 6-1

A solution of 1 part by weight of a diacetylene derivative represented by $C_{12}H_{25}-C\equiv C-C\equiv C-C_8H_{16}-COOH$ and 1 part by weight of an azulenium salt compound represented by the above formula 1-1-1 dissolved at a concentration of $3\times10^{-3}$ mole/liter in chloroform was spread on an aqueous phase with pH 6.5 and a cadmium chloride concentration of 1/10 mole/liter. After removal of the solvent chloroform, at a surface pressure maintained constantly, a glass substrate having a hydrophilic surface was moved vertically in the direction transversing the water surface gently at a speed of 1.0 cm/min. to have a mixed monomolecular film of the DA compound and the AZ compound transferred onto the substrate. Thus, optical recording media having a mixed monomolecular film and mixed monomolecular built-up films built up in 21 layers, 41 layers and 81 layers formed on the substrate, respectively, were prepared.

On each of the recording media thus obtained, first UV-rays of 254 nm were irradiated uniformly and sufficiently to make the recording layer a blue film.

Next, optical recording of the present invention was practiced on the recording medium having the recording layer made into a blue film by irradiating a semiconductor laser of a wavelength of 830 nm of which laser output can be varied (maximum output: 10 mW, laser beam diameter: 1 μm, irradiation time: 200 ns/pit Laser output was made 8 mW in the case of pit recording command, while it was made 4 mW in the case of the color change recording command.

Evaluations of the recording results are shown in Table 6-1.

Overall evaluation was conducted above, sensitivity resolution and contrast ratio of the pit portion to the non-pit portion (sharpness) in both recording of pit and color change, and particularly good one was rate as , good one as , and incapability of recording and bad one as x.

EXAMPLE 6-2

Experiments were conducted according to the same procedure as in Example 6-1 except that the amount of the diacetylene derivative compound used was 5 parts by weight and the amount of the azulenium salt compound 1 part by weight.

EXAMPLE 6-3

According to the same procedure as in Example 6-1 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, experiments were conducted in the same manner as in Example 6-1.

EXAMPLE 6-4

According to the same procedure as in Example 6-1 except for using the azulenium salt compound compound represented by the formulae 1-1-6 in place of the azulenium salt compound represented by the formula 1-1-1, experiments were conducted.

EXAMPLE 6-5

The azulenium salt compound represented by the formula 1-1-1 was dissolved in 10 parts by weight of dichloroethylene to prepare a coating solution.

Next, a disc substrate made of a glass (thickness 1.5 mm, diameter 200 mm) was mounted on a spinner coating machine, and the above coating solution was added in a small amount dropwise at the central portion of the disc substrate and thereafter the spinner was rotated at a predetermined rotational number for a predetermined time to effect coating, followed by drying at normal temperature, to prepare a layer containing the azulenium salt compound with a film thickness of 200 Å.

EXAMPLE 6-6

According to the same procedure as in Example 6-5 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, a recording medium was obtained, optical recording was effected thereon and the recording results were evaluated. The results are shown in Table 6-1.

EXAMPLE 6-7

According to the same procedure as in Example 6-5 except for using the azulenium salt compound represented by the formula 1-1-13 in place of the azulenium salt compound represented by the formula 1-1-1, the experiments were conducted.

The results of Examples 6-1 to 6-7 are shown in Table 6-1.

TABLE 6-1

| Recording medium | Built-up number | Sensitivity | | Resolution | | Sharpness | |
|---|---|---|---|---|---|---|---|
| Example 6-1 | 1 | ○ | ○ | ○ | ○ | ○ | ○ |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 6-2 | 1 | ○ | ○ | ○ | ○ | ○ | ○ |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 6-3 | 1 | ○ | ○ | ○ | ○ | ○ | ○ |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |

| Recording medium | Built-up number | Sensitivity | | Resolution | | Sharpness | |
|---|---|---|---|---|---|---|---|
| | | *1 | *2 | *1 | *2 | *1 | *2 |
| Example 6-4 | 1 | ○ | ○ | ○ | ○ | ○ | ○ |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 6-5 | 41 | ◎ | ◎ | ◎ | ◎ | ◎ | ◎ |
| | 81 | ◎ | ◎ | ◎ | ◎ | ◎ | ◎ |
| Example 6-6 | 41 | ◎ | ◎ | ◎ | ◎ | ◎ | ◎ |
| | 81 | ◎ | ◎ | ◎ | ◎ | ◎ | ◎ |
| Example 6-7 | 41 | ◎ | ◎ | ◎ | ◎ | ◎ | ◎ |
| | 81 | ◎ | ◎ | ◎ | ◎ | ◎ | ◎ |

*1: color change recording
*2: pit recording

EXAMPLE 7-1

The same experiments were conducted in the same manner as in Example 6-1 except for using 15 parts by weight of the pyrylium dye represented by the formula 2-1-5 in place of the azulenium salt compound.

EXAMPLES 7-2 TO 7-4

The same experiment as in Example 7-1 was repeated except that the amount of the pyrylium dye was varied to 10, 5 and 1 part by weight, respectively, per 1 part by weight of the diacetylene derivative.

EXAMPLES 7-5 TO 7-7

The same experiment as in Example 7-1 was repeated except that the amount of the diacetylene derivative compound was changed to 5, 10 and 15 parts by weight, respectively, per 1 part by weight of the pyrylium dye.

The results of Examples 7-1 to 7-7 are shown in Table 7-1.

TABLE 7-1

| Optical recording medium | Built-up number of monomolecular films | Sensitivity | | Resolution | | Contrast ratio | |
|---|---|---|---|---|---|---|---|
| | | Color change | Pit | Color change | Pit | Color change | Pit |
| Example 7-1 | 1 | × | ○ | × | ◎ | × | × |
| | 21 | ○ | ○ | ◎ | ◎ | × | ○ |
| | 41 | ○ | ○ | ◎ | ◎ | ○ | ◎ |
| | 81 | ○ | ○ | ◎ | ◎ | ○ | ◎ |
| Example 7-2 | 1 | × | ◎ | × | ◎ | × | × |
| | 21 | ○ | ◎ | ◎ | ◎ | × | ◎ |
| | 41 | ○ | ◎ | ◎ | ◎ | ○ | ◎ |
| | 81 | ○ | ◎ | ◎ | ◎ | ○ | ◎ |
| Example 7-3 | 1 | ◎ | ◎ | ◎ | ◎ | × | × |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 7-4 | 1 | ◎ | ◎ | ◎ | ◎ | × | × |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 7-5 | 1 | ◎ | ○ | ◎ | ◎ | × | × |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 7-6 | 1 | ◎ | × | ◎ | × | × | × |
| | 21 | ◎ | × | ◎ | × | ◎ | × |
| | 41 | ◎ | ○ | ◎ | ○ | ◎ | ○ |
| | 81 | ◎ | ○ | ◎ | ○ | ◎ | ○ |
| Example 7-7 | 1 | ○ | × | ◎ | × | × | × |
| | 21 | ○ | × | ◎ | × | ◎ | × |
| | 41 | ○ | × | ◎ | × | ◎ | × |
| | 81 | ○ | ○ | ◎ | ○ | ◎ | × |

EXAMPLE 7-8

Experiments were conducted according to the same procedure as in Example 7-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$.

EXAMPLE 7-9 TO 7-12

Experiments were conducted according to the same procedure as in Example 7-8 except for using the selenapyrylium dye represented by the formula 2-1-6, the thiopyrylium dye represented by the formula 2-1-7, the pyrylium dye represented by the formula 2-1-14 and the thiopyrylium dye represented by the formula 2-1-16, respectively, in place of the pyrylium dye represented by the formula 2-1-5 in Example 7-8.

The results of Examples 7-8 to 7-12 are shown in Table 7-2.

TABLE 7-2

| Optical recording medium | Built-up number of monomolecular films | Sensitivity | | Resolution | | Contrast ratio | |
|---|---|---|---|---|---|---|---|
| | | Color change | Pit | Color change | Pit | Color change | Pit |
| Example 7-8 | 1 | ◎ | ◎ | ◎ | ◎ | × | × |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 7-9 | 1 | ◎ | ◎ | ◎ | ◎ | × | × |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 7-10 | 1 | ○ | ○ | ○ | ○ | × | × |
| | 21 | ○ | ○ | ○ | ○ | ○ | ○ |
| | 41 | ○ | ○ | ○ | ○ | ○ | ○ |
| | 81 | ○ | ○ | ○ | ○ | ○ | ○ |
| Example 7-11 | 1 | ◎ | ◎ | ◎ | ◎ | × | × |
| | 21 | ◎ | ◎ | ◎ | ◎ | ○ | ○ |
| | 41 | ◎ | ◎ | ◎ | ◎ | ◎ | ◎ |
| | 81 | ◎ | ◎ | ◎ | ◎ | ◎ | ◎ |
| Example 7-12 | 1 | ◎ | ◎ | ◎ | ◎ | × | × |
| | 21 | ◎ | ◎ | ○ | ○ | ○ | ○ |
| | 41 | ◎ | ◎ | ◎ | ◎ | ◎ | ◎ |
| | 81 | ◎ | ◎ | ◎ | ◎ | ◎ | ◎ |

EXAMPLE 7-13

Ten (10) parts by weight of the pyrylium dye represented by the above formula 2-1-5 were dissolved in 20 parts by weight of methylene chloride to prepare a coating solution.

Next, a disc substrate made of a glass (thickness 1.5 mm, diameter 200 mm) was mounted on a spinner coating machine, and the above coating solution was added in a small amount dropwise at the central portion of the disc substrate and thereafter the spinner was rotated at a predetermined rotational number for a predetermined time to effect coating, followed by drying at normal temperature, to prepare a layer containing the pyrylium dye on the substrate.

After the layer containing the pyrylium dye was thus formed, a solution of a DA compound represented by $C_{12}H_{25}$—C≡C—C≡C—$C_8H_{16}$—COOH dissolved at a concentration of $3 \times 10^{-3}$ mole/liter in chloroform was spread on an aqueous phase with pH 6.5 and a cadmium chloride concentration of $1 \times 10^{-3}$ mole/liter. After removal of the solvent chloroform, at a surface pressure maintained constantly, a galss substrate having a sufficiently clean surface with the layer containing the pyrylium dye formed thereon was moved vertically in the direction transversing the water surface gently at a speed of 1.0 cm/min to have a monomolecular film of the DA compound transferred onto the surface of the layer containing the pyrylium dye. Thus, optical recording media having a monomolecular film of the DA compound or mixed monomolecular built-up films built up in desired number of layers formed on the layer containing the pyrylium dye, respectively, were prepared.

By varying the film thickness of the layer containing the pyrylium dye and the built-up number of the above monomolecular films variously as shown in Table 7-3,

TABLE 7-3

| Sample No. | Built-up number of DA compound monomolecular films | Film thickness of layer containing pyrylium dye (Å) |
|---|---|---|
| 7-13-1 | 1 | 100 |
| 7-13-2 | " | 200 |
| 7-13-3 | " | 1000 |
| 7-13-4 | " | 3000 |
| 7-13-5 | " | 6000 |
| 7-13-6 | 7 | 100 |
| 7-13-7 | " | 200 |
| 7-13-8 | " | 1000 |
| 7-13-9 | " | 3000 |
| 7-13-10 | " | 6000 |
| 7-13-11 | " | 100 |
| 7-13-12 | " | 200 |
| 7-13-13 | " | 1000 |
| 7-13-14 | 41 | 3000 |
| 7-13-15 | " | 6000 |
| 7-13-16 | 101 | 100 |
| 7-13-17 | " | 200 |
| 7-13-18 | " | 1000 |
| 7-13-19 | " | 3000 |
| 7-13-20 | " | 6000 |
| 7-13-21 | 201 | 100 |
| 7-13-22 | " | 200 |
| 7-13-23 | " | 1000 |
| 7-13-24 | " | 3000 |
| 7-13-25 | " | 6000 |

25 kinds of optical recording media of samples 7-13-1 to 7-13-25 were obtained.

After UV-rays of 254 nm were irradiated uniformly and sufficiently on each of the optical recording media thus obtained to convert the recording layer to a blue film, optical recording was practiced in the same manner as in Example 7-1. The results are shown in Table 7-4.

TABLE 7-4

| Sample No. | Sensitivity | | Resolution | | Contrast ratio | |
|---|---|---|---|---|---|---|
| | Color change | Pit | Color change | Pit | Color change | Pit |
| 7-13-1 | ◉ | x | ◉ | x | x | x |
| 7-13-2 | ◉ | o | ◉ | o | x | x |
| 7-13-3 | ◉ | o | ◉ | o | x | o |
| 7-13-4 | ◉ | x | ◉ | x | x | x |
| 7-13-5 | ◉ | x | ◉ | x | x | x |
| 7-13-6 | ◉ | o | ◉ | ◉ | x | x |
| 7-13-7 | ◉ | ◉ | ◉ | ◉ | x | o |
| 7-13-8 | ◉ | ◉ | ◉ | ◉ | x | ◉ |
| 7-13-9 | ◉ | x | ◉ | ◉ | x | x |
| 7-13-10 | ◉ | x | ◉ | ◉ | x | x |
| 7-13-11 | o | o | o | o | x | x |
| 7-13-12 | ◉ | ◉ | ◉ | ◉ | ◉ | x |
| 7-13-13 | ◉ | ◉ | ◉ | ◉ | ◉ | ◉ |
| 7-13-14 | ◉ | ◉ | ◉ | ◉ | ◉ | ◉ |
| 7-13-15 | ◉ | ◉ | ◉ | ◉ | ◉ | ◉ |
| 7-13-16 | x | x | x | x | x | x |
| 7-13-17 | o | x | ◉ | x | ◉ | x |
| 7-13-18 | ◉ | ◉ | ◉ | ◉ | ◉ | ◉ |
| 7-13-19 | ◉ | ◉ | ◉ | ◉ | ◉ | ◉ |
| 7-13-20 | ◉ | ◉ | ◉ | ◉ | ◉ | ◉ |
| 7-13-21 | x | x | x | x | x | x |
| 7-13-22 | x | x | x | x | x | x |
| 7-13-23 | ◉ | ◉ | ◉ | ◉ | ◉ | ◉ |
| 7-13-24 | ◉ | ◉ | ◉ | ◉ | ◉ | ◉ |
| 7-13-25 | ◉ | ◉ | ◉ | ◉ | ◉ | ◉ |

EXAMPLE 7-14

According to the same procedure as in Example 7-13 except for using a diacetylene derivative compound represented by $C_8H_{17}$—C≡C—C≡C—$C_2H_4$—COOH in place of the diacetylene derivative compound represented by $C_{12}H_{25}$—C≡C—C≡C—$C_8H_{16}$—COOH, 25 kinds of recording media of samples 7-14-1 to 7-14-25 as shown in Table 7-5 were obtained.

TABLE 7-5

| Sample No. | Built-up number of DA compound monomolecular films | Film thickness of layer containing pyrylium dye (Å) |
|---|---|---|
| 7-14-1 | 1 | 100 |
| 7-14-2 | " | 200 |
| 7-14-3 | " | 1000 |
| 7-14-4 | " | 3000 |
| 7-14-5 | " | 6000 |
| 7-14-6 | 7 | 100 |
| 7-14-7 | " | 200 |
| 7-14-8 | " | 1000 |
| 7-14-9 | " | 3000 |
| 7-14-10 | " | 6000 |
| 7-14-11 | 41 | 100 |
| 7-14-12 | " | 200 |
| 7-14-13 | " | 1000 |
| 7-14-14 | " | 3000 |
| 7-14-15 | " | 6000 |
| 7-14-16 | 101 | 100 |
| 7-14-17 | " | 200 |
| 7-14-18 | " | 1000 |
| 7-14-19 | " | 3000 |
| 7-14-20 | " | 6000 |
| 7-14-21 | 201 | 100 |
| 7-14-22 | " | 200 |
| 7-14-23 | " | 1000 |
| 7-14-24 | " | 3000 |
| 7-14-25 | " | 6000 |

On each of the recording media thus obtained, UV-rays of 254 nm were irradiated uniformly and sufficiently to convert the recording layer to a blue film, and then optical recording was practiced in the same manner as in Example 7-1. The results are shown in Table 7-6.

TABLE 7-6

| Sample No. | Sensitivity | | Resolution | | Contrast ratio | |
|---|---|---|---|---|---|---|
| | Color change | Pit | Color change | Pit | Color change | Pit |
| 7-14-1 | ◎ | x | ◎ | x | x | x |
| 7-14-2 | ◎ | o | ◎ | o | x | x |
| 7-14-3 | ◎ | o | ◎ | ◎ | x | o |
| 7-14-4 | ◎ | x | ◎ | x | x | x |
| 7-14-5 | ◎ | x | ◎ | x | x | x |
| 7-14-6 | ◎ | x | ◎ | x | x | x |
| 7-14-7 | ◎ | o | ◎ | o | x | o |
| 7-14-8 | ◎ | ◎ | ◎ | ◎ | x | o |
| 7-14-9 | ◎ | x | ◎ | ◎ | x | x |
| 7-14-10 | ◎ | x | ◎ | ◎ | x | x |
| 7-14-11 | o | x | o | x | x | x |
| 7-14-12 | ◎ | ◎ | ◎ | ◎ | ◎ | x |
| 7-14-13 | ◎ | ◎ | ◎ | ◎ | ◎ | ◎ |
| 7-14-14 | ◎ | ◎ | ◎ | ◎ | ◎ | ◎ |
| 7-14-15 | ◎ | ◎ | ◎ | ◎ | ◎ | ◎ |
| 7-14-16 | x | x | x | x | x | x |
| 7-14-17 | o | x | o | x | o | x |
| 7-14-18 | ◎ | ◎ | ◎ | ◎ | ◎ | ◎ |
| 7-14-19 | ◎ | ◎ | ◎ | ◎ | ◎ | ◎ |
| 7-14-20 | ◎ | ◎ | ◎ | ◎ | ◎ | ◎ |
| 7-14-21 | x | x | x | x | x | x |
| 7-14-22 | x | x | x | x | x | x |
| 7-14-23 | ◎ | ◎ | ◎ | ◎ | ◎ | ◎ |
| 7-14-24 | ◎ | ◎ | ◎ | ◎ | ◎ | ◎ |
| 7-14-25 | ◎ | ◎ | ◎ | ◎ | ◎ | ◎ |

EXAMPLE 7-15

According to the same procedure as in Example 7-14 except for using the thiopyrylium dye represented by the formula 2-1-1 in place of the pyrylium dye represented by the formula 2-1-5 for forming the layer containing the pyrylium dye, 25 kinds of optical recording media of samples No. 7-15-1 to 7-15-25 as shown in Table 7-7 were obtained and the results are shown in Table 7-8.

TABLE 7-7

| Sample No. | Built-up number of DA compound monomolecular films | Film thickness of layer containing pyrylium dye (Å) |
|---|---|---|
| 7-15-1 | 1 | 100 |
| 7-15-2 | " | 200 |
| 7-15-3 | " | 1000 |
| 7-15-4 | " | 3000 |
| 7-15-5 | " | 6000 |
| 7-15-6 | 7 | 100 |
| 7-15-7 | " | 200 |
| 7-15-8 | " | 1000 |
| 7-15-9 | " | 3000 |
| 7-15-10 | " | 6000 |
| 7-15-11 | 41 | 100 |
| 7-15-12 | " | 200 |
| 7-15-13 | " | 1000 |
| 7-15-14 | " | 3000 |
| 7-15-15 | " | 6000 |
| 7-15-16 | 101 | 100 |
| 7-15-17 | " | 200 |
| 7-15-18 | " | 1000 |
| 7-15-19 | " | 3000 |
| 7-15-20 | " | 6000 |
| 7-15-21 | 201 | 100 |
| 7-15-22 | " | 200 |
| 7-15-23 | " | 1000 |
| 7-15-24 | " | 3000 |
| 7-15-25 | " | 6000 |

TABLE 7-8

| Sample No. | Sensitivity | | Resolution | | Contrast ratio | |
|---|---|---|---|---|---|---|
| | Color change | Pit | Color change | Pit | Color change | Pit |
| 7-15-1 | ◎ | x | ◎ | x | x | x |
| 7-15-2 | ◎ | o | ◎ | o | x | x |
| 7-15-3 | ◎ | o | ◎ | o | x | o |
| 7-15-4 | ◎ | x | ◎ | x | x | x |
| 7-15-5 | ◎ | x | ◎ | x | x | x |
| 7-15-6 | ◎ | o | ◎ | ◎ | x | x |
| 7-15-7 | ◎ | o | ◎ | ◎ | x | o |
| 7-15-8 | ◎ | o | ◎ | ◎ | x | ◎ |
| 7-15-9 | ◎ | x | ◎ | o | x | x |
| 7-15-10 | ◎ | x | ◎ | o | x | x |
| 7-15-11 | o | o | o | o | x | x |
| 7-15-12 | ◎ | ◎ | ◎ | ◎ | ◎ | x |
| 7-15-13 | ◎ | ◎ | ◎ | ◎ | ◎ | ◎ |
| 7-15-14 | ◎ | ◎ | ◎ | ◎ | ◎ | ◎ |
| 7-15-15 | ◎ | ◎ | ◎ | ◎ | ◎ | ◎ |
| 7-15-16 | x | x | x | x | x | x |
| 7-15-17 | x | x | x | x | x | x |
| 7-15-18 | ◎ | ◎ | ◎ | ◎ | ◎ | ◎ |
| 7-15-19 | ◎ | ◎ | ◎ | ◎ | ◎ | ◎ |
| 7-15-20 | ◎ | ◎ | ◎ | ◎ | ◎ | ◎ |
| 7-15-21 | x | x | x | x | x | x |
| 7-15-22 | x | x | x | x | x | x |
| 7-15-23 | ◎ | ◎ | ◎ | ◎ | ◎ | ◎ |
| 7-15-24 | ◎ | ◎ | ◎ | ◎ | ◎ | ◎ |
| 7-15-25 | ◎ | ◎ | ◎ | ◎ | ◎ | ◎ |

EXAMPLE 7-16

The same experiments as in Example 7-15 were conducted except for changing the thiopyrylium to the selenapyrylium represented by the formula 2-1-6. The results are shown in Table 7-9 and 7-10.

TABLE 7-9

| Sample No. | Built-up number of DA compound monomolecular films | Film thickness of layer containing pyrylium dye (521) |
|---|---|---|
| 7-16-1 | 1 | 100 |
| 7-16-2 | " | 200 |
| 7-16-3 | " | 1000 |
| 7-16-4 | " | 3000 |
| 7-16-5 | " | 6000 |
| 7-16-6 | 7 | 100 |
| 7-16-7 | " | 200 |
| 7-16-8 | " | 1000 |
| 7-16-9 | " | 3000 |
| 7-16-10 | " | 6000 |
| 7-16-11 | 41 | 100 |
| 7-16-12 | " | 200 |
| 7-16-13 | " | 1000 |
| 7-16-14 | " | 3000 |
| 7-16-15 | " | 6000 |
| 7-16-16 | 101 | 100 |
| 7-16-17 | " | 200 |
| 7-16-18 | " | 1000 |
| 7-16-19 | " | 3000 |

TABLE 7-9 - Continued

| | | |
|---|---|---|
| 7-16-20 | " | 6000 |
| 7-16-21 | 201 | 100 |
| 7-16-22 | " | 200 |
| 7-16-23 | " | 1000 |
| 7-16-24 | " | 3000 |
| 7-16-25 | " | 6000 |

TABLE 7-10

| Sample No. | Sensitivity | | Resolution | | Contrast ratio | |
|---|---|---|---|---|---|---|
| | Color change | Pit | Color change | Pit | Color change | Pit |
| 7-16-1 | ◎ | x | ◎ | x | x | x |
| 7-16-2 | ◎ | o | ◎ | o | x | x |
| 7-16-3 | ◎ | o | ◎ | o | x | o |
| 7-16-4 | ◎ | x | ◎ | x | x | x |
| 7-16-5 | ◎ | x | ◎ | x | x | x |
| 7-16-6 | ◎ | o | ◎ | ◎ | x | x |
| 7-16-7 | ◎ | o | ◎ | ◎ | x | o |
| 7-16-8 | ◎ | ◎ | ◎ | ◎ | x | o |
| 7-16-9 | ◎ | x | ◎ | o | x | x |
| 7-16-10 | ◎ | x | ◎ | o | x | x |
| 7-16-11 | o | o | o | o | x | x |
| 7-16-12 | o | o | ◎ | ◎ | ◎ | x |
| 7-16-13 | ◎ | ◎ | ◎ | ◎ | ◎ | ◎ |
| 7-16-14 | ◎ | ◎ | ◎ | ◎ | ◎ | ◎ |
| 7-16-15 | ◎ | ◎ | ◎ | ◎ | ◎ | ◎ |
| 7-16-16 | x | x | x | x | x | x |
| 7-16-17 | o | x | o | x | o | x |
| 7-16-18 | ◎ | ◎ | ◎ | ◎ | ◎ | ◎ |
| 7-16-19 | ◎ | ◎ | ◎ | ◎ | ◎ | ◎ |
| 7-16-20 | ◎ | ◎ | ◎ | ◎ | ◎ | ◎ |
| 7-16-21 | x | x | x | x | x | x |
| 7-16-22 | x | x | x | x | x | x |
| 7-16-23 | ◎ | ◎ | ◎ | ◎ | ◎ | ◎ |
| 7-16-24 | ◎ | ◎ | ◎ | ◎ | ◎ | ◎ |
| 7-16-25 | ◎ | ◎ | ◎ | ◎ | ◎ | ◎ |

EXAMPLE 8-1

The same experiments were conducted in the same manner as in Example 6-1 except for using 15 parts by weight of the diene compound represented by the formula 3-1-1 in place of the azulenium salt compound.

EXAMPLES 8-2 TO 8-4

The same experiment as in Example 8-1 was repeated except that the amount of the diene compound was varied to 10, 5 and 1 part by weight, respectively, per 1 part by weight of the diacetylene derivative.

EXAMPLES 8-5 TO 8-7

The same experiment as in Example 8-1 was repeated except that the amount of the diacetylene derivative compound was changed to 5, 10 and 15 parts by weight, respectively, per 1 part by weight of the diene compound.

The results of Examples 8-1 to 8-7 are shown in Table 8-1.

TABLE 8-1

| Optical recording medium | Built-up number of accumulated color films | Sensitivity | | Resolution | | Contrast ratio | |
|---|---|---|---|---|---|---|---|
| | | Color change | Pit | Color change | Pit | Color change | Pit |
| Example 8-1 | 1 | x | ● | x | ● | x | x |
| | 21 | x | ● | x | ● | x | o |
| | 41 | x | ● | x | ● | x | ● |
| | 81 | o | ● | o | ● | o | ● |
| Example 8-2 | 1 | x | ● | x | ● | x | x |
| | 21 | o | ● | o | ● | x | ● |
| | 41 | o | ● | o | ● | x | ● |
| | 81 | o | ● | o | ● | o | ● |
| Example 8-3 | 1 | o | ● | o | ● | x | x |
| | 21 | o | ● | o | ● | o | ● |
| | 41 | ● | ● | ● | ● | ● | ● |
| | 81 | ● | ● | ● | ● | ● | ● |
| Example 8-4 | 1 | ● | ● | ● | ● | x | x |
| | 21 | ● | ● | ● | ● | ● | ● |
| | 41 | ● | ● | ● | ● | ● | ● |
| | 81 | ● | ● | ● | ● | ● | ● |
| Example 8-5 | 1 | ● | ● | ● | ● | x | x |
| | 21 | ● | ● | ● | ● | ● | ● |
| | 41 | ● | ● | ● | ● | ● | ● |
| | 81 | ● | ● | ● | ● | ● | ● |
| Example 8-6 | 1 | x | x | x | x | x | x |
| | 21 | o | o | o | o | o | o |
| | 41 | o | o | o | o | o | o |
| | 81 | o | o | o | o | o | o |
| Example 8-7 | 1 | x | x | x | x | x | x |
| | 21 | x | x | x | x | x | x |
| | 41 | o | o | o | o | o | o |
| | 81 | o | o | o | o | o | o |

EXAMPLE 8-8

Experiments were conducted according to the same procedure as in Example 8-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$.

EXAMPLES 8-9 TO 8-13

Experiments were conducted according to the same procedure as in Example 8-8 except for using the diene compound salt represented by the formula 3-1-3, 3-1-8, 3-1-12, 3-1-15 and 3-1-20 in place of the diene compound salt represented by the formula 3-1-1.

The results of Examples 8-8 to 8-13 are shown in Table 8-2.

TABLE 8-2

| Optical recording medium | Built-up number of accumulated color films | Sensitivity | | Resolution | | Contrast ratio | |
|---|---|---|---|---|---|---|---|
| | | Color change | Pit | Color change | Pit | Color change | Pit |
| Example 8-8 | 1 | ● | ● | ● | ● | x | x |
| | 21 | ● | ● | ● | ● | ● | ● |
| | 41 | ● | ● | ● | ● | ● | ● |
| | 81 | ● | ● | ● | ● | ● | ● |
| Example 8-9 | 1 | ● | ● | ● | ● | x | x |
| | 21 | o | ● | o | ● | o | ● |
| | 41 | ● | ● | ● | ● | ● | ● |
| | 81 | ● | ● | ● | ● | ● | ● |
| Example 8-10 | 1 | ● | ● | ● | ● | x | x |
| | 21 | ● | o | ● | o | ● | o |
| | 41 | ● | ● | ● | ● | ● | ● |
| | 81 | ● | ● | ● | ● | ● | ● |
| Example 8-11 | 1 | ● | ● | ● | ● | x | x |
| | 21 | o | o | o | o | o | o |
| | 41 | ● | ● | ● | ● | ● | ● |
| | 81 | ● | ● | ● | ● | ● | ● |
| Example 8-12 | 1 | ● | ● | ● | ● | x | x |
| | 21 | ● | ● | ● | ● | ● | ● |
| | 41 | ● | ● | ● | ● | ● | ● |
| | 81 | ● | ● | ● | ● | ● | ● |
| Example 8-13 | 1 | ● | ● | ● | ● | x | x |
| | 21 | o | o | o | o | o | o |
| | 41 | o | o | o | o | o | ● |
| | 81 | ● | ● | ● | ● | ● | ● |

EXAMPLE 8-14

The experiments as in Example 7-13 were conducted except for changing the pyrylium dye in Example 7-13 to 10 parts by weight of the diene compound salt represented by the formula 3-1-1.

By varying the film thickness of the layer containing the diene compound salt and the built-up number of the above monomolecular films variously as shown in Table 8-3, 25 kinds of recording media of samples 8-14-1 to 8-14-25 were obtained.

After UV-rays of 254 nm were irradiated uniformly and sufficiently on each of the optical recording media thus obtained to convert the recording layer to a blue film, optical recording was practiced in the same manner as in Example 8-1. The results are shown in Table 8-4.

TABLE 8-3

| Sample No. | Built-up number of DA compound monomolecular films | Film thickness of layer containing diene compound salt (Å) |
|---|---|---|
| 8-14-1 | 1 | 100 |
| 8-14-2 | " | 200 |
| 8-14-3 | " | 1000 |
| 8-14-4 | " | 3000 |
| 8-14-5 | " | 6000 |
| 8-14-6 | 7 | 100 |
| 8-14-7 | " | 200 |
| 8-14-8 | " | 1000 |
| 8-14-9 | " | 3000 |
| 8-14-10 | " | 6000 |
| 8-14-11 | 41 | 100 |
| 8-14-12 | " | 200 |
| 8-14-13 | " | 1000 |
| 8-14-14 | " | 3000 |
| 8-14-15 | " | 6000 |
| 8-14-16 | 101 | 100 |
| 8-14-17 | " | 200 |
| 8-14-18 | " | 1000 |
| 8-14-19 | " | 3000 |
| 8-14-20 | " | 6000 |
| 8-14-21 | 201 | 100 |
| 8-14-22 | " | 200 |
| 8-14-23 | " | 1000 |
| 8-14-24 | " | 3000 |
| 8-14-25 | " | 6000 |

TABLE 8-4

| Sample No. | Sensitivity | | Resolution | | Contrast ratio | |
|---|---|---|---|---|---|---|
| | Color change | Pit | Color change | Pit | Color change | Pit |
| 8-14-1 | ◉ | ◉ | ○ | ◉ | x | x |
| 8-14-2 | ◉ | ◉ | ○ | ◉ | x | x |
| 8-14-3 | ◉ | ◉ | ○ | ◉ | x | ◉ |
| 8-14-4 | ◉ | ◉ | ○ | ◉ | x | ◉ |
| 8-14-5 | ◉ | ◉ | ○ | ◉ | x | ◉ |
| 8-14-6 | ◉ | ◉ | ○ | ◉ | x | x |
| 8-14-7 | ◉ | ◉ | ○ | ◉ | x | x |
| 8-14-8 | ◉ | ◉ | ○ | ◉ | x | ◉ |
| 8-14-9 | ◉ | ◉ | ○ | ◉ | x | ◉ |
| 8-14-10 | ◉ | ◉ | ○ | ◉ | x | ◉ |
| 8-14-11 | ○ | ◉ | ○ | ◉ | ○ | x |
| 8-14-12 | ○ | ◉ | ○ | ◉ | ○ | x |
| 8-14-13 | ◉ | ◉ | ◉ | ◉ | ◉ | ◉ |
| 8-14-14 | ◉ | ◉ | ◉ | ◉ | ◉ | ◉ |
| 8-14-15 | ◉ | ◉ | ◉ | ◉ | ◉ | ◉ |
| 8-14-16 | x | ◉ | x | ◉ | x | x |
| 8-14-17 | ○ | ◉ | ○ | ◉ | ○ | x |
| 8-14-18 | ◉ | ◉ | ◉ | ◉ | ◉ | ◉ |
| 8-14-19 | ◉ | ◉ | ◉ | ◉ | ◉ | ◉ |
| 8-14-20 | ◉ | ◉ | ◉ | ○ | ◉ | ◉ |
| 8-14-21 | x | ◉ | x | ◉ | x | x |
| 8-14-22 | x | ◉ | x | ◉ | x | x |
| 8-14-23 | ○ | ◉ | ○ | ◉ | ○ | ◉ |
| 8-14-24 | ◉ | ◉ | ◉ | ○ | ◉ | ◉ |
| 8-14-25 | ◉ | ◉ | ◉ | ○ | ◉ | ◉ |

TABLE 8-5

| Sample No. | Built-up number of DA compound monomolecular films | Film thickness of layer containing diene compound salt (Å) |
|---|---|---|
| 8-15-1 | 1 | 100 |
| 8-15-2 | " | 200 |
| 8-15-3 | " | 1000 |
| 8-15-4 | " | 3000 |
| 8-15-5 | " | 6000 |
| 8-15-6 | 7 | 100 |
| 8-15-7 | " | 200 |
| 8-15-8 | " | 1000 |
| 8-15-9 | " | 3000 |
| 8-15-10 | " | 6000 |
| 8-15-11 | 41 | 100 |
| 8-15-12 | " | 200 |
| 8-15-13 | " | 1000 |
| 8-15-14 | 41 | 3000 |
| 8-15-15 | " | 6000 |
| 8-15-16 | 101 | 100 |
| 8-15-17 | " | 200 |
| 8-15-18 | " | 1000 |
| 8-15-19 | " | 3000 |
| 8-15-20 | " | 6000 |
| 8-15-21 | 201 | 100 |
| 8-15-22 | " | 200 |
| 8-15-23 | " | 1000 |
| 8-15-24 | " | 3000 |
| 8-15-25 | " | 6000 |

EXAMPLE 8-15

According to the same procedure as in Example 8-14 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, 25 kinds of recording media of samples 8-15-1 to 8-15-25 as shown in Table 8-5 were obtained and the same experiments were conducted.

The results are shown in Table 8-6.

TABLE 8-6

| Sample No. | Sensitivity | | Resolution | | Contrast ratio | |
|---|---|---|---|---|---|---|
| | Color change | Pit | Color change | Pit | Color change | Pit |
| 8-15-1 | x | ◉ | x | ◉ | x | x |
| 8-15-2 | x | ◉ | x | ◉ | x | x |
| 8-15-3 | ◉ | ◉ | ○ | ◉ | x | ○ |
| 8-15-4 | ◉ | ◉ | ○ | ◉ | x | ◉ |
| 8-15-5 | ◉ | ◉ | ○ | ◉ | x | ◉ |
| 8-15-6 | x | ◉ | x | ◉ | x | x |
| 8-15-7 | ◉ | ◉ | ○ | ◉ | x | x |
| 8-15-8 | ◉ | ◉ | ○ | ◉ | x | ○ |
| 8-15-9 | ◉ | ◉ | ○ | ◉ | x | ◉ |
| 8-15-10 | ◉ | ◉ | ○ | ◉ | x | ◉ |
| 8-15-11 | x | ◉ | x | ◉ | ○ | x |
| 8-15-12 | ○ | ◉ | ○ | ◉ | ○ | x |
| 8-15-13 | ◉ | ◉ | ◉ | ◉ | ◉ | ◉ |
| 8-15-14 | ◉ | ◉ | ◉ | ◉ | ◉ | ◉ |
| 8-15-15 | ◉ | ◉ | ◉ | ◉ | ◉ | ◉ |

TABLE 8-6-continued

| | | | | | | |
|---|---|---|---|---|---|---|
| 8-15-16 | × | ⊚ | × | ⊚ | × | × |
| 8-15-17 | ○ | ⊚ | ○ | ⊚ | ○ | × |
| 8-15-18 | ⊚ | ⊚ | ⊚ | ⊚ | ⊚ | ⊚ |
| 8-15-19 | ⊚ | ⊚ | ⊚ | ○ | ⊚ | ⊚ |
| 8-15-20 | ⊚ | ⊚ | ⊚ | ○ | ⊚ | ⊚ |
| 8-15-21 | × | ⊚ | × | ⊚ | × | × |
| 8-15-22 | × | ⊚ | × | ⊚ | × | × |
| 8-15-23 | ○ | ⊚ | ○ | ⊚ | ○ | ⊚ |
| 8-15-24 | ⊚ | ⊚ | ⊚ | ○ | ⊚ | ⊚ |
| 8-15-25 | ⊚ | ⊚ | ⊚ | ○ | ⊚ | ⊚ |

Example 8-16

According to the same procedure as in Example 8-15 except for using the diene compound represented by the formula 3-1-5 in place of the diene compound in Example 8-15, 25 kinds of optical recording media of samples No. 8-16-1 to 8-16-25 as shown in Table 8-7 were obtained and the results are shown in Table 8-8.

TABLE 8-7

| Sample No. | Built-up number of DA compound monomolecular films | Film thickness of layer containing diene compound salt(Å) |
|---|---|---|
| 8-16-1 | 1 | 100 |
| 8-16-2 | " | 200 |
| 8-16-3 | " | 1000 |
| 8-16-4 | " | 3000 |
| 8-16-5 | " | 6000 |
| 8-16-6 | 7 | 100 |
| 8-16-7 | " | 200 |
| 8-16-8 | " | 1000 |
| 8-16-9 | " | 3000 |
| 8-16-10 | " | 6000 |
| 8-16-11 | 41 | 100 |
| 8-16-12 | " | 200 |
| 8-16-13 | " | 1000 |
| 8-16-14 | 41 | 3000 |
| 8-16-15 | " | 6000 |
| 8-16-16 | 101 | 100 |
| 8-16-17 | " | 200 |
| 8-16-18 | " | 1000 |
| 8-16-19 | " | 3000 |
| 8-16-20 | " | 6000 |
| 8-16-21 | 201 | 100 |
| 8-16-22 | " | 200 |
| 8-16-23 | " | 1000 |
| 8-16-24 | " | 3000 |
| 8-16-25 | " | 6000 |

TABLE 8-8

| Sample No. | Sensitivity | | Resolution | | Contrast ratio | |
|---|---|---|---|---|---|---|
| | Color change | Pit | Color change | Pit | Color change | Pit |
| 8-16-1 | × | ⊚ | × | ⊚ | × | × |
| 8-16-2 | × | ⊚ | × | ⊚ | × | × |
| 8-16-3 | ⊚ | ⊚ | ○ | ⊚ | × | ⊚ |
| 8-16-4 | ⊚ | ⊚ | ○ | ⊚ | × | ⊚ |
| 8-16-5 | ⊚ | ⊚ | ○ | ⊚ | × | ⊚ |
| 8-16-6 | ⊚ | ⊚ | ○ | ⊚ | × | × |
| 8-16-7 | ⊚ | ⊚ | ○ | ⊚ | × | × |
| 8-16-8 | ⊚ | ⊚ | ○ | ⊚ | × | ⊚ |
| 8-16-9 | ⊚ | ⊚ | ○ | ⊚ | × | ⊚ |
| 8-16-10 | ⊚ | ⊚ | ○ | ⊚ | × | ⊚ |
| 8-16-11 | ○ | ○ | ○ | ○ | ○ | × |
| 8-16-12 | ○ | ○ | ○ | ○ | ○ | × |

TABLE 8-8-continued

| | | | | | | |
|---|---|---|---|---|---|---|
| 8-16-13 | ⊚ | ⊚ | ⊚ | ⊚ | ⊚ | ⊚ |
| 8-16-14 | ⊚ | ⊚ | ⊚ | ⊚ | ⊚ | ⊚ |
| 8-16-15 | ⊚ | ⊚ | ⊚ | ⊚ | ⊚ | ⊚ |
| 8-16-16 | × | ○ | × | ○ | × | × |
| 8-16-17 | ○ | ○ | ○ | ○ | ○ | × |
| 8-16-18 | ⊚ | ⊚ | ⊚ | ⊚ | ⊚ | ⊚ |
| 8-16-19 | ⊚ | ⊚ | ⊚ | ⊚ | ⊚ | ⊚ |
| 8-16-20 | ⊚ | ⊚ | ⊚ | ○ | ⊚ | ⊚ |
| 8-16-21 | × | ⊚ | × | ○ | × | × |
| 8-16-22 | × | ⊚ | × | ⊚ | × | × |
| 8-16-23 | ○ | ⊚ | ○ | ⊚ | ○ | ⊚ |
| 8-16-24 | ⊚ | ⊚ | ⊚ | ○ | ⊚ | ⊚ |
| 8-16-25 | ⊚ | ⊚ | ⊚ | ○ | ⊚ | ⊚ |

EXAMPLE 8-17

The same experiments as in Example 8-15 were conducted except for changing the diene compound in Example 8-15 to the diene compound represented by the formula 3-1-10 to obtain the 25 kinds of optical recording media of samples No. 8-17-1 to 8-17-25 as shown in Table 8-9. The results are shown in Table 8-10.

TABLE 8-9

| Sample No. | Built-up number of DA compound monomolecular films | Film thickness of layer containing diene compound salt(Å) |
|---|---|---|
| 8-17-1 | 1 | 100 |
| 8-17-2 | " | 200 |
| 8-17-3 | " | 1000 |
| 8-17-4 | " | 3000 |
| 8-17-5 | " | 6000 |
| 8-17-6 | 7 | 100 |
| 8-17-7 | " | 200 |
| 8-17-8 | " | 1000 |
| 8-17-9 | " | 3000 |
| 8-17-10 | " | 6000 |
| 8-17-11 | 41 | 100 |
| 8-17-12 | " | 200 |
| 8-17-13 | " | 1000 |
| 8-17-14 | 41 | 3000 |
| 8-17-15 | " | 6000 |
| 8-17-16 | 101 | 100 |
| 8-17-17 | " | 200 |
| 8-17-18 | " | 1000 |
| 8-17-19 | " | 3000 |
| 8-17-20 | " | 6000 |
| 8-17-21 | 201 | 100 |
| 8-17-22 | " | 200 |
| 8-17-23 | " | 1000 |
| 8-17-24 | " | 3000 |
| 8-17-25 | " | 6000 |

TABLE 8-10

| Sample No. | Sensitivity | | Resolution | | Contrast ratio | |
|---|---|---|---|---|---|---|
| | Color change | Pit | Color change | Pit | Color change | Pit |
| 8-17-1 | ⊚ | ⊚ | ○ | ⊚ | × | × |
| 8-17-2 | ⊚ | ⊚ | ○ | ⊚ | × | × |
| 8-17-3 | ⊚ | ⊚ | ○ | ⊚ | × | ⊚ |
| 8-17-4 | ⊚ | ⊚ | ○ | ⊚ | × | ⊚ |
| 8-17-5 | ⊚ | ⊚ | ○ | ⊚ | × | ⊚ |
| 8-17-6 | ⊚ | ⊚ | ○ | ⊚ | × | × |
| 8-17-7 | ⊚ | ⊚ | ○ | ⊚ | × | × |

TABLE 8-10 - Continued

| | | | | | | |
|---|---|---|---|---|---|---|
| 8-17-8 | ⊚ | ⊚ | ○ | ⊚ | × | ⊚ |
| 8-17-9 | ⊚ | ⊚ | ○ | ⊚ | × | ⊚ |
| 8-17-10 | ⊚ | ⊚ | ○ | ⊚ | × | ⊚ |
| 8-17-11 | × | ⊚ | × | ⊚ | ○ | × |
| 8-17-12 | ○ | ⊚ | ○ | ⊚ | ○ | × |
| 8-17-13 | ⊚ | ⊚ | ⊚ | ⊚ | ⊚ | ⊚ |
| 8-17-14 | ⊚ | ⊚ | ⊚ | ⊚ | ⊚ | ⊚ |
| 8-17-15 | ⊚ | ⊚ | ⊚ | ⊚ | ⊚ | ⊚ |
| 8-17-16 | × | ○ | × | ○ | × | × |
| 8-17-17 | ○ | ○ | ○ | ○ | ○ | × |
| 8-17-18 | ⊚ | ⊚ | ⊚ | ⊚ | ⊚ | ⊚ |
| 8-17-19 | ⊚ | ⊚ | ⊚ | ⊚ | ⊚ | ⊚ |
| 8-17-20 | ⊚ | ⊚ | ⊚ | ○ | ⊚ | ⊚ |
| 8-17-21 | × | ⊚ | × | ○ | × | × |
| 8-17-22 | × | ⊚ | × | ⊚ | × | × |
| 8-17-23 | ○ | ⊚ | ○ | ⊚ | ○ | ⊚ |
| 8-17-24 | ⊚ | ⊚ | ⊚ | ○ | ⊚ | ⊚ |
| 8-17-25 | ⊚ | ⊚ | ⊚ | ○ | ⊚ | ⊚ |

EXAMPLE 9-1

The same experiments were conducted in the same manner as in Example 6-1 except for using 15 parts by weight of the croconic methine dye represented by the formula 4-1-6 in place of the azulenium salt compound in Example 6-1.

EXAMPLE 9-2 TO 9-4

The same experiment as in Example 9-1 was repeated except that the amount of the croconic methine dye was varied to 10, 5 and 1 part by weight, respectively, per 1 part by weight of the diacetylene derivative.

EXAMPLES 9-5 TO 9-7

The same experiment as in Example 9-1 was repeated except that the amount of the diacetylene derivative compound was changed to 5, 10 and 15 parts by weight, respectively, per 1 part by weight of the croconic methine dye.

The results of Examples 9-1 to 9-7 are shown in Table 9-1.

TABLE 9-1

| Optical recording medium | Built-up number of mono-mole-cular films | Sensitivity | | Resolution | | Contrast ratio | |
|---|---|---|---|---|---|---|---|
| | | Color change | Pit | Color change | Pit | Color change | Pit |
| Example 9-1 | 1 | ● | ● | ● | ● | × | × |
| | 21 | ● | ● | ● | ● | × | ● |
| | 41 | ● | ● | ○ | ● | ○ | ● |
| | 81 | ● | ● | ○ | ● | ○ | ● |
| Example 9-2 | 1 | ● | ● | ● | ● | × | × |
| | 21 | ● | ● | ● | ● | ○ | ● |
| | 41 | ● | ● | ○ | ● | ○ | ● |
| | 81 | ● | ● | ○ | ● | ● | ● |
| Example 9-3 | 1 | ● | ● | ● | ● | × | × |
| | 21 | ● | ● | ● | ● | ● | ● |
| | 41 | ● | ● | ● | ● | ● | ● |
| | 81 | ● | ● | ● | ● | ● | ● |
| Example 9-4 | 1 | ● | ● | ● | ● | × | × |
| | 21 | ● | ● | ● | ● | ● | ● |
| | 41 | ● | ● | ● | ● | ● | ● |
| | 81 | ● | ● | ● | ● | ● | ● |
| Example 9-5 | 1 | ● | ● | ● | ● | × | × |
| | 21 | ● | ● | ● | ● | ● | ● |
| | 41 | ● | ● | ● | ● | ● | ● |
| | 81 | ● | ● | ● | ● | ● | ● |

EXAMPLE 9-8

Experiments were conducted according to the same procedure as in Example 9-4 except for using a diacetylene derivative compound represented by $C_8H_{17}-C{\equiv}C-C{\equiv}C-C_2H_4-COOH$ in place of the diacetylene derivative compound represented by $C_{12}H_{25}-C{\equiv}C-C{\equiv}C-C_8H_{16}-COOH$.

EXAMPLE 9-9 TO 9-12

Experiments were conducted according to the same procedure as in Example 9-8 except for using the croconic methine dye represented by the formula 4-1-14, 4-1-24, 4-1-35 and 4-1-39 in place of the croconic methine dye represented by the formula 4-1-6.

The results of Examples 9-8 to 9-12 are shown in Table 9-2.

TABLE 9-2

| Optical recording medium | Built-up number of mono-mole-cular films | Sensitivity | | Resolution | | Contrast ratio | |
|---|---|---|---|---|---|---|---|
| | | Color change | Pit | Color change | Pit | Color change | Pit |
| Example 9-8 | 1 | ⊚ | ⊚ | ⊚ | ⊚ | × | × |
| | 21 | ⊚ | ⊚ | ⊚ | ⊚ | ⊚ | ⊚ |
| | 41 | ⊚ | ⊚ | ⊚ | ⊚ | ⊚ | ⊚ |
| | 81 | ⊚ | ⊚ | ⊚ | ⊚ | ⊚ | ⊚ |
| Example 9-9 | 1 | ⊚ | ⊚ | ⊚ | ⊚ | × | × |
| | 21 | ⊚ | ⊚ | ⊚ | ⊚ | ○ | ○ |
| | 41 | ⊚ | ⊚ | ⊚ | ⊚ | ⊚ | ⊚ |
| | 81 | ⊚ | ⊚ | ⊚ | ⊚ | ⊚ | ⊚ |
| Example 9-10 | 1 | ⊚ | ⊚ | ⊚ | ⊚ | × | × |
| | 21 | ⊚ | ⊚ | ○ | ○ | ⊚ | ⊚ |
| | 41 | ⊚ | ⊚ | ⊚ | ⊚ | ⊚ | ⊚ |
| | 81 | ⊚ | ⊚ | ⊚ | ⊚ | ⊚ | ⊚ |
| Example 9-11 | 1 | ⊚ | ⊚ | ⊚ | ⊚ | × | × |
| | 21 | ⊚ | ⊚ | ○ | ○ | ○ | ○ |
| | 41 | ⊚ | ⊚ | ⊚ | ⊚ | ⊚ | ⊚ |
| | 81 | ⊚ | ⊚ | ⊚ | ⊚ | ⊚ | ⊚ |
| Example 9-12 | 1 | ⊚ | ⊚ | ⊚ | ⊚ | × | × |
| | 21 | ⊚ | ⊚ | ⊚ | ⊚ | ⊚ | ⊚ |
| | 41 | ⊚ | ⊚ | ⊚ | ⊚ | ⊚ | ⊚ |
| | 81 | ⊚ | ⊚ | ⊚ | ⊚ | ⊚ | ⊚ |

EXAMPLE 9-13

The experiments as in Example 7-13 were conducted except for changing the pyrylium dye in Example 7-13 to 10 parts by weight of the croconic methine dye represented by the formula 4-1-6.

By varying the film thickness of the layer containing the croconic methine dye and the built-up number of the above monomolecular films variously as shown in Table 9-3, 25 kinds of recording media of samples 9-13-1 to 9-13-25 were obtained.

The results are shown in Table 9-4.

TABLE 9-3

| Sample No. | Built-up number of DA compound monomolecular films | Film thickness of layer containing croconic methine dye (Å) |
|---|---|---|
| 9-13-1 | 1 | 100 |
| 9-13-2 | " | 200 |
| 9-13-3 | " | 1000 |
| 9-13-4 | " | 3000 |
| 9-13-5 | " | 6000 |
| 9-13-6 | 7 | 100 |
| 9-13-7 | " | 200 |
| 9-13-8 | " | 1000 |
| 9-13-9 | " | 3000 |
| 9-13-10 | " | 6000 |
| 9-13-11 | 41 | 100 |
| 9-13-12 | " | 200 |
| 9-13-13 | " | 1000 |
| 9-13-14 | 41 | 3000 |
| 9-13-15 | " | 6000 |
| 9-13-16 | 101 | 100 |
| 9-13-17 | " | 200 |
| 9-13-18 | " | 1000 |
| 9-13-19 | " | 3000 |
| 9-13-20 | " | 6000 |
| 9-13-21 | 201 | 100 |
| 9-13-22 | " | 200 |
| 9-13-23 | " | 1000 |
| 9-13-24 | " | 3000 |
| 9-13-25 | " | 6000 |

TABLE 9-4

| Sample No. | Sensitivity | | Resolution | | Contrast ratio | |
|---|---|---|---|---|---|---|
| | Color change | Pit | Color change | Pit | Color change | Pit |
| 9-13-1 | ◎ | ◎ | ◎ | ◎ | x | x |
| 9-13-2 | ◎ | ◎ | ◎ | ◎ | x | x |
| 9-13-3 | ◎ | ◎ | ◎ | ◎ | x | ◎ |
| 9-13-4 | ◎ | ◎ | ◎ | ◎ | x | ◎ |
| 9-13-5 | ◎ | ◎ | o | ◎ | x | ◎ |
| 9-13-6 | ◎ | ◎ | ◎ | ◎ | x | x |
| 9-13-7 | ◎ | ◎ | ◎ | ◎ | x | x |
| 9-13-8 | ◎ | ◎ | ◎ | ◎ | x | ◎ |
| 9-13-9 | ◎ | ◎ | ◎ | ◎ | x | ◎ |
| 9-13-10 | ◎ | ◎ | ◎ | ◎ | x | ◎ |
| 9-13-11 | x | ◎ | x | ◎ | x | x |
| 9-13-12 | o | ◎ | o | ◎ | ◎ | x |
| 9-13-13 | ◎ | ◎ | ◎ | ◎ | ◎ | ◎ |
| 9-13-14 | ◎ | ◎ | ◎ | ◎ | ◎ | ◎ |
| 9-13-15 | ◎ | ◎ | ◎ | ◎ | ◎ | ◎ |
| 9-13-16 | x | ◎ | x | ◎ | x | x |
| 9-13-17 | o | ◎ | o | ◎ | ◎ | x |
| 9-13-18 | ◎ | ◎ | ◎ | ◎ | ◎ | ◎ |
| 9-13-19 | ◎ | ◎ | ◎ | ◎ | ◎ | ◎ |
| 9-13-20 | ◎ | ◎ | ◎ | o | ◎ | ◎ |
| 9-13-21 | x | ◎ | x | ◎ | x | x |
| 9-13-22 | x | ◎ | x | ◎ | x | x |
| 9-13-23 | o | ◎ | o | ◎ | ◎ | ◎ |
| 9-13-24 | ◎ | ◎ | ◎ | o | ◎ | ◎ |
| 9-13-25 | ◎ | ◎ | o | o | ◎ | ◎ |

EXAMPLE 9-14

According to the same procedure as in Example 9-13 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, 25 kinds of recording media of samples 9-14-1 to 9-14-25 as shown in Table 9-5 were obtained and the same experiments were conducted.

The results are shown in Table 9-6.

TABLE 9-5

| Sample No. | Built-up number of DA compound monomolecular films | Film thickness of layer containing croconic methine dye (Å) |
|---|---|---|
| 9-14-1 | 1 | 100 |
| 9-14-2 | " | 200 |
| 9-14-3 | " | 1000 |
| 9-14-4 | " | 3000 |
| 9-14-5 | " | 6000 |
| 9-14-6 | 7 | 100 |
| 9-14-7 | " | 200 |
| 9-14-8 | " | 1000 |
| 9-14-9 | " | 3000 |
| 9-14-10 | " | 6000 |
| 9-14-11 | 41 | 100 |
| 9-14-12 | " | 200 |
| 9-14-13 | " | 1000 |
| 9-14-14 | 41 | 3000 |
| 9-14-15 | " | 6000 |
| 9-14-16 | 101 | 100 |
| 9-14-17 | " | 200 |
| 9-14-18 | " | 1000 |
| 9-14-19 | " | 3000 |
| 9-14-20 | " | 6000 |
| 9-14-21 | 201 | 100 |
| 9-14-22 | " | 200 |
| 9-14-23 | " | 1000 |
| 9-14-24 | " | 3000 |
| 9-14-25 | " | 6000 |

TABLE 9-6

| Sample No. | Sensitivity | | Resolution | | Contrast ratio | |
|---|---|---|---|---|---|---|
| | Color change | Pit | Color change | Pit | Color change | Pit |
| 9-14-1 | ◎ | o | ◎ | o | x | x |
| 9-14-2 | ◎ | o | ◎ | o | x | x |
| 9-14-3 | ◎ | ◎ | ◎ | ◎ | x | ◎ |
| 9-14-4 | ◎ | ◎ | ◎ | ◎ | x | ◎ |
| 9-14-5 | ◎ | ◎ | o | ◎ | x | ◎ |
| 9-14-6 | ◎ | o | ◎ | ◎ | x | x |
| 9-14-7 | ◎ | o | ◎ | ◎ | x | x |
| 9-14-8 | ◎ | ◎ | ◎ | ◎ | x | ◎ |
| 9-14-9 | ◎ | ◎ | ◎ | ◎ | x | ◎ |
| 9-14-10 | ◎ | ◎ | o | ◎ | x | ◎ |
| 9-14-11 | x | o | x | ◎ | x | x |
| 9-14-12 | o | o | o | ◎ | ◎ | ◎ |
| 9-14-13 | ◎ | ◎ | ◎ | ◎ | ◎ | ◎ |
| 9-14-14 | ◎ | ◎ | ◎ | ◎ | ◎ | ◎ |
| 9-14-15 | ◎ | ◎ | ◎ | ◎ | ◎ | ◎ |
| 9-14-16 | x | o | x | ◎ | x | x |
| 9-14-17 | o | o | o | ◎ | ◎ | ◎ |
| 9-14-18 | ◎ | ◎ | ◎ | ◎ | ◎ | ◎ |
| 9-14-19 | ◎ | ◎ | ◎ | ◎ | ◎ | ◎ |
| 9-14-20 | ◎ | ◎ | ◎ | o | ◎ | ◎ |
| 9-14-21 | x | o | x | ◎ | x | x |
| 9-14-22 | x | o | x | ◎ | x | ◎ |
| 9-14-23 | o | ◎ | o | ◎ | ◎ | ◎ |
| 9-14-24 | ◎ | ◎ | ◎ | o | ◎ | ◎ |
| 9-14-25 | ◎ | ◎ | ◎ | o | ◎ | ◎ |

EXAMPLE 9-15

Experiments were conducted according to the same procedure as in Example 9-13 except for using the croconic methine dye represented by the formula 4-1-2 in place of the croconic methine dye in Example 9-13. Samples are shown in Table 9-7 and the results are shown in Table 9-8.

TABLE 9-7

| Sample No. | Built-up number of DA compound monomolecular films | Film thickness of layer containing croconic methine dye (Å) |
|---|---|---|
| 9-15-1 | 1 | 100 |
| 9-15-2 | " | 200 |
| 9-15-3 | " | 1000 |
| 9-15-4 | " | 3000 |
| 9-15-5 | " | 6000 |
| 9-15-6 | 7 | 100 |
| 9-15-7 | " | 200 |
| 9-15-8 | " | 1000 |
| 9-15-9 | " | 3000 |
| 9-15-10 | " | 6000 |
| 9-15-11 | 41 | 100 |
| 9-15-12 | " | 200 |
| 9-15-13 | " | 1000 |
| 9-15-14 | 41 | 3000 |
| 9-15-15 | " | 6000 |
| 9-15-16 | 101 | 100 |
| 9-15-17 | " | 200 |
| 9-15-18 | " | 1000 |
| 9-15-19 | " | 3000 |
| 9-15-20 | " | 6000 |
| 9-15-21 | 201 | 100 |
| 9-15-22 | " | 200 |
| 9-15-23 | " | 1000 |
| 9-15-24 | " | 3000 |
| 9-15-25 | " | 6000 |

TABLE 9-9

| Sample No. | Built-up number of DA compound monomolecular films | Film thickness of layer containing croconic methine dye (Å) |
|---|---|---|
| 9-16-1 | 1 | 100 |
| 9-16-2 | " | 200 |
| 9-16-3 | " | 1000 |
| 9-16-4 | " | 3000 |
| 9-16-5 | " | 6000 |
| 9-16-6 | 7 | 100 |
| 9-16-7 | " | 200 |
| 9-16-8 | " | 1000 |
| 9-16-9 | " | 3000 |
| 9-16-10 | " | 6000 |
| 9-16-11 | 41 | 100 |
| 9-16-12 | " | 200 |
| 9-16-13 | " | 1000 |
| 9-16-14 | 41 | 3000 |
| 9-16-15 | " | 6000 |
| 9-16-16 | 101 | 100 |
| 9-16-17 | " | 200 |
| 9-16-18 | " | 1000 |
| 9-16-19 | " | 3000 |
| 9-16-20 | " | 6000 |
| 9-16-21 | 201 | 100 |
| 9-16-22 | " | 200 |
| 9-16-23 | " | 1000 |
| 9-16-24 | " | 3000 |
| 9-16-25 | " | 6000 |

TABLE 9-8

| Sample No. | Sensitivity Color change | Sensitivity Pit | Resolution Color change | Resolution Pit | Contrast ratio Color change | Contrast ratio Pit |
|---|---|---|---|---|---|---|
| 9-15-1 | o | o | ◎ | o | x | x |
| 9-15-2 | ◎ | ◎ | ◎ | ◎ | x | x |
| 9-15-3 | ◎ | ◎ | ◎ | ◎ | x | ◎ |
| 9-15-4 | ◎ | ◎ | ◎ | ◎ | x | ◎ |
| 9-15-5 | ◎ | ◎ | o | ◎ | x | ◎ |
| 9-15-6 | o | o | ◎ | o | x | x |
| 9-15-7 | ◎ | ◎ | ◎ | ◎ | x | x |
| 9-15-8 | ◎ | ◎ | ◎ | ◎ | x | ◎ |
| 9-15-9 | ◎ | ◎ | ◎ | ◎ | x | ◎ |
| 9-15-10 | ◎ | ◎ | o | ◎ | x | ◎ |
| 9-15-11 | x | o | x | o | x | x |
| 9-15-12 | o | ◎ | o | ◎ | x | x |
| 9-15-13 | ◎ | ◎ | ◎ | ◎ | ◎ | ◎ |
| 9-15-14 | ◎ | ◎ | ◎ | ◎ | ◎ | ◎ |
| 9-15-15 | ◎ | ◎ | ◎ | ◎ | ◎ | ◎ |
| 9-15-16 | x | o | x | o | x | x |
| 9-15-17 | o | ◎ | o | ◎ | x | x |
| 9-15-18 | ◎ | ◎ | ◎ | ◎ | ◎ | ◎ |
| 9-15-19 | ◎ | ◎ | ◎ | ◎ | ◎ | ◎ |
| 9-15-20 | ◎ | ◎ | ◎ | ◎ | ◎ | ◎ |
| 9-15-21 | x | o | x | o | x | x |
| 9-15-22 | x | ◎ | x | ◎ | x | x |
| 9-15-23 | o | ◎ | o | ◎ | ◎ | ◎ |
| 9-15-24 | ◎ | ◎ | ◎ | ◎ | ◎ | ◎ |
| 9-15-25 | ◎ | ◎ | ◎ | ◎ | ◎ | ◎ |

TABLE 9-10

| Sample No. | Sensitivity Color change | Sensitivity Pit | Resolution Color change | Resolution Pit | Contrast ratio Color change | Contrast ratio Pit |
|---|---|---|---|---|---|---|
| 9-16-1 | ◎ | ◎ | ◎ | ◎ | x | x |
| 9-16-2 | ◎ | ◎ | ◎ | ◎ | x | x |
| 9-16-3 | ◎ | ◎ | ◎ | ◎ | x | ◎ |
| 9-16-4 | ◎ | ◎ | ◎ | ◎ | x | ◎ |
| 9-16-5 | ◎ | ◎ | ◎ | ◎ | x | ◎ |
| 9-16-6 | ◎ | ◎ | ◎ | ◎ | x | x |
| 9-16-7 | ◎ | ◎ | ◎ | ◎ | x | x |
| 9-16-8 | ◎ | ◎ | ◎ | ◎ | x | ◎ |
| 9-16-9 | ◎ | ◎ | ◎ | ◎ | x | ◎ |
| 9-16-10 | ◎ | ◎ | ◎ | ◎ | x | ◎ |
| 9-16-11 | x | ◎ | x | ◎ | x | x |
| 9-16-12 | o | ◎ | o | ◎ | o | x |
| 9-16-13 | ◎ | ◎ | ◎ | ◎ | ◎ | ◎ |
| 9-16-14 | ◎ | ◎ | ◎ | ◎ | ◎ | ◎ |
| 9-16-15 | ◎ | ◎ | ◎ | ◎ | ◎ | ◎ |
| 9-16-16 | x | ◎ | x | ◎ | x | x |
| 9-16-17 | o | ◎ | o | ◎ | o | x |
| 9-16-18 | ◎ | ◎ | ◎ | ◎ | ◎ | ◎ |
| 9-16-19 | ◎ | ◎ | ◎ | o | ◎ | ◎ |
| 9-16-20 | ◎ | ◎ | ◎ | o | ◎ | ◎ |
| 9-16-21 | x | ◎ | x | ◎ | x | x |
| 9-16-22 | x | ◎ | x | ◎ | x | x |
| 9-16-23 | o | ◎ | o | ◎ | o | ◎ |
| 9-16-24 | ◎ | ◎ | ◎ | o | ◎ | ◎ |
| 9-16-25 | ◎ | ◎ | ◎ | o | ◎ | ◎ |

EXAMPLE 9-16

The same experiments as in Example 9-13 were conducted except for changing the croconic methine dye in Example 9-13 to the croconic methine dye represented by the formula 4-1-29. Samples are shown in Table 9-9 and the results are shown in Table 9-10.

EXAMPLE 10-1

The same experiments were conducted in the same manner as in Example 6-1 except for using 15 parts by weight of the polymethine compound represented by the formula 5-1-5 in place of the azulenium salt compound.

EXAMPLES 10-2 TO 10-4

The same experiment as in Example 10-1 was repeated except that the amount of the polymethine compound was varied to 10, 5 and 1 part by weight, respectively, per 1 part by weight of the diacetylene derivative.

EXAMPLES 10-5 TO 10-7

The same experiment as in Example 10-1 was repeated except that the amount of the diacetylene derivative compound was changed to 5, 10 and 15 parts by weight, respectively, per 1 part by weight of the polymethine compound.

The results of Examples 10-1 to 10-7 are shown in Table 10-1.

TABLE 10-1

| Optical Recording Medium | Built-up Number of Mono-molecular Films | Sensitivity | | Resolution | | Control Ratio | |
|---|---|---|---|---|---|---|---|
| | | Color Change | Pit | Color Change | Pit | Color Change | Pit |
| Example 10-1 | 1 | X | O | X | ◎ | X | X |
| | 21 | X | O | X | ◎ | X | O |
| | 41 | O | O | ◎ | ◎ | O | ◎ |
| | 81 | O | O | ◎ | ◎ | O | ◎ |
| Example 10-2 | 1 | X | ◎ | X | ◎ | X | X |
| | 21 | O | ◎ | ◎ | ◎ | X | ◎ |
| | 41 | O | ◎ | ◎ | ◎ | O | ◎ |
| | 81 | O | ◎ | ◎ | ◎ | O | ◎ |
| Example 10-3 | 1 | X | ◎ | X | ◎ | X | X |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 10-4 | 1 | ◎ | ◎ | ◎ | ◎ | X | X |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 10-5 | 1 | ◎ | X | ◎ | X | X | X |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 10-6 | 1 | ◎ | X | ◎ | X | X | X |
| | 21 | ◎ | X | ◎ | X | ◎ | X |
| | 41 | ◎ | X | ◎ | X | ◎ | X |
| | 81 | ◎ | O | ◎ | O | ◎ | O |
| Example 10-7 | 1 | X | X | X | X | X | X |
| | 21 | O | X | ◎ | X | ◎ | X |
| | 41 | O | X | ◎ | X | ◎ | X |
| | 81 | O | O | ◎ | O | ◎ | X |

EXAMPLE 10-8

Experiments were conducted according to the same procedure as in Example 10-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$.

EXAMPLES 10-9 TO 10-13

Experiments were conducted according to the same procedure as in Example 10-8 except for using the polymethine compound represented by the formula 5-1-1, 5-1-9, 5-1-15, 5-1-25 and 5-1-30 in place of the polymethine compound represented by the formula 5-1-5.

The results of Examples 10-8 to 10-13 are shown in Table 10-2.

TABLE 10-2

| Optical Recording Medium | Built-up Number of Mono-molecular Films | Sensitivity | | Resolution | | Control Ratio | |
|---|---|---|---|---|---|---|---|
| | | Color Change | Pit | Color Change | Pit | Color Change | Pit |
| Example 10-8 | 1 | ◎ | O | ◎ | O | X | X |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 10-9 | 1 | O | O | O | O | X | X |
| | 21 | O | O | O | O | O | O |
| | 41 | O | O | O | O | O | O |
| | 81 | O | O | O | O | O | O |
| Example 10-10 | 1 | O | O | O | O | X | X |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 10-11 | 1 | O | O | O | O | X | X |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 10-12 | 1 | ◎ | O | ◎ | O | X | X |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |
| Example 10-13 | 1 | ◎ | ◎ | ◎ | ◎ | X | X |
| | 21 | ◎ | ◎ | ◎ | ◎ | ◎ | ◎ |
| | 41 | ◎ | ◎ | ◎ | ◎ | ◎ | ◎ |
| | 81 | ◎ | ◎ | ◎ | ◎ | ◎ | ◎ |

EXAMPLE 10-14

The experiments as in Example 7-13 were conducted except for changing the pyrylium dye to 10 parts by weight of the polymethine compound represented by the formula 5-1-3.

By varying the film thickness of the layer containing the polymethine compound and the built-up number of the above monomolecular films variously as shown in Table 10-3, 25 kinds of recording media of samples 10-14-1 to 10-14-25 were obtained.

The results are shown in Table 10-4.

TABLE 10-3

| Sample No. | Built-up Number of DA Compound Monomolecular Films | Film Thickness of Layer containing Polymethine Compound (Å) |
|---|---|---|
| 10-14-1 | 1 | 100 |
| 10-14-2 | " | 200 |
| 10-14-3 | " | 1000 |
| 10-14-4 | " | 3000 |
| 10-14-5 | " | 6000 |
| 10-14-6 | 7 | 100 |
| 10-14-7 | " | 200 |
| 10-14-8 | " | 1000 |
| 10-14-9 | " | 3000 |
| 10-14-10 | " | 6000 |
| 10-14-11 | 41 | 100 |
| 10-14-12 | " | 200 |
| 10-14-13 | " | 1000 |
| 10-14-14 | 41 | 3000 |
| 10-14-15 | " | 6000 |
| 10-14-16 | 101 | 100 |
| 10-14-17 | " | 200 |
| 10-14-18 | " | 1000 |
| 10-14-19 | " | 3000 |
| 10-14-20 | " | 6000 |
| 10-14-21 | 201 | 100 |
| 10-14-22 | " | 200 |
| 10-14-23 | " | 1000 |
| 10-14-24 | " | 3000 |
| 10-14-25 | " | 6000 |

TABLE 10-4

| Sample No. | Sensitivity Color Change | Sensitivity Pit | Resolution Color Change | Resolution Pit | Control Ratio Color Change | Control Ratio Pit |
|---|---|---|---|---|---|---|
| 10-14-1 | ◉ | × | ◉ | × | × | × |
| 10-14-2 | ◉ | ○ | ◉ | ◉ | × | × |
| 10-14-3 | ◉ | ○ | ◉ | ◉ | × | ○ |
| 10-14-4 | ◉ | × | ◉ | × | × | × |
| 10-15-5 | ◉ | × | ◉ | × | × | × |
| 10-14-6 | ◉ | ○ | ◉ | ◉ | × | × |
| 10-14-7 | ◉ | ○ | ◉ | ◉ | × | × |
| 10-14-8 | ◉ | ○ | ◉ | ◉ | × | ○ |
| 10-14-9 | ◉ | × | ◉ | × | × | × |
| 10-14-10 | ◉ | × | ◉ | × | × | × |
| 10-14-11 | ○ | ○ | ○ | ○ | × | × |
| 10-14-12 | ◉ | ◉ | ◉ | ◉ | ◉ | × |
| 10-14-13 | ◉ | ◉ | ◉ | ◉ | ◉ | ◉ |
| 10-14-14 | ◉ | ◉ | ◉ | ◉ | ◉ | ◉ |
| 10-14-15 | ◉ | ◉ | ◉ | ◉ | ◉ | ◉ |
| 10-14-16 | × | × | × | × | × | × |
| 10-14-17 | ○ | × | ○ | × | ○ | × |
| 10-14-18 | ◉ | ◉ | ◉ | ◉ | ◉ | ◉ |
| 10-14-19 | ◉ | ◉ | ◉ | ◉ | ◉ | ◉ |
| 10-14-20 | ◉ | ◉ | ◉ | ◉ | ◉ | ◉ |
| 10-14-21 | × | × | × | × | × | × |
| 10-14-22 | × | × | × | × | × | × |
| 10-14-23 | ◉ | ◉ | ◉ | ◉ | ◉ | ◉ |
| 10-14-24 | ◉ | ◉ | ◉ | ◉ | ◉ | ◉ |
| 10-14-25 | ◉ | ◉ | ◉ | ◉ | ◉ | ◉ |

TABLE 10-6

| Sample No. | Sensitivity Color Change | Sensitivity Pit | Resolution Color Change | Resolution Pit | Control Ratio Color Change | Control Ratio Pit |
|---|---|---|---|---|---|---|
| 10-15-1 | ◉ | × | ◉ | × | × | × |
| 10-15-2 | ◉ | ○ | ◉ | ○ | × | × |
| 10-15-3 | ◉ | ○ | ◉ | ○ | × | ○ |
| 10-15-4 | ◉ | × | ◉ | × | × | × |
| 10-15-5 | ◉ | × | ◉ | × | × | × |
| 10-15-6 | ◉ | ○ | ◉ | ◉ | × | × |
| 10-15-7 | ◉ | ○ | ◉ | ◉ | × | ○ |
| 10-15-8 | ◉ | ◉ | ◉ | ◉ | × | ○ |
| 10-15-9 | ◉ | × | ◉ | × | × | × |
| 10-15-10 | ◉ | × | ◉ | × | × | × |
| 10-15-11 | ○ | ○ | ○ | ○ | × | × |
| 10-15-12 | ◉ | ◉ | ◉ | ◉ | ◉ | × |
| 10-15-13 | ◉ | ◉ | ◉ | ◉ | ◉ | ◉ |
| 10-15-14 | ◉ | ◉ | ◉ | ◉ | ◉ | ◉ |
| 10-15-15 | ◉ | ◉ | ◉ | ◉ | ◉ | ◉ |
| 10-15-16 | × | × | × | × | × | × |
| 10-15-17 | ○ | × | ○ | × | ○ | × |
| 10-15-18 | ◉ | ◉ | ◉ | ◉ | ◉ | ◉ |
| 10-15-19 | ◉ | ◉ | ◉ | ◉ | ◉ | ◉ |
| 10-15-20 | ◉ | ◉ | ◉ | ◉ | ◉ | ◉ |
| 10-15-21 | × | × | × | × | × | × |
| 10-15-22 | × | × | × | × | × | × |
| 10-15-23 | ◉ | ◉ | ◉ | ◉ | ◉ | ◉ |
| 10-15-24 | ◉ | ◉ | ◉ | ◉ | ◉ | ◉ |
| 10-15-25 | ◉ | ◉ | ◉ | ◉ | ◉ | ◉ |

EXAMPLE 10-15

According to the same procedure as in Example 10-14 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, 25 kinds of recording media of samples 10-15-1 to 10-15-25 as shown in Table 10-5 were obtained and the same experiments were conducted.

The results are shown in Table 10-6.

EXAMPLE 10-16 AND 10-17

Experiments were conducted according to the same procedure as in Example 10-15 except for using the polymethine compound represented by the formula 5-1-7 and 5-1-27 in place of the polymethine compound in Example 10-15. For Example 10-16, samples are shown in Table 10-7 and the results are shown in Table 10-8. For Example 10-17, samples are shown in Table 10-9 and the results are shown in Table 10-10.

TABLE 10-5

| Sample No. | Built-up Number of DA Compound Monomolecular Films | Film Thickness of layer Containing Polymethine Compound (Å) |
|---|---|---|
| 10-15-1 | 1 | 100 |
| 10-15-2 | " | 200 |
| 10-15-3 | " | 1000 |
| 10-15-4 | " | 3000 |
| 10-15-5 | " | 6000 |
| 10-15-6 | 7 | 100 |
| 10-15-7 | " | 200 |
| 10-15-8 | " | 1000 |
| 10-15-9 | " | 3000 |
| 10-15-10 | " | 6000 |
| 10-15-11 | 41 | 100 |
| 10-15-12 | " | 200 |
| 10-15-13 | " | 1000 |
| 10-15-14 | 41 | 3000 |
| 10-15-15 | " | 6000 |
| 10-15-16 | 101 | 100 |
| 10-15-17 | " | 200 |
| 10-15-18 | " | 1000 |
| 10-15-19 | " | 3000 |
| 10-15-20 | " | 6000 |
| 10-15-21 | 201 | 100 |
| 10-15-22 | " | 200 |
| 10-15-23 | " | 1000 |
| 10-15-24 | " | 3000 |
| 10-15-25 | " | 6000 |

TABLE 10-7

| Sample No. | Built-up Number of DA Compound Monomolecular Films | Film Thickness of Layer Containing Polymethine Compound (Å) |
|---|---|---|
| 10-16-1 | 1 | 100 |
| 10-16-2 | " | 200 |
| 10-16-3 | " | 1000 |
| 10-16-4 | " | 3000 |
| 10-16-5 | " | 6000 |
| 10-16-6 | 7 | 100 |
| 10-16-7 | " | 200 |
| 10-16-8 | " | 1000 |
| 10-16-9 | " | 3000 |
| 10-16-10 | " | 6000 |
| 10-16-11 | 41 | 100 |
| 10-16-12 | " | 200 |
| 10-16-13 | " | 1000 |
| 10-16-14 | 41 | 3000 |
| 10-16-15 | " | 6000 |
| 10-16-16 | 101 | 100 |
| 10-16-17 | " | 200 |
| 10-16-18 | " | 1000 |
| 10-16-19 | " | 3000 |
| 10-16-20 | " | 6000 |
| 10-16-21 | 201 | 100 |
| 10-16-22 | " | 200 |
| 10-16-23 | " | 1000 |
| 10-16-24 | " | 3000 |
| 10-16-25 | " | 6000 |

TABLE 10-8

| Sample No. | Sensitivity Color Change | Sensitivity Pit | Resolution Color Change | Resolution Pit | Control Ratio Color Change | Control Ratio Pit |
|---|---|---|---|---|---|---|
| 10-16-1 | ◎ | × | ◎ | × | × | × |
| 10-16-2 | ◎ | ○ | ◎ | ○ | × | × |
| 10-16-3 | ◎ | ○ | ◎ | ◎ | × | ○ |
| 10-16-4 | ◎ | × | ◎ | × | × | × |
| 10-16-5 | ◎ | × | ◎ | × | × | × |
| 10-16-6 | ◎ | ○ | ◎ | ◎ | × | × |
| 10-16-7 | ◎ | ○ | ◎ | ◎ | × | ○ |
| 10-16-8 | ◎ | ○ | ◎ | ◎ | × | ◎ |
| 10-16-9 | ◎ | × | ◎ | ○ | × | × |
| 10-16-10 | ◎ | × | ◎ | ○ | × | × |
| 10-16-11 | ○ | ○ | ○ | ○ | × | × |
| 10-16-12 | ○ | ○ | ◎ | ◎ | ◎ | × |
| 10-16-13 | ◎ | ◎ | ◎ | ◎ | ◎ | ◎ |
| 10-16-14 | ◎ | ◎ | ◎ | ◎ | ◎ | ◎ |
| 10-16-15 | ◎ | ◎ | ◎ | ◎ | ◎ | ◎ |
| 10-16-16 | × | × | × | × | × | × |
| 10-16-17 | ○ | × | ◎ | × | ◎ | × |
| 10-16-18 | ◎ | ◎ | ◎ | ◎ | ◎ | ◎ |
| 10-16-19 | ◎ | ◎ | ◎ | ◎ | ◎ | ◎ |
| 10-16-20 | ◎ | ◎ | ◎ | ◎ | ◎ | ◎ |
| 10-16-21 | × | × | × | × | × | × |
| 10-16-22 | × | × | × | × | × | × |
| 10-16-23 | ◎ | ◎ | ◎ | ◎ | ◎ | ◎ |
| 10-16-24 | ◎ | ◎ | ◎ | ◎ | ◎ | ◎ |
| 10-16-25 | ◎ | ◎ | ◎ | ◎ | ◎ | ◎ |

TABLE 10-9

| Sample No. | Built-up Number of DA Compound Monomolecular Films | Film Thickness of Layer Containing Polymethine Compound (Å) |
|---|---|---|
| 10-17-1 | 1 | 100 |
| 10-17-2 | " | 200 |
| 10-17-3 | " | 1000 |
| 10-17-4 | " | 3000 |
| 10-17-5 | " | 6000 |
| 10-17-6 | 7 | 100 |
| 10-17-7 | " | 200 |
| 10-17-8 | " | 1000 |
| 10-17-9 | " | 3000 |
| 10-17-10 | " | 6000 |
| 10-17-11 | 41 | 100 |
| 10-17-12 | " | 200 |
| 10-17-13 | " | 1000 |
| 10-17-14 | 41 | 3000 |
| 10-17-15 | " | 6000 |
| 10-17-16 | 101 | 100 |
| 10-17-17 | " | 200 |
| 10-17-18 | " | 1000 |
| 10-17-19 | " | 3000 |
| 10-17-20 | " | 6000 |
| 10-17-21 | 201 | 100 |
| 10-17-22 | " | 200 |
| 10-17-23 | " | 1000 |
| 10-17-24 | " | 3000 |
| 10-17-25 | " | 6000 |

TABLE 10-10

| Sample No. | Sensitivity Color Change | Sensitivity Pit | Resolution Color Change | Resolution Pit | Control Ratio Color Change | Control Ratio Pit |
|---|---|---|---|---|---|---|
| 10-17-1 | ◎ | × | ◎ | × | × | × |
| 10-17-2 | ◎ | ○ | ◎ | ○ | × | × |
| 10-17-3 | ◎ | ○ | ◎ | ○ | × | ○ |
| 10-17-4 | ◎ | × | ◎ | × | × | × |
| 10-17-5 | ◎ | × | ◎ | × | × | × |
| 10-17-6 | ◎ | ○ | ◎ | ◎ | × | × |
| 10-17-7 | ◎ | ◎ | ◎ | ◎ | × | ○ |
| 10-17-8 | ◎ | ◎ | ◎ | ◎ | × | ◎ |
| 10-17-9 | ◎ | × | ◎ | ◎ | × | × |
| 10-17-10 | ◎ | × | ◎ | ◎ | × | × |
| 10-17-11 | ○ | × | ○ | × | × | × |
| 10-17-12 | ◎ | ◎ | ◎ | ◎ | ◎ | × |
| 10-17-13 | ◎ | ◎ | ◎ | ◎ | ◎ | ◎ |
| 10-17-14 | ◎ | ◎ | ◎ | ◎ | ◎ | ◎ |
| 10-17-15 | ◎ | ◎ | ◎ | ◎ | ◎ | ◎ |
| 10-17-16 | × | × | × | × | × | × |
| 10-17-17 | × | × | × | × | × | × |
| 10-17-18 | ◎ | ◎ | ◎ | ◎ | ◎ | ◎ |
| 10-17-19 | ◎ | ◎ | ◎ | ◎ | ◎ | ◎ |
| 10-17-20 | ◎ | ◎ | ◎ | ◎ | ◎ | ◎ |
| 10-17-21 | × | × | × | × | × | × |
| 10-17-22 | × | × | × | × | × | × |
| 10-17-23 | ◎ | ◎ | ◎ | ◎ | ◎ | ◎ |
| 10-17-24 | ◎ | ◎ | ◎ | ◎ | ◎ | ◎ |
| 10-17-25 | ◎ | ◎ | ◎ | ◎ | ◎ | ◎ |

EXAMPLE 11-1

One part by weight of fine crystalline powder of a diacetylene derivative represented by the formula $C_{12}H_{25}-C\equiv C-C\equiv C-C_8C_{16}-COOH$ and 1 part by weight of the azulenium salt compound represented by the above formula 1-1-1 were added to 4 parts by weight of methylene chloride, followed by thorough stirring, to prepare a coating solution.

Next, a disc substrate made of a glass (thickness 1.5 mm, diameter 200 mm) was mounted on a spinner coating machine, and the above coating solution was added in a small amount dropwise at the central portion of the disc substrate and thereafter the spinner was rotated at a predetermined rotational number for a predetermined time to effect coating, followed by drying at normal temperature, to prepare optical recording media with thicknesses of coated films after drying of 500 Å, 1000 Å and 2000 Å, respectively.

On the recording media thus obtained, first UV-rays of 254 nm were irradiated uniformly and sufficiently to make the recording layers blue films.

Next, optical recording of the present invention was practiced on the recording medium having the recording layer made into a blue film by irradiating a semiconductor laser of a wavelength of 830 nm of which laser output can be varied (maximum output: 10 mW, laser beam diameter: 1 μm, irradiation time: 200 ns/pit. Laser output was made 8 mW in the case of pit recording command, while it was made 4 mW in the case of the color change recording command.

Evaluations of the recording results are shown in Table 11-1.

Overall evaluation was conducted about, sensitivity resolution and contrast ratio of the pit portion to the non-pit portion (sharpness) in both recording of pit and color change, and particularly good one was rated as ⊚, good one as ○, and incapability of recording and bad one as x.

EXAMPLE 11-2

By use of a mixed solution containing 5 parts by weight of the diacetylene derivative compound, 1 part by weight of the azulenium salt compound and 12 parts by weight of methylene chloride as the coating solution, following otherwise the same procedure as in Example 11-1, recording media were obtained, recording was peerformed thereon and evaluated.

EXAMPLE 11-3

By use of a mixed solution containing 1 part by weight of the diacetylene derivative compound, 1 parts by weight of the AZ compound and 4 parts by weight of methylene chloride and further by use of 2 parts by weight of nitrocellulose as the binder, following otherwise the same procedure as in Example 11-1, experiments were conducted.

EXAMPLE 11-4

According to the same procedure as in Example 11-1 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, an optical recording medium was prepared, experiments were conducted.

EXAMPLE 11-5

Experiments were conducted according to the same procedure as in Example 11-4 except for using an azelenium salt compound represented by the formula 1-1-6 in place of the azulenium salt compound represented by the formula 1-1-1.

EXAMPLE 11-6

According to the same procedure as in Example 11-4 except for using the azulenium compound represented by the formula 1-1-14 in place of the azulenium salt compound represented by the formula 1-1-1.

The results of Examples 11-1 to 11-6 are shown in Table 11-1.

TABLE 11-1

| Recording Medium | Film Thickness | Sensitivity *1 | Sensitivity *2 | Resolution *1 | Resolution *2 | Sharpness *1 | Sharpness *2 |
|---|---|---|---|---|---|---|---|
| Example 11-1 | 500 Å | ⊚ | ⊚ | ⊚ | ⊚ | ⊚ | ⊚ |
| | 1000 Å | ⊚ | ⊚ | ⊚ | ⊚ | ⊚ | ⊚ |
| | 2000 Å | ⊚ | ⊚ | ⊚ | ⊚ | ⊚ | ⊚ |
| Example 11-2 | 500 Å | ○ | ○ | ○ | ○ | ○ | ○ |
| | 1000 Å | ⊚ | ⊚ | ⊚ | ⊚ | ⊚ | ⊚ |
| | 2000 Å | ⊚ | ⊚ | ⊚ | ⊚ | ⊚ | ⊚ |
| Example 11-3 | 500 Å | ⊚ | ⊚ | ⊚ | ⊚ | ⊚ | ⊚ |
| | 1000 Å | ⊚ | ⊚ | ⊚ | ⊚ | ⊚ | ⊚ |
| | 2000 Å | ⊚ | ⊚ | ⊚ | ⊚ | ⊚ | ⊚ |
| Example 11-4 | 500 Å | ⊚ | ⊚ | ⊚ | ⊚ | ⊚ | ⊚ |
| | 1000 Å | ⊚ | ⊚ | ⊚ | ⊚ | ⊚ | ⊚ |
| | 2000 Å | ⊚ | ⊚ | ⊚ | ⊚ | ⊚ | ⊚ |
| Example 11-5 | 500 Å | ⊚ | ⊚ | ⊚ | ⊚ | ○ | ○ |
| | 1000 Å | ⊚ | ⊚ | ⊚ | ⊚ | ⊚ | ⊚ |
| | 2000 Å | ⊚ | ⊚ | ⊚ | ⊚ | ⊚ | ⊚ |
| Example 11-6 | 500 Å | ⊚ | ⊚ | ⊚ | ⊚ | ⊚ | ⊚ |
| | 1000 Å | ⊚ | ⊚ | ⊚ | ⊚ | ⊚ | ⊚ |
| | 2000 Å | ⊚ | ⊚ | ⊚ | ⊚ | ⊚ | ⊚ |

*1 Color change recording
*2 Pit recording

EXAMPLE 11-7

The azulenium salt compound represented by the formula 1-1-1 was dissolved in 10 parts by weight of dichloroethylene to provide a coating solution A.

Separately, 1 part by weight of fine crystalline powder of the diacetylene derivative compound represented by $C_{12}H_{25}-C\equiv C-C\equiv C-C_8C_{16}-COOH$ was added into 10 parts by weight of benzene, followed by thorough stirring, to provide a coating solution B.

Next, a disc substrate made of a glass (thickness 1.5 mm, diameter 200 mm) was mounted on a spinner coating machine, and the above coating solution A was added in a small amount dropwise at the central portion of the disc substrate and thereafter the spinner was rotated at a predetermined rotational number of a predetermined time to effect coating, followed by drying at normal temperature, to form a layer containing the azulenium salt compound on the substrate.

Subsequently, the substrate was again mounted on the spinner coating machine and the above coating solution B was applied on the surface of the layer containing the azulenium salt compound according to the same method as described above to laminate the layer containing the diacetylene derivative compound thereon to provide a recording layer. Recording media with the film thicknesses of the respective layers of 200 Å and 1000 Å were prepared, respectively.

On the recording media thus obtained, first UV-rays of 254 nm were irradiated uniformly and sufficiently to make the recording layers blue films.

Next, optical recording was practiced on the recording medium having the recording layer made into a blue film in the same manner as in Example 11-1 and evaluated. The results are shown in Table 11-2.

EXAMPLE 11-8

According to the same procedure as in Example 11-7 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C_8H_{16}-COOH$, an optical recording medium was prepared, optical recording was performed thereon and the recording results were evaluated. The results are shown in Table 11-2.

TABLE 11-2

| Recording Medium | Film Thickness | Sensitivity | | Resolution | | Sharpness | |
|---|---|---|---|---|---|---|---|
| | | *1 | *2 | *1 | *2 | *1 | *2 |
| Example 11-7 | 200 Å | ◎ | ◎ | ◎ | ◎ | ◎ | ◎ |
| | 1000 Å | ◎ | ◎ | ◎ | ◎ | ◎ | ◎ |
| Example 11-8 | 200 Å | ◎ | ◎ | ◎ | ◎ | ◎ | ◎ |
| | 1000 Å | ◎ | ◎ | ◎ | ◎ | ◎ | ◎ |

*1 Color change recording
*2 Pit recording

EXAMPLE 12-1

One part of weight of fine crystalline powder of a diacetylene derivative represented by the formula $C_{12}H_{25}-C\equiv C-C\equiv C-C_8H_{16}-COOH$ and 15 parts by weight of the pyrylium dye represented by the above formula 2-1-5 were added to 20 parts by weight of methylene chloride, followed by thorough stirring, to prepare a coating solution.

Subsequently, the same experiments as in Example 11-1 were conducted.

EXAMPLE 12-2

By use of a mixed solution containing 1 part of weight of the diacetylene derivative compound, 10 parts by weight of the pyrylium dye and 12 parts by weight of methylene chloride as the coating solution, experiments were conducted according to the same method as in Example 12-1.

EXAMPLE 12-3

By use of a mixed solution containing 1 part by weight of the diacetylene derivative compound, 5 parts by weight of the pyrylium dye and 12 parts by weight of methylene chloride as the coating solution, experiments were conducted according to the same method as in Example 12-1.

EXAMPLE 12-4

By use of a mixed solution containing 1 part by weight of the diacetylene derivative compound, 1 part by weight of the pyrylium dye and 4 parts by weight of methylene chloride as the coating solution, experiments were conducted according to the same method as in Example 12-1.

EXAMPLE 12-5

By use of a mixed solution containing 5 parts by weight of the diacetylene derivative compound, 1 part by weight of the pyrylium dye and 12 parts by weight of methylene chloride as the coating solution, experiments were conducted according to the same method as in Example 12-1.

EXAMPLE 12-6

By use of a mixed solution containing 10 parts by weight of the diacetylene derivative compound, 1 part by weight of the pyrylium dye and 20 parts by weight of methylene chloride as the coating solution, experiments were conducted according to the same method as in Example 12-1.

EXAMPLE 12-7

By use of a mixed solution containing 15 parts by weight of the diacetylene derivative compound, 1 part by weight of the pyrylium dye and 30 parts by weight of methylene chloride as the coating solution, experiments were conducted according to the same method as in Example 12-1.

The evaluation results of Examples 12-1 to 12-7 are shown in Table 12-1.

TABLE 12-1

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 12-1 | 500 Å | × | ◎ | × | ◎ | × | ◎ |
| | 1000 Å | × | ◎ | × | ◎ | × | ◎ |
| | 2000 Å | ○ | ◎ | ○ | ◎ | ○ | ◎ |
| Example 12-2 | 500 Å | × | ◎ | ◎ | ◎ | × | ◎ |
| | 1000 Å | ○ | ◎ | ◎ | ◎ | ○ | ◎ |
| | 2000 Å | ○ | ◎ | ◎ | ◎ | ○ | ◎ |
| Example 12-3 | 500 Å | ◎ | ◎ | ◎ | ◎ | ○ | ◎ |
| | 1000 Å | ◎ | ◎ | ◎ | ◎ | ○ | ◎ |
| | 2000 Å | ◎ | ◎ | ◎ | ◎ | ◎ | ◎ |
| Example 12-4 | 500 Å | ◎ | ◎ | ◎ | ◎ | ○ | ◎ |
| | 1000 Å | ◎ | ◎ | ◎ | ◎ | ◎ | ◎ |
| | 2000 Å | ◎ | ◎ | ◎ | ◎ | ◎ | ◎ |
| Example 12-5 | 500 Å | ◎ | ◎ | ◎ | ◎ | ◎ | ◎ |
| | 1000 Å | ◎ | ◎ | ◎ | ◎ | ◎ | ◎ |
| | 2000 Å | ◎ | ◎ | ◎ | ◎ | ◎ | ◎ |
| Example 12-6 | 500 Å | ○ | × | ○ | × | ○ | × |
| | 1000 Å | ○ | ○ | ○ | ○ | ○ | ○ |
| | 2000 Å | ○ | ○ | ○ | ○ | ○ | ○ |
| Example 12-7 | 500 Å | × | × | × | × | × | × |
| | 1000 Å | × | × | × | × | × | × |
| | 2000 Å | ○ | ○ | ○ | ○ | ○ | ○ |

EXAMPLE 12-8

Experiments were conducted according to the same procedure as in Example 12-3 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$.

EXAMPLES 12-9 to 12-12

According to the same procedure as in Example 12-8 except for changing the pyrylium dye in Example 12-8 to the pyrylium dyes represented by the formulae 2-1-6, 2-1-7, 2-1-14 and 2-1-16, respectively, experiments were conducted.

The results of Examples 12-8 to 12-12 are shown in Table 12-2.

TABLE 12-2

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 12-8 | 500 Å | ◎ | ◎ | ◎ | ◎ | ◎ | ◎ |
| | 1000 Å | ◎ | ◎ | ◎ | ◎ | ◎ | ◎ |
| | 2000 Å | ◎ | ◎ | ◎ | ◎ | ◎ | ◎ |
| Example 12-9 | 500 Å | ○ | ◎ | ○ | ◎ | ○ | ◎ |
| | 1000 Å | ○ | ◎ | ○ | ◎ | ○ | ◎ |
| | 2000 Å | ○ | ◎ | ○ | ◎ | ○ | ◎ |
| Example 12-10 | 500 Å | ○ | ○ | ○ | ○ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |
| Example 12-11 | 500 Å | ◎ | ◎ | ◎ | ◎ | ◎ | ◎ |
| | 1000 Å | ◎ | ◎ | ◎ | ◎ | ◎ | ◎ |
| | 2000 Å | ◎ | ◎ | ◎ | ◎ | ◎ | ◎ |
| Example 12-12 | 500 Å | ◎ | ○ | ◎ | ○ | ◎ | ○ |
| | 1000 Å | ◎ | ○ | ◎ | ○ | ◎ | ○ |
| | 2000 Å | ◎ | ○ | ◎ | ○ | ◎ | ○ |

EXAMPLE 12-13

The experiments as in Example 11-7 were conducted except for changing the azulenium salt compound in Example 11-7 to 1 parts by weight of the pyrylium dye represented by the formula 2-1-5.

However, the experiments were conducted for the 25 kinds of the optical recording media of samples 12-13-1 to 12-13-25 obtained by varying the film thickness of the layer containing the pyrylium dye and that of DA compound variously as shown in Table 12-3. Evaluation results are shown in Table 12-4.

EXAMPLE 12-14

According to the same procedure as in Example 12-13 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, 25 kinds of recording media of samples 12-14-1 to 12-14-25 as shown in Table 12-5 were obtained and the same experiments were conducted.

The results are shown in Table 12-6.

TABLE 12-3

| Sample No. | Film thickness of layer containing DA compound (Å) | Film thickness of layer containing pyrylium dye (Å) |
|---|---|---|
| 12-13-1 | 100 | 100 |
| 12-13-2 | " | 200 |
| 12-13-3 | " | 1000 |
| 12-13-4 | " | 3000 |
| 12-13-5 | " | 6000 |
| 12-13-6 | 200 | 100 |
| 12-13-7 | " | 200 |
| 12-13-8 | " | 1000 |
| 12-13-9 | " | 3000 |
| 12-13-10 | " | 6000 |
| 12-13-11 | 1000 | 100 |
| 12-13-12 | " | 200 |
| 12-13-13 | " | 1000 |
| 12-13-14 | 1000 | 3000 |
| 12-13-15 | " | 6000 |
| 12-13-16 | 3000 | 100 |
| 12-13-17 | " | 200 |
| 12-13-18 | " | 1000 |
| 12-13-19 | " | 3000 |
| 12-13-20 | " | 6000 |
| 12-13-21 | 6000 | 100 |
| 12-13-22 | " | 200 |
| 12-13-23 | " | 1000 |
| 12-13-24 | " | 3000 |
| 12-13-25 | " | 6000 |

TABLE 12-4

| Sample No. | Sensitivity | | Resolution | | Contrast ratio | |
|---|---|---|---|---|---|---|
| | Color change | Pit | Color change | Pit | Color change | Pit |
| 12-13-1 | ◎ | ◎ | ◎ | ◎ | × | × |
| 12-13-2 | ◎ | ◎ | ◎ | ◎ | × | × |
| 12-13-3 | ◎ | ◎ | ◎ | ◎ | × | ◎ |
| 12-13-4 | ◎ | ◎ | ◎ | ◎ | × | ◎ |
| 12-13-5 | ◎ | ◎ | ◎ | ◎ | × | ◎ |
| 12-13-6 | ◎ | × | ◎ | × | × | × |
| 12-13-7 | ◎ | ◎ | ◎ | ◎ | ○ | ○ |
| 12-13-8 | ◎ | ◎ | ◎ | ◎ | ○ | ◎ |
| 12-13-9 | ◎ | ○ | ◎ | ○ | ○ | ◎ |
| 12-13-10 | ◎ | × | ◎ | ○ | ○ | ◎ |
| 12-13-11 | ○ | × | ○ | × | ◎ | × |
| 12-13-12 | ◎ | ◎ | ◎ | ◎ | ◎ | ○ |
| 12-13-13 | ◎ | ◎ | ◎ | ◎ | ◎ | ◎ |

TABLE 12-4-continued

| | | | | | | |
|---|---|---|---|---|---|---|
| 12-13-14 | ◉ | ◉ | ◉ | ◉ | ◉ | ◉ |
| 12-13-15 | ◉ | ◉ | ◉ | ◉ | ◉ | ◉ |
| 12-13-16 | × | × | × | × | × | × |
| 12-13-17 | ○ | × | ◉ | × | ◉ | × |
| 12-13-18 | ◉ | ◉ | ◉ | ◉ | ◉ | ◉ |
| 12-13-19 | ◉ | ◉ | ◉ | ◉ | ◉ | ◉ |
| 12-13-20 | ◉ | ◉ | ◉ | ◉ | ◉ | ◉ |
| 12-13-21 | × | × | × | × | × | × |
| 12-13-22 | × | × | × | × | × | × |
| 12-13-23 | ◉ | ◉ | ◉ | ◉ | ◉ | ◉ |
| 12-13-24 | ◉ | ◉ | ◉ | ◉ | ◉ | ◉ |
| 12-13-25 | ◉ | ◉ | ◉ | ◉ | ◉ | ◉ |

TABLE 12-5

| Sample No. | Film thickness of layer containing DA compound (Å) | Film thickness of layer containing pyrylium dye (Å) |
|---|---|---|
| 12-14-1 | 100 | 100 |
| 12-14-2 | " | 200 |
| 12-14-3 | " | 1000 |
| 12-14-4 | " | 3000 |
| 12-14-5 | " | 6000 |
| 12-14-6 | 200 | 100 |
| 12-14-7 | " | 200 |
| 12-14-8 | " | 1000 |
| 12-14-9 | " | 3000 |
| 12-14-10 | " | 6000 |
| 12-14-11 | 1000 | 100 |
| 12-14-12 | " | 200 |
| 12-14-13 | " | 1000 |
| 12-14-14 | 1000 | 3000 |
| 12-14-15 | " | 6000 |
| 12-14-16 | 3000 | 100 |
| 12-14-17 | " | 200 |
| 12-14-18 | " | 1000 |
| 12-14-19 | " | 3000 |
| 12-14-20 | " | 6000 |
| 12-14-21 | 6000 | 100 |
| 12-14-22 | " | 200 |
| 12-14-23 | " | 1000 |
| 12-14-24 | " | 3000 |
| 12-14-25 | " | 6000 |

TABLE 12-6

| Sample No. | Sensitivity | | Resolution | | Contrast ratio | |
|---|---|---|---|---|---|---|
| | Color change | Pit | Color change | Pit | Color change | Pit |
| 12-14-1 | ○ | × | ○ | × | × | × |
| 12-14-2 | ○ | ○ | ○ | ○ | × | × |
| 12-14-3 | ◉ | ○ | ◉ | ○ | × | ○ |
| 12-14-4 | ◉ | ◉ | ◉ | ◉ | × | ◉ |
| 12-14-5 | ◉ | ◉ | ◉ | ◉ | × | ◉ |
| 12-14-6 | ◉ | × | ○ | × | × | × |
| 12-14-7 | ◉ | ○ | ◉ | ○ | ○ | ○ |
| 12-14-8 | ◉ | ◉ | ◉ | ◉ | ○ | ◉ |
| 12-14-9 | ◉ | ○ | ◉ | ○ | ○ | ◉ |
| 12-14-10 | ◉ | ◉ | ◉ | ○ | ○ | ◉ |
| 12-14-11 | ○ | × | ○ | × | ○ | × |
| 12-14-12 | ◉ | ○ | ◉ | ○ | ○ | ○ |
| 12-14-13 | ◉ | ◉ | ◉ | ◉ | ◉ | ◉ |
| 12-14-14 | ◉ | ◉ | ◉ | ◉ | ◉ | ◉ |
| 12-14-15 | ◉ | ◉ | ◉ | ◉ | ◉ | ◉ |
| 12-14-16 | × | × | × | × | × | × |
| 12-14-17 | ○ | × | ○ | × | ○ | × |
| 12-14-18 | ◉ | ◉ | ◉ | ◉ | ◉ | ◉ |
| 12-14-19 | ◉ | ◉ | ◉ | ◉ | ◉ | ◉ |
| 12-14-20 | ◉ | ◉ | ◉ | ◉ | ◉ | ◉ |
| 12-14-21 | × | × | × | × | × | × |
| 12-14-22 | × | × | × | × | × | × |
| 12-14-23 | ◉ | ◉ | ◉ | ◉ | ◉ | ◉ |
| 12-14-24 | ◉ | ◉ | ◉ | ◉ | ◉ | ◉ |
| 12-14-25 | ◉ | ◉ | ◉ | ◉ | ◉ | ◉ |

EXAMPLE 12-15 and 12-16

According to the same procedure as in Example 12-14 except for using the thiopyrylium dye and the selenapyrylium dye represented by the formulae 2-1-1 and 2-1-6, respectively, in place of the pyrylium dye represented by the formula 2-1-5 for the coating solution A, experiments were conducted.

For Example 12-15, samples are shown in Table 12-7 and the results summarized in Table 12-8.

For Example 12-16, 25 kinds of the samples are summarized in Table 12-9 and the results shown in Table 12-10.

TABLE 12-7

| Sample No. | Film thickness of layer containing DA compound (Å) | Film thickness of layer containing pyrylium dye (Å) |
|---|---|---|
| 12-15-1 | 100 | 100 |
| 12-15-2 | " | 200 |
| 12-15-3 | " | 1000 |
| 12-15-4 | " | 3000 |
| 12-15-5 | " | 6000 |
| 12-15-6 | 200 | 100 |
| 12-15-7 | " | 200 |
| 12-15-8 | " | 1000 |
| 12-15-9 | " | 3000 |
| 12-15-10 | " | 6000 |
| 12-15-11 | 1000 | 100 |
| 12-15-12 | " | 200 |
| 12-15-13 | " | 1000 |
| 12-15-14 | 1000 | 3000 |
| 12-15-15 | " | 6000 |
| 12-15-16 | 3000 | 100 |
| 12-15-17 | " | 200 |
| 12-15-18 | " | 1000 |
| 12-15-19 | " | 3000 |
| 12-15-20 | " | 6000 |
| 12-15-21 | 6000 | 100 |
| 12-15-22 | " | 200 |
| 12-15-23 | " | 1000 |
| 12-15-24 | " | 3000 |
| 12-15-25 | " | 6000 |

TABLE 12-8

| Sample No. | Sensitivity | | Resolution | | Contrast ratio | |
|---|---|---|---|---|---|---|
| | Color change | Pit | Color change | Pit | Color change | Pit |
| 12-15-1 | × | × | × | × | × | × |
| 12-15-2 | ○ | ○ | ○ | ○ | × | × |
| 12-15-3 | ◎ | ◎ | ◎ | ◎ | ○ | ◎ |
| 12-15-4 | ◎ | ◎ | ◎ | ◎ | × | ◎ |
| 12-15-5 | ◎ | ◎ | ◎ | ◎ | × | ◎ |
| 12-15-6 | ◎ | × | ◎ | × | × | × |
| 12-15-7 | ◎ | ◎ | ◎ | ◎ | ○ | ○ |
| 12-15-8 | ◎ | ◎ | ◎ | ◎ | ◎ | ◎ |
| 12-15-9 | ◎ | ○ | ◎ | ○ | ◎ | ○ |
| 12-15-10 | ◎ | ◎ | ◎ | ○ | ○ | ◎ |
| 12-15-11 | ○ | × | ○ | × | ○ | × |
| 12-15-12 | ◎ | ◎ | ◎ | ◎ | ◎ | ◎ |
| 12-15-13 | ◎ | ◎ | ◎ | ◎ | ◎ | ◎ |
| 12-15-14 | ◎ | ◎ | ◎ | ◎ | ◎ | ◎ |
| 12-15-15 | ◎ | ◎ | ◎ | ◎ | ◎ | ◎ |
| 12-15-16 | × | × | × | × | × | × |
| 12-15-17 | ○ | × | ○ | × | ○ | × |
| 12-15-18 | ◎ | ◎ | ◎ | ◎ | ◎ | ◎ |
| 12-15-19 | ◎ | ◎ | ◎ | ◎ | ◎ | ◎ |
| 12-15-20 | ◎ | ◎ | ◎ | ◎ | ◎ | ◎ |
| 12-15-21 | × | × | × | × | × | × |
| 12-15-22 | × | × | × | × | × | × |
| 12-15-23 | ◎ | ◎ | ◎ | ◎ | ◎ | ◎ |
| 12-15-24 | ◎ | ◎ | ◎ | ◎ | ◎ | ◎ |
| 12-15-25 | ◎ | ◎ | ◎ | ◎ | ◎ | ◎ |

TABLE 12-9

| Sample No. | Film thickness of layer containing DA compound (Å) | Film thickness of layer containing pyrylium dye (Å) |
|---|---|---|
| 12-16-1 | 100 | 100 |
| 12-16-2 | " | 200 |
| 12-16-3 | " | 1000 |
| 12-16-4 | " | 3000 |
| 12-16-5 | " | 6000 |
| 12-16-6 | 200 | 100 |
| 12-16-7 | " | 200 |
| 12-16-8 | " | 1000 |
| 12-16-9 | " | 3000 |
| 12-16-10 | " | 6000 |
| 12-16-11 | 1000 | 100 |
| 12-16-12 | " | 200 |
| 12-16-13 | " | 1000 |
| 12-16-14 | 1000 | 3000 |
| 12-16-15 | " | 6000 |
| 12-16-16 | 3000 | 100 |
| 12-16-17 | " | 200 |
| 12-16-18 | " | 1000 |
| 12-16-19 | " | 3000 |
| 12-16-20 | " | 6000 |
| 12-16-21 | 6000 | 100 |
| 12-16-22 | " | 200 |
| 12-16-23 | " | 1000 |
| 12-16-24 | " | 3000 |
| 12-16-25 | " | 6000 |

TABLE 12-10

| Sample No. | Sensitivity | | Resolution | | Contrast ratio | |
|---|---|---|---|---|---|---|
| | Color change | Pit | Color change | Pit | Color change | Pit |
| 12-16-1 | ○ | × | ○ | × | × | × |
| 12-16-2 | ○ | ○ | ○ | ○ | × | × |
| 12-16-3 | ◎ | ◎ | ◎ | ◎ | ○ | ◎ |
| 12-16-4 | ◎ | ◎ | ◎ | ◎ | × | ◎ |
| 12-16-5 | ◎ | ◎ | ◎ | ◎ | × | ◎ |
| 12-16-6 | ○ | × | ○ | × | × | × |
| 12-16-7 | ◎ | ◎ | ◎ | ◎ | ○ | ○ |

TABLE 12-10 - Continued

| Sample No. | Sensitivity | | Resolution | | Contrast ratio | |
|---|---|---|---|---|---|---|
| | Color change | Pit | Color change | Pit | Color change | Pit |
| 12-16-8 | ◉ | ◉ | ◉ | ◉ | ○ | ◉ |
| 12-16-9 | ◉ | ○ | ◉ | ○ | ○ | ◉ |
| 12-16-10 | ◉ | ○ | ◉ | ○ | ○ | ◉ |
| 12-16-11 | ○ | × | ○ | × | ○ | × |
| 12-16-12 | ◉ | ◉ | ◉ | ◉ | ◉ | ◉ |
| 12-16-13 | ◉ | ◉ | ◉ | ◉ | ◉ | ◉ |
| 12-16-14 | ◉ | ◉ | ◉ | ◉ | ◉ | ◉ |
| 12-16-15 | ◉ | ◉ | ◉ | ◉ | ◉ | ◉ |
| 12-16-16 | × | × | × | × | × | × |
| 12-16-17 | ○ | × | ◉ | × | ◉ | × |
| 12-16-18 | ◉ | ◉ | ◉ | ◉ | ◉ | ◉ |
| 12-16-19 | ◉ | ◉ | ◉ | ◉ | ◉ | ◉ |
| 12-16-20 | ◉ | ◉ | ◉ | ◉ | ◉ | ◉ |
| 12-16-21 | × | × | × | × | × | × |
| 12-16-22 | × | × | × | × | × | × |
| 12-16-23 | ◉ | ◉ | ◉ | ◉ | ◉ | ◉ |
| 12-16-24 | ◉ | ◉ | ◉ | ◉ | ◉ | ◉ |
| 12-16-25 | ◉ | ◉ | ◉ | ◉ | ◉ | ◉ |

EXAMPLE 13-1

One part by weight of fine crystalline powder of a diacetylene derivative represented by the formula $C_{12}H_{25}-C\equiv C-C\equiv C-C_8H_{16}-COOH$ and 15 parts by weight of the diene compound salt represented by the above formula 3-1-1 were added to 30 parts by weight of methylene chloride, followed by thorough stirring, to prepare a coating solution.

Subsequently, the same experiments as in Example 12-1 were conducted.

EXAMPLE 13-2

By use of a mixed solution containing 1 part by weight of the diacetylene derivative compound, 10 parts by weight of the diene compound salt and 20 parts by weight of methylene chloride as the coating solution, experiments were conducted according to the same method as in Example 13-1.

EXAMPLE 13-3

By use of a mixed solution containing 1 part by weight of the diacetylene derivative compound, 5 parts by weight of the diene compound salt and 12 parts by weight of methylene chloride as the coating solution, experiments were conducted according to the same method as in Example 13-1.

EXAMPLE 13-4

By use of a mixed solution containing 1 part by weight of the diacetylene derivative compound, 1 part by weight of the diene compound salt and 4 parts by weight of methylene chloride as the coating solution, experiments were conducted according to the same method as in Example 13-1.

EXAMPLE 13-5

By use of a mixed solution containing 5 parts by weight of the diacetylene derivative compound, 1 part by weight of the diene compound salt and 12 parts by weight of methylene chloride as the coating solution, experiments were conducted according to the same method as in Example 13-1.

EXAMPLE 13-6

By use of a mixed solution containing 10 parts by weight of the diacetylene derivative compound, 1 part by weight of the diene compound salt and 20 parts by weight of methylene chloride as the coating solution experiments were conducted according to the same method as in Example 13-1.

EXAMPLE 13-7

By use of a mixed solution containg 15 parts by weight of the diacetylene derivative compound, 1 part by weight of the diene compound salt and 30 parts by weight of methylene chloride as the coating solution, experiments were conducted according to the same method as in Example 13-1.

The evaluation results of Examples 13-1 to 13-7 are shown in Table 13-1.

TABLE 13-1

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 13-1 | 500 Å | × | ◉ | × | ◉ | × | ○ |
| | 1000 Å | × | ◉ | × | ◉ | × | ◉ |
| | 2000 Å | ○ | ◉ | ○ | ◉ | ○ | ◉ |
| Example 13-2 | 500 Å | × | ◉ | × | ◉ | × | ○ |
| | 1000 Å | ○ | ◉ | ○ | ◉ | ○ | ◉ |
| | 2000 Å | ○ | ◉ | ○ | ◉ | ○ | ◉ |
| Example 13-3 | 500 Å | ◉ | ◉ | ◉ | ◉ | ○ | ○ |
| | 1000 Å | ◉ | ◉ | ◉ | ◉ | ◉ | ◉ |
| | 2000 Å | ◉ | ◉ | ◉ | ◉ | ◉ | ◉ |
| Example 13-4 | 500 Å | ◉ | ◉ | ◉ | ◉ | ○ | ○ |
| | 1000 Å | ◉ | ◉ | ◉ | ◉ | ◉ | ◉ |

TABLE 13-1-continued

| Optical recording medium | Film thickness | Sensitivity | | Resolution | | Contrast ratio | |
|---|---|---|---|---|---|---|---|
| | | Color change | Pit | Color change | Pit | Color change | Pit |
| | 2000 Å | ◎ | ◎ | ◎ | ◎ | ◎ | ◎ |
| Example 13-5 | 500 Å | ◎ | ◎ | ◎ | ◎ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |
| Example 13-6 | 500 Å | ○ | × | ○ | × | ○ | × |
| | 1000 Å | ○ | × | ○ | × | ○ | × |
| | 2000 Å | ◎ | ○ | ◎ | ○ | ◎ | ○ |
| Example 13-7 | 500 Å | × | × | × | × | × | × |
| | 1000 Å | × | × | × | × | × | × |
| | 2000 Å | ○ | ○ | ○ | ○ | ○ | ○ |

EXAMPLES 13-8

Experiments were conducted according to the same procedure as in Example 13-4 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$.

EXAMPLES 13-9 to 13-13

According to the same procedure as in Example 13-8 except for changing the diene compound salt in Example 13-8 to the diene compound salts represented by the formulae 3-1-3, 3-1-8, 3-1-12, 3-1-15 and 3-1-20, respectively, experiments were conducted.

The results of Examples 13-8 to 13-13 are shown in Table 13-2.

TABLE 13-2

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 13-8 | 500 Å | ◎ | ◎ | ◎ | ◎ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |
| Example 13-9 | 500 Å | ○ | ○ | ○ | ○ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |
| Example 13-10 | 500 Å | ○ | ◎ | ○ | ◎ | × | ○ |
| | 1000 Å | ○ | ◎ | ○ | ◎ | ○ | ◎ |

TABLE 13-2-continued

| Optical recording medium | Film thickness | Sensitivity | | Resolution | | Contrast ratio | |
|---|---|---|---|---|---|---|---|
| | | Color change | Pit | Color change | Pit | Color change | Pit |
| | 2000 Å | ◎ | ◎ | ◎ | ◎ | ◎ | ◎ |
| Example 13-11 | 500 Å | ○ | ○ | ○ | ○ | × | ○ |
| | 1000 Å | ○ | ◎ | ○ | ◎ | ○ | ◎ |
| | 2000 Å | ◎ | ◎ | ◎ | ◎ | ◎ | ◎ |
| Example 13-12 | 500 Å | ○ | ○ | ○ | ○ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |
| Example 13-13 | 500 Å | ◎ | ◎ | ◎ | ◎ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |

EXAMPLE 13-14

The experiments as in Example 11-7 were conducted except for changing the azulenium salt compound in Example 11-7 to 1 part by weight of the diene compound salt represented by the formula 3-1-1.

However, the experiments were conducted for the 25 kinds of the optical recording media of samples 13-14-1 to 13-14-25 obtained by varying the film thickness of the layer containing the diene compound salt and that of DA compound variously as shown in Table 13-3. Evaluation results are shown in Table 13-4.

EXAMPLE 13-15

According to the same procedure as in Example 13-14 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, 25 kinds of recording media of samples 13-15-1 to 13-15-25 as shown in Table 13-5 were obtained and the same experiments were conducted.

The results are shown in Table 13-6.

TABLE 13-3

| Sample No. | Film thickness of layer containing DA compound (Å) | Film thickness of layer containing diene compound (Å) salt |
|---|---|---|
| 13-14-1 | 100 | 100 |
| 13-14-2 | " | 200 |
| 13-14-3 | " | 1000 |
| 13-14-4 | " | 3000 |
| 13-14-5 | " | 6000 |
| 13-14-6 | " | 100 |
| 13-14-7 | " | 200 |
| 13-14-8 | " | 1000 |
| 13-14-9 | " | 3000 |
| 13-14-10 | " | 6000 |
| 13-14-11 | 1000 | 100 |
| 13-14-12 | " | 200 |
| 13-14-13 | " | 1000 |

TABLE 13-3-continued

| Sample No. | | |
|---|---|---|
| 13-14-14 | 1000 | 3000 |
| 13-14-15 | " | 6000 |
| 13-14-16 | 3000 | 100 |
| 13-14-17 | " | 200 |
| 13-14-18 | " | 1000 |
| 13-14-19 | " | 3000 |
| 13-14-20 | " | 6000 |
| 13-14-21 | 6000 | 100 |
| 13-14-22 | " | 200 |
| 13-14-23 | " | 1000 |
| 13-14-24 | " | 3000 |
| 13-14-25 | " | 6000 |

TABLE 13-4

| Sample No. | Sensitivity | | Resolution | | Contrast ratio | |
|---|---|---|---|---|---|---|
| | Color change | Pit | Color change | Pit | Color change | Pit |
| 13-14-1 | ◉ | ○ | ◉ | ○ | ○ | ○ |
| 13-14-2 | ◉ | ◉ | ◉ | ◉ | ○ | ○ |
| 13-14-3 | ◉ | ◉ | ◉ | ◉ | ○ | ◉ |
| 13-14-4 | ◉ | ◉ | ◉ | ◉ | ○ | ◉ |
| 13-14-5 | ◉ | ◉ | ◉ | ◉ | ○ | ◉ |
| 13-14-6 | ◉ | ◉ | ◉ | ◉ | ○ | ○ |
| 13-14-7 | ◉ | ◉ | ◉ | ◉ | ○ | ○ |
| 13-14-8 | ◉ | ◉ | ◉ | ◉ | ○ | ◉ |
| 13-14-9 | ◉ | ○ | ◉ | ◉ | ○ | ◉ |
| 13-14-10 | ◉ | ◉ | ◉ | ◉ | ○ | ◉ |
| 13-14-11 | ○ | × | ○ | × | ◉ | × |
| 13-14-12 | ◉ | ◉ | ◉ | ◉ | ◉ | ○ |
| 13-14-13 | ◉ | ◉ | ◉ | ◉ | ◉ | ◉ |
| 13-14-14 | ◉ | ◉ | ◉ | ◉ | ◉ | ◉ |
| 13-14-15 | ◉ | ◉ | ◉ | ◉ | ◉ | ◉ |
| 13-14-16 | × | × | × | × | × | × |
| 13-14-17 | ○ | × | ◉ | × | ○ | × |
| 13-14-18 | ◉ | ◉ | ◉ | ◉ | ◉ | ◉ |
| 13-14-19 | ◉ | ◉ | ◉ | ◉ | ◉ | ◉ |
| 13-14-20 | ◉ | ◉ | ◉ | ◉ | ◉ | ◉ |
| 13-14-21 | × | × | × | × | × | × |

TABLE 13-4-continued

| Sample No. | Sensitivity | | Resolution | | Contrast ratio | |
|---|---|---|---|---|---|---|
| | Color change | Pit | Color change | Pit | Color change | Pit |
| 13-14-22 | × | × | × | × | × | × |
| 13-14-23 | ◉ | ◉ | ◉ | ◉ | ◉ | ◉ |
| 13-14-24 | ◉ | ◉ | ◉ | ◉ | ◉ | ◉ |
| 13-14-25 | ◉ | ◉ | ◉ | ◉ | ◉ | ◉ |

TABLE 13-5

| Sample No. | Film thickness of layer containing DA compound (Å) | Film thickness of layer containing diene compound salt (Å) |
|---|---|---|
| 13-15-1 | 100 | 100 |
| 13-15-2 | " | 200 |
| 13-15-3 | " | 1000 |
| 13-15-4 | " | 3000 |
| 13-15-5 | " | 6000 |
| 13-15-6 | 200 | 100 |
| 13-15-7 | " | 200 |
| 13-15-8 | " | 1000 |
| 13-15-9 | " | 3000 |
| 13-15-10 | " | 6000 |
| 13-15-11 | 1000 | 100 |
| 13-15-12 | " | 200 |
| 13-15-13 | " | 1000 |
| 13-15-14 | 1000 | 3000 |
| 13-15-15 | " | 6000 |
| 13-15-16 | 3000 | 100 |
| 13-15-17 | " | 200 |
| 13-15-18 | " | 1000 |
| 13-15-19 | " | 3000 |
| 13-15-20 | " | 6000 |
| 13-15-21 | 6000 | 100 |
| 13-15-22 | " | 200 |
| 13-15-23 | " | 1000 |
| 13-15-24 | " | 3000 |
| 13-15-25 | " | 6000 |

TABLE 13-6

| Sample No. | Sensitivity | | Resolution | | Contrast ratio | |
|---|---|---|---|---|---|---|
| | Color change | Pit | Color change | Pit | Color change | Pit |
| 13-15-1 | ○ | ○ | ○ | × | ○ | ○ |
| 13-15-2 | ○ | ◉ | ○ | ◉ | ○ | ○ |
| 13-15-3 | ◉ | ◉ | ◉ | ◉ | ○ | ◉ |
| 13-15-4 | ◉ | ◉ | ◉ | ◉ | ○ | ◉ |
| 13-15-5 | ◉ | ◉ | ◉ | ◉ | ○ | ◉ |
| 13-15-6 | ◉ | ◉ | ○ | ◉ | ○ | ◉ |
| 13-15-7 | ◉ | ◉ | ◉ | ○ | ◉ | ○ |
| 13-15-8 | ◉ | ◉ | ◉ | ◉ | ◉ | ◉ |
| 13-15-9 | ◉ | ◉ | ◉ | ○ | ◉ | ◉ |
| 13-15-10 | ◉ | ◉ | ◉ | ○ | ◉ | ◉ |

TABLE 13-6-continued

| Sample No. | Sensitivity | | Resolution | | Contrast ratio | |
|---|---|---|---|---|---|---|
| | Color change | Pit | Color change | Pit | Color change | Pit |
| 13-15-11 | ○ | × | ○ | × | ○ | × |
| 13-15-12 | ◎ | ◎ | ◎ | ◎ | ◎ | ◎ |
| 13-15-13 | ◎ | ◎ | ◎ | ◎ | ◎ | ◎ |
| 13-15-14 | ◎ | ◎ | ◎ | ◎ | ◎ | ◎ |
| 13-15-15 | ◎ | ◎ | ◎ | ◎ | ◎ | ◎ |
| 13-15-16 | × | × | × | × | × | × |
| 13-15-17 | ○ | × | ○ | × | ○ | × |
| 13-15-18 | ◎ | ◎ | ◎ | ◎ | ◎ | ◎ |
| 13-15-19 | ◎ | ◎ | ◎ | ◎ | ◎ | ◎ |
| 13-15-20 | ◎ | ◎ | ◎ | ◎ | ◎ | ◎ |
| 13-15-21 | × | × | × | × | × | × |
| 13-15-22 | × | × | × | × | × | × |
| 13-15-23 | ◎ | ◎ | ◎ | ◎ | ◎ | ◎ |
| 13-15-24 | ◎ | ◎ | ◎ | ◎ | ◎ | ◎ |
| 13-15-25 | ◎ | ◎ | ◎ | ◎ | ◎ | ◎ |

EXAMPLE 13-16 and 13-17

According to the same procedure as in Example 13-15 except for using the diene compound salts represented by the formulae 3-1-5 and 3-1-10, respectively, in place of the diene compound salt represented by the formula 3-1-1 for the coating solution A, experiments were conducted.

For example 13-16, samples were shown in Table 13-7 and the results summarized in Table 13-8.

For Example 13-17, 25 kinds of the samples are summarized in Table 13-9 and the results shown in Table 13-10.

TABLE 13-7

| Sample No. | Film thickness of layer containing DA compound (Å) | Film thickness of layer containing diene compound (Å) salt |
|---|---|---|
| 13-16-1 | 100 | 100 |
| 13-16-2 | " | 200 |
| 13-16-3 | " | 1000 |
| 13-16-4 | " | 3000 |
| 13-16-5 | " | 6000 |
| 13-16-6 | 200 | 100 |
| 13-16-7 | " | 200 |
| 13-16-8 | " | 1000 |
| 13-16-9 | " | 3000 |
| 13-16-10 | " | 6000 |
| 13-16-11 | 1000 | 100 |
| 13-16-12 | " | 200 |
| 13-16-13 | " | 1000 |
| 13-16-14 | 1000 | 3000 |

TABLE 13-7-continued

| | | |
|---|---|---|
| 13-16-15 | " | 6000 |
| 13-16-16 | 3000 | 100 |
| 13-16-17 | " | 200 |
| 13-16-18 | " | 1000 |
| 13-16-19 | " | 3000 |
| 13-16-20 | " | 6000 |
| 13-16-21 | 6000 | 100 |
| 13-16-22 | " | 200 |
| 13-16-23 | " | 1000 |
| 13-16-24 | " | 3000 |
| 13-16-25 | " | 6000 |

TABLE 13-8

| Sample No. | Sensitivity | | Resolution | | Contrast ratio | |
|---|---|---|---|---|---|---|
| | Color change | Pit | Color change | Pit | Color change | Pit |
| 13-16-1 | ◎ | ◎ | ◎ | ◎ | × | × |
| 13-16-2 | ◎ | ◎ | ◎ | ◎ | × | × |
| 13-16-3 | ◎ | ◎ | ◎ | ◎ | × | ◎ |
| 13-16-4 | ◎ | ◎ | ◎ | ◎ | × | ◎ |
| 13-16-5 | ◎ | ◎ | ◎ | ◎ | × | ◎ |
| 13-16-6 | ◎ | ◎ | ◎ | ◎ | × | × |
| 13-16-7 | ◎ | ◎ | ◎ | ◎ | × | × |
| 13-16-8 | ◎ | ◎ | ◎ | ◎ | × | ◎ |
| 13-16-9 | ◎ | ◎ | ◎ | ◎ | × | ◎ |
| 13-16-10 | ◎ | ◎ | ◎ | ◎ | × | ◎ |
| 13-16-11 | ○ | ◎ | ○ | ◎ | ○ | × |
| 13-16-12 | ○ | ◎ | ○ | ◎ | ○ | × |
| 13-16-13 | ◎ | ◎ | ◎ | ◎ | ◎ | ◎ |
| 13-16-14 | ◎ | ◎ | ◎ | ◎ | ◎ | ◎ |
| 13-16-15 | ◎ | ◎ | ◎ | ◎ | ◎ | ◎ |
| 13-16-16 | × | ◎ | × | ◎ | × | × |
| 13-16-17 | ○ | ◎ | ○ | ◎ | ○ | × |
| 13-16-18 | ◎ | ◎ | ◎ | ◎ | ◎ | ◎ |
| 13-16-19 | ◎ | ◎ | ◎ | ◎ | ◎ | ◎ |
| 13-16-20 | ◎ | ◎ | ◎ | ◎ | ◎ | ◎ |
| 13-16-21 | × | ◎ | × | ◎ | × | × |
| 13-16-22 | × | ◎ | × | ◎ | × | × |
| 13-16-23 | ○ | ◎ | ○ | ◎ | ○ | ◎ |

Table 13-8-continued

| Sample No. | Sensitivity | | Resolution | | Contrast ratio | |
|---|---|---|---|---|---|---|
| | Color change | Pit | Color change | Pit | Color change | Pit |
| 13-16-24 | ◎ | ◎ | ◎ | ◎ | ◎ | ◎ |
| 13-16-25 | ◎ | ◎ | ◎ | ◎ | ◎ | ◎ |

TABLE 13-9

| Sample No. | Film thickness of layer containing DA compound (Å) | Film thickness of layer containing diene compound (Å) salt |
|---|---|---|
| 13-17-1 | 100 | 100 |
| 13-17-2 | " | 200 |
| 13-17-3 | " | 1000 |
| 13-17-4 | " | 3000 |
| 13-17-5 | " | 6000 |
| 13-17-6 | 200 | 100 |
| 13-17-7 | " | 200 |
| 13-17-8 | " | 1000 |
| 13-17-9 | " | 3000 |
| 13-17-10 | " | 6000 |
| 13-17-11 | 1000 | 100 |
| 13-17-12 | " | 200 |
| 13-17-13 | " | 1000 |
| 13-17-14 | 1000 | 3000 |
| 13-17-15 | " | 6000 |
| 13-17-16 | 3000 | 100 |
| 13-17-17 | " | 200 |
| 13-17-18 | " | 1000 |
| 13-17-19 | " | 3000 |
| 13-17-20 | " | 6000 |
| 13-17-21 | 6000 | 100 |
| 13-17-22 | " | 200 |
| 13-17-23 | " | 1000 |
| 13-17-24 | " | 3000 |
| 13-17-25 | " | 6000 |

TABLE 13-10

| Sample No. | Sensitivity | | Resolution | | Contrast ratio | |
|---|---|---|---|---|---|---|
| | Color change | Pit | Color change | Pit | Color change | Pit |
| 13-17-1 | ◎ | ◎ | ◎ | ◎ | × | × |
| 13-17-2 | ◎ | ◎ | ◎ | ◎ | × | × |
| 13-17-3 | ◎ | ◎ | ◎ | ◎ | × | ◎ |
| 13-17-4 | ◎ | ◎ | ◎ | ◎ | × | ◎ |
| 13-17-5 | ◎ | ◎ | ◎ | ◎ | ○ | ◎ |
| 13-17-6 | ◎ | ◎ | ◎ | ◎ | × | × |
| 13-17-7 | ◎ | ◎ | ◎ | ◎ | × | × |
| 13-17-8 | ◎ | ◎ | ◎ | ◎ | × | ◎ |
| 13-17-9 | ◎ | ◎ | ◎ | ◎ | ○ | ◎ |
| 13-17-10 | ◎ | ◎ | ◎ | ◎ | ○ | ◎ |
| 13-17-11 | ○ | ◎ | ○ | ◎ | ○ | × |
| 13-17-12 | ○ | ◎ | ○ | ◎ | ○ | × |
| 13-17-13 | ◎ | ◎ | ◎ | ◎ | ◎ | ◎ |
| 13-17-14 | ◎ | ◎ | ◎ | ◎ | ◎ | ◎ |
| 13-17-15 | ◎ | ◎ | ◎ | ◎ | ◎ | ◎ |
| 13-17-16 | × | ◎ | × | ◎ | × | × |
| 13-17-17 | ○ | ◎ | ○ | ◎ | ○ | × |
| 13-17-18 | ◎ | ◎ | ◎ | ◎ | ◎ | ◎ |
| 13-17-19 | ◎ | ◎ | ◎ | ◎ | ◎ | ◎ |
| 13-17-20 | ◎ | ◎ | ◎ | ◎ | ◎ | ◎ |
| 13-17-21 | × | ◎ | × | ◎ | × | × |
| 13-17-22 | × | ◎ | × | ◎ | × | × |
| 13-17-23 | ○ | ◎ | ○ | ◎ | ○ | ◎ |
| 13-17-24 | ◎ | ◎ | ◎ | ◎ | ◎ | ◎ |
| 13-17-25 | ◎ | ◎ | ◎ | ◎ | ◎ | ◎ |

EXAMPLES 14-1 to 14-7

Experiments of Example 13-1 to 13-7 were repeated by use of 15 parts by weight of the croconic methine dye represented by the formula 4-1-25 in place of the diene compound used in Examples 13-1 to 13-7.

The seven results are shown in Table 14-1.

TABLE 14-1

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 14-1 | 500 Å | × | ◎ | × | ◎ | × | ◎ |
| | 1000 Å | × | ◎ | × | ◎ | × | ◎ |
| | 2000 Å | ○ | ◎ | ○ | ◎ | ○ | ◎ |
| Example 14-2 | 500 Å | × | ◎ | × | ◎ | × | ◎ |
| | 1000 Å | ○ | ◎ | ○ | ◎ | ○ | ◎ |
| | 2000 Å | ○ | ◎ | ○ | ◎ | ○ | ◎ |
| Exmaple 14-3 | 500 Å | ◎ | ◎ | ◎ | ◎ | ◎ | ◎ |
| | 1000 Å | ◎ | ◎ | ◎ | ◎ | ◎ | ◎ |
| | 2000 Å | ◎ | ◎ | ◎ | ◎ | ◎ | ◎ |

Table 14-1 Continued

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 14-4 | 500 Å | ◎ | ◎ | ◎ | ◎ | ◎ | ◎ |
| | 1000 Å | ◎ | ◎ | ◎ | ◎ | ◎ | ◎ |
| | 2000 Å | ◎ | ◎ | ◎ | ◎ | ◎ | ◎ |
| Example 14-5 | 500 Å | ◎ | ◎ | ◎ | ◎ | ◎ | ○ |
| | 1000 Å | ◎ | ◎ | ◎ | ◎ | ◎ | ◎ |
| | 2000 Å | ◎ | ◎ | ◎ | ○ | ◎ | ◎ |
| Example 14-6 | 500 Å | × | ○ | ○ | × | × | × |
| | 1000 Å | ○ | ○ | ○ | ○ | ○ | ○ |
| | 2000 Å | ○ | ○ | ○ | ○ | ○ | ○ |
| Example 14-7 | 500 Å | × | × | × | × | × | × |
| | 1000 Å | × | × | × | × | × | × |
| | 2000 Å | ○ | × | ○ | × | ○ | × |

EXAMPLES 14-8

Experiments were conducted according to the same procedure as in Example 13-8 except for using the croconic methine dye represented by the formula 4-1-25 in place of the diene compound of Example 13-8.

EXAMPLES 14-9 TO 14-12

According to the same procedure as in Example 14-8 except for changing the croconic methine dye in Example 14-8 to the croconic methine dyes represented by the formulae 4-1-2, 4-1-29, 4-1-37 and 4-1-42, respectively, experiments were conducted.

The results of Examples 14-8 to 14-12 are shown in Table 14-2.

TABLE 14-2

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 14-8 | 500 Å | ◎ | ◎ | ◎ | ○ | ◎ | ○ |
| | 1000 Å | ◎ | ◎ | ◎ | ◎ | ◎ | ◎ |
| | 2000 Å | ◎ | ◎ | ◎ | ◎ | ◎ | ◎ |
| Example 14-9 | 500 Å | ◎ | ◎ | ◎ | ○ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |

Table 14-2 Continued

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 14-10 | 500 Å | ◎ | ◎ | ◎ | ◎ | ◎ | ◎ |
| | 1000 Å | ◎ | ◎ | ◎ | ◎ | ◎ | ◎ |
| | 2000 Å | ◎ | ◎ | ◎ | ◎ | ◎ | ◎ |
| Example 14-11 | 500 Å | ○ | ○ | ○ | ○ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |
| Example 14-12 | 500 Å | ○ | ○ | ○ | ○ | ○ | ○ |
| | 1000 Å | ◎ | ◎ | ◎ | ◎ | ◎ | ◎ |
| | 2000 Å | ◎ | ◎ | ◎ | ◎ | ◎ | ◎ |

EXAMPLE 14-13

The experiments as in Example 11-7 were conducted except for changing the azulenium salt compound in Example 11-7 to the croconic methine dye represented by the formula 4-1-25.

However, the experiments were conducted for the 25 kinds of the optical recording media of samples 14-13-1 to 14-13-25 obtained by varying the film thickness of the layer containing the croconic methine dye and that of DA compound variously as shown in Table 14-3. Evaluation results are shown in Table 14-3.

EXAMPLE 14-14

According to the same procedure as in Example 13-14 except for using a diacetylene derivative compound represented by $C_8H_{17}C\equiv C-C\equiv C-C_2H_4-COOH$ as the coating solution B in place of the diacetylene derivative compound represented by $C_{12}H_{25}-C\equiv C-C\equiv C-C_8H_{16}-COOH$, 25 kinds of recording media of samples 14-14-1 to 14-14-25 as shown in Table 14-5 were obtained and the same experiments were conducted.

The results are shown in Table 14-6.

TABLE 14-3

| Sample No. | Film thickness of layer containing DA compound (Å) | Film thickness of layer containing croconic methine dye (Å) |
|---|---|---|
| 14-13-1 | 100 | 100 |
| 14-13-2 | " | 200 |
| 14-13-3 | " | 1000 |
| 14-13-4 | " | 3000 |
| 14-13-5 | " | 6000 |
| 14-13-6 | 200 | 100 |
| 14-13-7 | " | 200 |
| 14-13-8 | " | 1000 |
| 14-13-9 | " | 3000 |
| 14-13-10 | " | 6000 |
| 14-13-11 | 1000 | 100 |
| 14-13-12 | " | 200 |
| 14-13-13 | " | 1000 |
| 14-13-14 | 1000 | 3000 |
| 14-13-15 | " | 6000 |
| 14-13-16 | 3000 | 100 |

TABLE 14-3-continued

| Sample No. | Film thickness of layer containing DA compound (Å) | Film thickness of layer containing croconic methine dye (Å) |
|---|---|---|
| 14-13-17 | " | 100 |
| 14-13-18 | " | 200 |
| 14-13-19 | " | 1000 |
| 14-13-20 | " | 3000 |
| 14-13-21 | 6000 | 6000 |
| 14-13-22 | " | 100 |
| 14-13-23 | " | 200 |
| 14-13-24 | " | 1000 |
| 14-13-25 | " | 3000 |
|  | " | 6000 |

*Note: alignment in original appears to have 14-13-21 at 6000 DA with 100 croc. Reproducing as printed:*

| Sample No. | Film thickness of layer containing DA compound (Å) | Film thickness of layer containing croconic methine dye (Å) |
|---|---|---|
| 14-13-17 | " | 200 |
| 14-13-18 | " | 1000 |
| 14-13-19 | " | 3000 |
| 14-13-20 | " | 6000 |
| 14-13-21 | 6000 | 100 |
| 14-13-22 | " | 200 |
| 14-13-23 | " | 1000 |
| 14-13-24 | " | 3000 |
| 14-13-25 | " | 6000 |

TABLE 14-4

| Sample No. | Sensitivity Color change | Sensitivity Pit | Resolution Color change | Resolution Pit | Contrast ratio Color change | Contrast ratio Pit |
|---|---|---|---|---|---|---|
| 14-13-1 | ⊚ | × | ⊚ | × | × | × |
| 14-13-2 | ⊚ | ○ | ⊚ | ○ | × | ○ |
| 14-13-3 | ⊚ | ⊚ | ⊚ | ⊚ | × | ⊚ |
| 14-13-4 | ⊚ | ⊚ | ⊚ | ⊚ | × | ⊚ |
| 14-13-5 | ⊚ | ⊚ | ⊚ | ⊚ | × | ⊚ |
| 14-13-6 | ⊚ | × | ⊚ | × | × | × |
| 14-13-7 | ⊚ | ○ | ⊚ | ○ | × | ○ |
| 14-13-8 | ⊚ | ⊚ | ⊚ | ⊚ | ○ | ⊚ |
| 14-13-9 | ⊚ | ⊚ | ⊚ | ⊚ | ○ | ⊚ |
| 14-13-10 | ⊚ | ⊚ | ⊚ | ⊚ | ○ | ⊚ |
| 14-13-11 | ○ | × | ○ | × | ○ | × |
| 14-13-12 | ⊚ | ○ | ⊚ | ○ | ⊚ | ○ |
| 14-13-13 | ⊚ | ⊚ | ⊚ | ⊚ | ⊚ | ⊚ |
| 14-13-14 | ⊚ | ⊚ | ⊚ | ⊚ | ⊚ | ⊚ |
| 14-13-15 | ⊚ | ⊚ | ⊚ | ⊚ | ⊚ | ⊚ |
| 14-13-16 | × | × | × | × | × | × |
| 14-13-17 | ○ | ○ | ⊚ | ○ | ○ | ○ |
| 14-13-18 | ⊚ | ⊚ | ⊚ | ⊚ | ⊚ | ⊚ |
| 14-13-19 | ⊚ | ⊚ | ⊚ | ⊚ | ⊚ | ⊚ |
| 14-13-20 | ⊚ | ⊚ | ⊚ | ⊚ | ⊚ | ⊚ |
| 14-13-21 | × | × | × | × | × | × |

TABLE 14-4-continued

| Sample No. | Sensitivity Color change | Sensitivity Pit | Resolution Color change | Resolution Pit | Contrast ratio Color change | Contrast ratio Pit |
|---|---|---|---|---|---|---|
| 14-13-22 | ○ | ○ | ⊚ | ○ | ○ | ○ |
| 14-13-23 | ⊚ | ⊚ | ⊚ | ⊚ | ⊚ | ⊚ |
| 14-13-24 | ⊚ | ⊚ | ○ | ⊚ | ⊚ | ⊚ |
| 14-13-25 | ⊚ | ⊚ | ○ | ○ | ⊚ | ⊚ |

TABLE 14-5

| Sample No. | Film thickness of layer containing DA compound (Å) | Film thickness of layer containing croconic methine dye (Å) |
|---|---|---|
| 14-14-1 | 100 | 100 |
| 14-14-2 | " | 200 |
| 14-14-3 | " | 1000 |
| 14-14-4 | " | 3000 |
| 14-14-5 | " | 6000 |
| 14-14-6 | 200 | 100 |
| 14-14-7 | " | 200 |
| 14-14-8 | " | 1000 |
| 14-14-9 | " | 3000 |
| 14-14-10 | " | 6000 |
| 14-14-11 | 1000 | 100 |
| 14-14-12 | " | 200 |
| 14-14-13 | " | 1000 |
| 14-14-14 | 1000 | 3000 |
| 14-14-15 | " | 6000 |
| 14-14-16 | 3000 | 100 |
| 14-14-17 | " | 200 |
| 14-14-18 | " | 1000 |
| 14-14-19 | " | 3000 |
| 14-14-20 | " | 6000 |
| 14-14-21 | 6000 | 100 |
| 14-14-22 | " | 200 |
| 14-14-23 | " | 1000 |
| 14-14-24 | " | 3000 |
| 14-14-25 | " | 6000 |

TABLE 14-6

| Sample No. | Sensitivity Color change | Sensitivity Pit | Resolution Color change | Resolution Pit | Contrast ratio Color change | Contrast ratio Pit |
|---|---|---|---|---|---|---|
| 14-14-1 | ⊚ | × | ⊚ | × | × | × |
| 14-14-2 | ⊚ | × | ⊚ | × | × | × |
| 14-14-3 | ⊚ | ⊚ | ⊚ | ⊚ | × | ⊚ |
| 14-14-4 | ⊚ | ⊚ | ⊚ | ⊚ | × | ⊚ |
| 14-14-5 | ⊚ | ⊚ | ⊚ | ⊚ | × | ⊚ |
| 14-14-6 | ⊚ | × | ⊚ | × | ○ | × |
| 14-14-7 | ⊚ | × | ⊚ | × | ○ | × |
| 14-14-8 | ⊚ | ⊚ | ⊚ | ⊚ | ○ | ⊚ |
| 14-14-9 | ⊚ | ⊚ | ⊚ | ⊚ | ○ | ⊚ |

TABLE 14-6 - CONTINUED

| Sample No. | Sensitivity | | Resolution | | Contrast ratio | |
|---|---|---|---|---|---|---|
| | Color change | Pit | Color change | Pit | Color change | Pit |
| 14-14-10 | ◉ | ◉ | ◉ | ◉ | ○ | ◉ |
| 14-14-11 | ○ | × | ◉ | × | ○ | × |
| 14-14-12 | ◉ | × | ◉ | × | ◉ | × |
| 14-14-13 | ◉ | ◉ | ◉ | ◉ | ◉ | ◉ |
| 14-14-14 | ◉ | ◉ | ◉ | ◉ | ◉ | ◉ |
| 14-14-15 | ◉ | ◉ | ◉ | ◉ | ◉ | ◉ |
| 14-14-16 | × | × | × | × | × | × |
| 14-14-17 | ○ | × | ◉ | × | ○ | × |
| 14-14-18 | ◉ | ◉ | ◉ | ◉ | ◉ | ◉ |
| 14-14-19 | ◉ | ◉ | ◉ | ◉ | ◉ | ◉ |
| 14-14-20 | ◉ | ◉ | ◉ | ◉ | ◉ | ◉ |
| 14-14-21 | × | × | × | × | × | × |
| 14-14-22 | × | × | × | × | × | × |
| 14-14-23 | ○ | ◉ | ◉ | ◉ | ◉ | ◉ |
| 14-14-24 | ◉ | ◉ | ◉ | ◉ | ◉ | ◉ |
| 14-14-25 | ◉ | ◉ | ◉ | ◉ | ◉ | ◉ |

EXAMPLE 14-15 AND 14-16

According to the same procedure as in Example 14-14 except for using the croconic methine dyes represented by the formulae 4-1-6 and 4-1-14, respectively, in place of the croconic methine dye represented by the formula 4-1-25 for the coating solution A, experiments were conducted.

For Example 14-15, 25 kinds of optical recording media samples No. 14-15-1 to 14-15-25 as shown in Table 14-7 were employed, and for Example 14-16, 25 kinds of optical recording media of samples No. 14-16-1 to 14-16-25 as shown in Table 14-9 were employed.

The results are shown respectively in Table 14-8 and 14-10.

TABLE 14-7

| Sample No. | Film thickness of layer containing DA compound (Å) | Film thickness of layer containing croconic methine dye (Å) |
|---|---|---|
| 14-15-1 | 100 | 100 |
| 14-15-2 | " | 200 |
| 14-15-3 | " | 1000 |
| 14-15-4 | " | 3000 |
| 14-15-5 | " | 6000 |
| 14-15-6 | 200 | 100 |
| 14-15-7 | " | 200 |
| 14-15-8 | " | 1000 |
| 14-15-9 | " | 3000 |
| 14-15-10 | " | 6000 |
| 14-15-11 | 1000 | 100 |
| 14-15-12 | " | 200 |
| 14-15-13 | " | 1000 |
| 14-15-14 | 1000 | 3000 |
| 14-15-15 | " | 6000 |
| 14-15-16 | 3000 | 100 |
| 14-15-17 | " | 200 |
| 14-15-18 | " | 1000 |
| 14-15-19 | " | 3000 |
| 14-15-20 | " | 6000 |
| 14-15-21 | 6000 | 100 |
| 14-15-22 | " | 200 |
| 14-15-23 | " | 1000 |
| 14-15-24 | " | 3000 |
| 14-15-25 | " | 6000 |

TABLE 14-8

| Sample No. | Sensitivity | | Resolution | | Contrast ratio | |
|---|---|---|---|---|---|---|
| | Color change | Pit | Color change | Pit | Color change | Pit |
| 14-15-1 | ◉ | ○ | ◉ | ○ | × | × |
| 14-15-2 | ◉ | ◉ | ◉ | ◉ | × | ○ |
| 14-15-3 | ◉ | ◉ | ◉ | ◉ | × | ◉ |
| 14-15-4 | ◉ | ◉ | ◉ | ◉ | × | ◉ |
| 14-15-5 | ◉ | ◉ | ◉ | ◉ | × | ◉ |
| 14-15-6 | ◉ | ○ | ◉ | ○ | × | × |
| 14-15-7 | ◉ | ◉ | ◉ | ◉ | × | ○ |
| 14-15-8 | ◉ | ◉ | ◉ | ◉ | ○ | ◉ |
| 14-15-9 | ◉ | ◉ | ◉ | ◉ | ○ | ◉ |
| 14-15-10 | ◉ | ◉ | ◉ | ◉ | ○ | ◉ |
| 14-15-11 | × | ○ | × | ○ | × | × |
| 14-15-12 | ○ | ◉ | ◉ | ◉ | ○ | ○ |
| 14-15-13 | ◉ | ◉ | ◉ | ◉ | ◉ | ◉ |
| 14-15-14 | ◉ | ◉ | ◉ | ◉ | ◉ | ◉ |
| 14-15-15 | ◉ | ◉ | ◉ | ◉ | ◉ | ◉ |
| 14-15-16 | × | ○ | × | ○ | × | × |
| 14-15-17 | × | ◉ | × | ◉ | × | ○ |
| 14-15-18 | ◉ | ◉ | ◉ | ◉ | ◉ | ◉ |

TABLE 14-8-continued

| Sample No. | Sensitivity Color change | Sensitivity Pit | Resolution Color change | Resolution Pit | Contrast ratio Color change | Contrast ratio Pit |
|---|---|---|---|---|---|---|
| 14-15-19 | ◉ | ◉ | ◉ | ◉ | ◉ | ◉ |
| 14-15-20 | ◉ | ◉ | ◉ | ◉ | ◉ | ◉ |
| 14-15-21 | × | ○ | × | ○ | × | × |
| 14-15-22 | × | ◉ | × | ◉ | × | ○ |
| 14-15-23 | ○ | ◉ | ◉ | ◉ | ◉ | ◉ |
| 14-15-24 | ◉ | ◉ | ◉ | ◉ | ◉ | ◉ |
| 14-15-25 | ◉ | ◉ | ◉ | ○ | ◉ | ◉ |

TABLE 14-9

| Sample No. | Film thickness of DA compound (Å) | Film thickness of layer containing (Å) |
|---|---|---|
| 14-16-1 | 100 | 100 |
| 14-16-2 | " | 200 |
| 14-16-3 | " | 1000 |
| 14-16-4 | " | 3000 |
| 14-16-5 | " | 6000 |
| 14-16-6 | 200 | 100 |
| 14-16-7 | " | 200 |
| 14-16-8 | " | 1000 |
| 14-16-9 | " | 3000 |
| 14-16-10 | " | 6000 |
| 14-16-11 | 1000 | 100 |
| 14-16-12 | " | 200 |
| 14-16-13 | " | 1000 |
| 14-16-14 | 1000 | 3000 |
| 14-16-15 | " | 6000 |
| 14-16-16 | 3000 | 100 |
| 14-16-17 | " | 200 |
| 14-16-18 | " | 1000 |
| 14-16-19 | " | 3000 |
| 14-16-20 | " | 6000 |
| 14-16-21 | 6000 | 100 |
| 14-16-22 | " | 200 |
| 14-16-23 | " | 1000 |
| 14-16-24 | " | 3000 |
| 14-16-25 | " | 6000 |

TABLE 14-10

| Sample No. | Sensitivity Color change | Sensitivity Pit | Resolution Color change | Resolution Pit | Contrast ratio Color change | Contrast ratio Pit |
|---|---|---|---|---|---|---|
| 14-16-1 | ◉ | ◉ | ◉ | ◉ | × | × |
| 14-16-2 | ◉ | ◉ | ◉ | ◉ | × | ○ |
| 14-16-3 | ◉ | ◉ | ◉ | ◉ | × | ◉ |
| 14-16-4 | ◉ | ◉ | ◉ | ◉ | × | ◉ |
| 14-16-5 | ◉ | ◉ | ◉ | ◉ | ○ | ◉ |
| 14-16-6 | ◉ | ◉ | ◉ | ◉ | × | × |
| 14-16-7 | ◉ | ◉ | ◉ | ◉ | × | ○ |
| 14-16-8 | ◉ | ◉ | ◉ | ◉ | ○ | ◉ |
| 14-16-9 | ◉ | ◉ | ◉ | ◉ | ○ | ◉ |
| 14-16-10 | ◉ | ◉ | ◉ | ◉ | ○ | ◉ |
| 14-16-11 | × | ◉ | × | ◉ | × | × |
| 14-16-12 | ◉ | ◉ | ◉ | ◉ | ◉ | ○ |
| 14-16-13 | ◉ | ◉ | ◉ | ◉ | ◉ | ◉ |
| 14-16-14 | ◉ | ◉ | ◉ | ◉ | ◉ | ◉ |
| 14-16-15 | ◉ | ◉ | ◉ | ◉ | ◉ | ◉ |
| 14-16-16 | × | ◉ | × | ◉ | × | × |
| 14-16-17 | × | ◉ | × | ◉ | × | ○ |
| 14-16-18 | ◉ | ◉ | ◉ | ◉ | ◉ | ◉ |
| 14-16-19 | ◉ | ◉ | ◉ | ◉ | ◉ | ◉ |
| 14-16-20 | ◉ | ◉ | ◉ | ○ | ◉ | ○ |
| 14-16-21 | × | ◉ | × | ◉ | × | × |
| 14-16-22 | × | ◉ | × | ◉ | × | ○ |
| 14-16-23 | ◉ | ◉ | ○ | ◉ | ◉ | ◉ |
| 14-16-24 | ◉ | ◉ | ○ | ○ | ◉ | ○ |
| 14-16-25 | ◉ | ◉ | ○ | ○ | ◉ | ◉ |

EXAMPLES 15-1 TO 15-7

Experiments of Example 13-1 to 13-7 were repeated by use of 15 parts by weight of the polymethine compound represented by the formula 5-1-2 in place of the diene compound used in Examples 13-1 to 13-7.

The seven results are shown in Table 15-1.

TABLE 15-1

| Optical recording medium | Film thickness | Sensitivity Color change | Sensitivity Pit | Resolution Color change | Resolution Pit | Contrast ratio Color change | Contrast ratio Pit |
|---|---|---|---|---|---|---|---|
| Example 15-1 | 500 Å | × | ● | × | ● | × | ● |
| | 1000 Å | × | ● | × | ● | × | ● |
| | 2000 Å | ○ | ● | ○ | ● | × | ● |

TABLE 15-1-continued

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 15-2 | 500 Å | x | ● | ● | ● | x | ● |
| | 1000 Å | ○ | ● | ● | ● | ○ | ● |
| | 2000 Å | ○ | ● | ● | ● | ○ | ● |
| Example 15-3 | 500 Å | ○ | ● | ○ | ● | x | ○ |
| | 1000 Å | ● | ● | ● | ● | ○ | ● |
| | 2000 Å | ● | ● | ● | ● | ● | ● |
| Example 15-4 | 500 Å | ● | ● | ● | ● | ○ | ○ |
| | 1000 Å | ● | ● | ● | ● | ● | ● |
| | 2000 Å | ● | ● | ● | ● | ● | ● |
| Example 15-5 | 500 Å | ● | ● | ● | ● | ● | x |
| | 1000 Å | ● | ● | ● | ● | ● | ● |
| | 2000 Å | ● | ● | ● | ● | ● | ● |
| Example 15-6 | 500 Å | ○ | x | ○ | x | ○ | x |
| | 1000 Å | ○ | ○ | ○ | ○ | ○ | ○ |
| | 2000 Å | ○ | ○ | ○ | ○ | ○ | ○ |
| Example 15-7 | 500 Å | x | x | x | x | x | x |
| | 1000 Å | x | x | x | x | x | x |
| | 2000 Å | ○ | ○ | ○ | ○ | ○ | ○ |

EXAMPLES 15-8

Experiments were conducted according to the same procedure as in Example 13-8 except for using the polymethine compound represented by the formula 4-1-25 in place of the diene compound of Example 13-8.

EXAMPLES 15-9 TO 15-13

According to the same procedure as in Example 15-8 except for changing the polymethine compound in Example 15-8 to the polymethine compounds represented by the formulae 5-1-4, 5-1-9, 5-1-19, 5-1-19 and 5-1-36, respectively, experiments were conducted.

The results of Examples 15-8 to 15-13 are shown in Table 15-2.

TABLE 15-2

| Optical recording medium | Film thickness | Sensitivity | | Resolution | | Contrast ratio | |
|---|---|---|---|---|---|---|---|
| | | Color change | Pit | Color change | Pit | Color change | Pit |
| Example 15-8 | 500 Å | ● | ● | ● | ● | ○ | ● |
| | 1000 Å | ● | ● | ● | ● | ● | ● |

TABLE 15-2-Continued

| Optical recording medium | Film thickness | Sensitivity | | Resolution | | Contrast ratio | |
|---|---|---|---|---|---|---|---|
| | | Color change | Pit | Color change | Pit | Color change | Pit |
| | 2000 Å | ● | ● | ● | ● | ● | ● |
| Example 15-9 | 500 Å | ● | ● | ● | ● | ○ | ● |
| | 1000 Å | ● | ● | ● | ● | ● | ● |
| | 2000 Å | ● | ● | ● | ● | ● | ● |
| Example 15-10 | 500 Å | ● | ● | ● | ● | ○ | ○ |
| | 1000 Å | ● | ● | ● | ● | ● | ● |
| | 2000 Å | ● | ● | ● | ● | ● | ● |
| Example 15-11 | 500 Å | ○ | ○ | ○ | ○ | ○ | ○ |
| | 1000 Å | ○ | ○ | ○ | ○ | ○ | ○ |
| | 2000 Å | ○ | ○ | ○ | ○ | ○ | ○ |
| Example 15-12 | 500 Å | ● | ● | ● | ● | ○ | ○ |
| | 1000 Å | ● | ● | ● | ● | ● | ● |
| | 2000 Å | ● | ● | ● | ● | ● | ● |
| Example 15-13 | 500 Å | ● | ● | ● | ● | ○ | ○ |
| | 1000 Å | ● | ● | ● | ● | ● | ● |
| | 2000 Å | ● | ● | ● | ● | ● | ● |

EXAMPLES 15-14

The experiments as in Example 11-7 were conducted except for changing the azulenium salt compound in Example 11-7 to the polymethine compound represented by the formula 5-1-7.

However, the experiments were conducted for the 25 kinds of the optical recording media of samples 15-14-1 to 15-14-25 obtained by varying the film thickness of the layer containing the polymethine compound and that of DA compound variously as shown in Table 15-3. Evaluation results are shown in Table 15-3.

EXAMPLE 15-15

According to the same procedure as in Example 15-14 except for using a diacetylene derivative compound represented by $C_8H_{17}-C\equiv C-C\equiv C-C_2H_4-COOH$ in place of the diacetylene derivative compound represented by $C_{12}H_{25}-C\equiv C-C\equiv C-C_8H_{16}-COOH$, 25 kinds of recording media of samples 15-15-1 to 15-15-25 as shown in Table 15-5 were obtained and the same experiments were conducted.

The results ae shown in Table 15-6.

TABLE 15-3

| Sample No. | Film thickness of layer containing DA compound (Å) | Film thickness of layer containing polymethyline compound (Å) |
|---|---|---|
| 15-14-1 | 100 | 100 |
| 15-14-2 | " | 200 |
| 15-14-3 | " | 1000 |
| 15-14-4 | " | 3000 |
| 15-14-5 | " | 6000 |
| 15-14-6 | 200 | 100 |
| 15-14-7 | " | 200 |
| 15-14-8 | " | 1000 |
| 15-14-9 | " | 3000 |
| 15-14-10 | " | 6000 |
| 15-14-11 | 1000 | 100 |
| 15-14-12 | " | 200 |
| 15-14-13 | " | 1000 |
| 15-14-14 | 1000 | 3000 |
| 15-14-15 | " | 6000 |
| 15-14-16 | 3000 | 100 |
| 15-14-17 | " | 200 |
| 15-14-18 | " | 1000 |
| 15-14-19 | " | 3000 |
| 15-14-20 | " | 6000 |
| 15-14-21 | 6000 | 100 |
| 15-14-22 | " | 200 |
| 15-14-23 | " | 1000 |
| 15-14-24 | " | 3000 |
| 15-14-25 | " | 6000 |

TABLE 15-4

| Sample No. | Sensitivity | | Resolution | | Contrast ratio | |
|---|---|---|---|---|---|---|
| | Color change | Pit | Color change | Pit | Color change | Pit |
| 15-14-1 | ○ | × | ○ | × | × | × |
| 15-14-2 | ○ | ○ | ○ | ○ | × | × |
| 15-14-3 | ◉ | ◉ | ◉ | ◉ | ○ | ◉ |
| 15-14-4 | ◉ | × | ◉ | × | × | × |
| 15-14-5 | ◉ | × | ◉ | × | × | × |
| 15-14-6 | ○ | × | ○ | × | × | × |
| 15-14-7 | ◉ | ◉ | ◉ | ◉ | ○ | ○ |
| 15-14-8 | ◉ | ◉ | ◉ | ◉ | ○ | ◉ |
| 15-14-9 | ◉ | ○ | ◉ | ○ | ○ | ◉ |
| 15-14-10 | ◉ | ○ | ◉ | ○ | ○ | ◉ |
| 15-14-11 | ○ | × | ○ | × | ○ | × |
| 15-14-12 | ◉ | ◉ | ◉ | ◉ | ◉ | ◉ |
| 15-14-13 | ◉ | ◉ | ◉ | ◉ | ◉ | ◉ |
| 15-14-14 | ◉ | ◉ | ◉ | ◉ | ◉ | ◉ |
| 15-14-15 | ◉ | ◉ | ◉ | ◉ | ◉ | ◉ |
| 15-14-16 | × | × | × | × | × | × |
| 15-14-17 | ○ | × | ◉ | × | ◉ | × |
| 15-14-18 | ◉ | ◉ | ◉ | ◉ | ◉ | ◉ |
| 15-14-19 | ◉ | ◉ | ◉ | ◉ | ◉ | ◉ |
| 15-14-20 | ◉ | ◉ | ◉ | ◉ | ◉ | ◉ |
| 15-14-21 | × | × | × | × | × | × |
| 15-14-22 | × | × | × | × | × | × |
| 15-14-23 | ◉ | ◉ | ◉ | ◉ | ◉ | ◉ |
| 15-14-24 | ◉ | ◉ | ◉ | ◉ | ◉ | ◉ |
| 15-14-25 | ◉ | ◉ | ◉ | ◉ | ◉ | ◉ |

TABLE 15-5

| Sample No. | Film thickness of layer containing DA compound (Å) | Film thickness of layer containing polymethyline compound (Å) |
|---|---|---|
| 15-15-1 | 100 | 100 |
| 15-15-2 | " | 200 |
| 15-15-3 | " | 1000 |
| 15-15-4 | " | 3000 |
| 15-15-5 | " | 6000 |
| 15-15-6 | 200 | 100 |
| 15-15-7 | " | 200 |
| 15-15-8 | " | 1000 |
| 15-15-9 | " | 3000 |
| 15-15-10 | " | 6000 |
| 15-15-11 | 1000 | 100 |
| 15-15-12 | " | 200 |
| 15-15-13 | " | 1000 |
| 15-15-14 | 1000 | 3000 |
| 15-15-15 | " | 6000 |
| 15-15-16 | 3000 | 100 |
| 15-15-17 | " | 200 |
| 15-15-18 | " | 1000 |
| 15-15-19 | " | 3000 |
| 15-15-20 | " | 6000 |
| 15-15-21 | 6000 | 100 |
| 15-15-22 | " | 200 |
| 15-15-23 | " | 1000 |
| 15-15-24 | " | 3000 |
| 15-15-25 | " | 6000 |

TABLE 15-6

| Sample No. | Sensitivity | | Resolution | | Contrast ratio | |
|---|---|---|---|---|---|---|
| | Color change | Pit | Color change | Pit | Color change | Pit |
| 15-15-1 | × | × | × | × | × | × |
| 15-15-2 | ○ | ○ | ○ | ○ | × | × |
| 15-15-3 | ◉ | ◉ | ◉ | ◉ | ○ | ◉ |

TABLE 15-6 CONTINUED

| | Sensitivity | | Resolution | | Contrast ratio | |
|---|---|---|---|---|---|---|
| | Color change | Pit | Color change | Pit | Color change | Pit |
| 15-15-4 | ◉ | × | ◉ | × | × | × |
| 15-15-5 | ◉ | × | ◉ | × | × | × |
| 15-15-6 | ◉ | × | ◉ | × | × | × |
| 15-15-7 | ◉ | ◉ | ◉ | ◉ | ○ | ○ |
| 15-15-8 | ◉ | ◉ | ◉ | ◉ | ◉ | ◉ |
| 15-15-9 | ◉ | ○ | ◉ | ○ | ◉ | ○ |
| 15-15-10 | ◉ | × | ◉ | ○ | ○ | ◉ |
| 15-15-11 | ○ | × | ○ | × | ○ | × |
| 15-15-12 | ◉ | ◉ | ◉ | ◉ | ◉ | ◉ |
| 15-15-13 | ◉ | ◉ | ◉ | ◉ | ◉ | ◉ |
| 15-15-14 | ◉ | ◉ | ◉ | ◉ | ◉ | ◉ |
| 15-15-15 | ◉ | ◉ | ◉ | ◉ | ◉ | ◉ |
| 15-15-16 | × | × | × | × | × | × |
| 15-15-17 | ○ | × | ○ | × | ○ | × |
| 15-15-18 | ◉ | ◉ | ◉ | ◉ | ◉ | ◉ |
| 15-15-19 | ◉ | ◉ | ◉ | ◉ | ◉ | ◉ |
| 15-15-20 | ◉ | ◉ | ◉ | ◉ | ◉ | ◉ |
| 15-15-21 | × | × | × | × | × | × |
| 15-15-22 | × | × | × | × | × | × |
| 15-15-23 | ◉ | ◉ | ◉ | ◉ | ◉ | ◉ |
| 15-15-24 | ◉ | ◉ | ◉ | ◉ | ◉ | ◉ |
| 15-15-25 | ◉ | ◉ | ◉ | ◉ | ◉ | ◉ |

EXAMPLES 15-16 AND 15-17

According to the same procedure as in Example 15-14 except for using the polymethine compounds represented by the formulae 5-1-11 and 6-1-22, respectively, in place of the polymethine compound represented by the formula 5-1-7 for the coating solution A, experiments were conducted to prepare 25 kinds of samples No. 15-16-1 to 15-16-25 as shown in Table 15-7 and 25 kinds of samples No. 15-17-1 to 15-17-25 as shown in Table 15-9.

On each of the optical recording media thus obtained, first UV-rays of 254 nm were irradiated uniformly and sufficiently to convert the recording layer to a blue film.

Next, on each recording medium having the recording layer converted to a blue film, optical recording was practiced similarly as described in Example 15-1 and evaluated. The evaluation results are shown in Table 15-8 and Table 15-10.

TABLE 15-7

| Sample No. | Film thickness of layer containing DA compound (Å) | Film thickness of layer containing polymethyline compound (Å) |
|---|---|---|
| 15-16-1 | 100 | 100 |
| 15-16-2 | " | 200 |
| 15-16-3 | " | 1000 |
| 15-16-4 | " | 3000 |
| 15-16-5 | " | 6000 |
| 15-16-6 | 200 | 100 |
| 15-16-7 | " | 200 |
| 15-16-8 | " | 1000 |
| 15-16-9 | " | 3000 |
| 15-16-10 | " | 6000 |
| 15-16-11 | 1000 | 100 |
| 15-16-12 | " | 200 |
| 15-16-13 | " | 1000 |
| 15-16-14 | 1000 | 3000 |
| 15-16-15 | " | 6000 |
| 15-16-16 | 3000 | 100 |
| 15-16-17 | " | 200 |
| 15-16-18 | " | 1000 |
| 15-16-19 | " | 3000 |
| 15-16-20 | " | 6000 |
| 15-16-21 | 6000 | 100 |
| 15-16-22 | " | 200 |
| 15-16-23 | " | 1000 |
| 15-16-24 | " | 3000 |
| 15-16-25 | " | 6000 |

TABLE 15-8

| Sample No. | Sensitivity | | Resolution | | Contrast ratio | |
|---|---|---|---|---|---|---|
| | Color change | Pit | Color change | Pit | Color change | Pit |
| 15-16-1 | ◉ | × | ◉ | × | × | × |
| 15-16-2 | ◉ | ◉ | ◉ | ◉ | × | × |
| 15-16-3 | ◉ | ◉ | ◉ | ◉ | × | ◉ |
| 15-16-4 | ◉ | × | ◉ | × | × | × |
| 15-16-5 | ◉ | × | ◉ | × | × | × |
| 15-16-6 | ◉ | × | ○ | × | × | × |
| 15-16-7 | ◉ | ○ | ◉ | ○ | ○ | ○ |
| 15-16-8 | ◉ | ◉ | ◉ | ◉ | ○ | ◉ |
| 15-16-9 | ◉ | ○ | ◉ | ○ | ○ | ◉ |
| 15-16-10 | ◉ | × | ◉ | ○ | ○ | ◉ |
| 15-16-11 | ○ | × | ○ | × | ○ | × |
| 15-16-12 | ◉ | ◉ | ◉ | ◉ | ◉ | ◉ |
| 15-16-13 | ◉ | ◉ | ◉ | ◉ | ◉ | ◉ |

TABLE 15-8-continued

| Sample No. | Sensitivity Color change | Pit | Resolution Color change | Pit | Contrast ratio Color change | Pit |
|---|---|---|---|---|---|---|
| 15-16-14 | ⊚ | ⊚ | ⊚ | ⊚ | ⊚ | ⊚ |
| 15-16-15 | ⊚ | ⊚ | ⊚ | ⊚ | ⊚ | ⊚ |
| 15-16-16 | × | × | × | × | × | × |
| 15-16-17 | ○ | × | ⊚ | × | ⊚ | × |
| 15-16-18 | ⊚ | ⊚ | ⊚ | ⊚ | ⊚ | ⊚ |
| 15-16-19 | ⊚ | ⊚ | ⊚ | ⊚ | ⊚ | ⊚ |
| 15-16-20 | ⊚ | ⊚ | ⊚ | ⊚ | ⊚ | ⊚ |
| 15-16-21 | × | × | × | × | × | × |
| 15-16-22 | × | × | × | × | × | × |
| 15-16-23 | ⊚ | ⊚ | ⊚ | ⊚ | ⊚ | ⊚ |
| 15-16-24 | ⊚ | ⊚ | ⊚ | ⊚ | ⊚ | ⊚ |
| 15-16-25 | ⊚ | ⊚ | ⊚ | ⊚ | ⊚ | ⊚ |

TABLE 15-9

| Sample No. | Film thickness of layer containing DA compound (Å) | Film thickness of layer containing polymethyline compound (Å) |
|---|---|---|
| 15-17-1 | 100 | 100 |
| 15-17-2 | " | 200 |
| 15-17-3 | " | 1000 |
| 15-17-4 | " | 3000 |
| 15-17-5 | " | 6000 |
| 15-17-6 | 200 | 100 |
| 15-17-7 | " | 200 |
| 15-17-8 | " | 1000 |
| 15-17-9 | " | 3000 |
| 15-17-10 | " | 6000 |
| 15-17-11 | 1000 | 100 |
| 15-17-12 | " | 200 |
| 15-17-13 | " | 1000 |
| 15-17-14 | 1000 | 3000 |
| 15-17-15 | " | 6000 |
| 15-17-16 | 3000 | 100 |
| 15-17-17 | " | 200 |
| 15-17-18 | " | 1000 |
| 15-17-19 | " | 3000 |
| 15-17-20 | " | 6000 |
| 15-17-21 | 6000 | 100 |
| 15-17-22 | " | 200 |
| 15-17-23 | " | 1000 |
| 15-17-24 | " | 3000 |
| 15-17-25 | " | 6000 |

TABLE 15-10

| Sample No. | Sensitivity Color change | Pit | Resolution Color change | Pit | Contrast ratio Color change | Pit |
|---|---|---|---|---|---|---|
| 15-17-1 | ⊚ | × | ⊚ | × | × | × |
| 15-17-2 | ⊚ | ⊚ | ⊚ | ⊚ | × | × |
| 15-17-3 | ⊚ | ● | ⊚ | ⊚ | × | ⊚ |
| 15-17-4 | ⊚ | × | ⊚ | × | × | × |
| 15-17-5 | ⊚ | × | ⊚ | × | × | × |
| 15-17-6 | ⊚ | × | ⊚ | × | × | × |
| 15-17-7 | ⊚ | ⊚ | ⊚ | ⊚ | ○ | ○ |
| 15-17-8 | ⊚ | ⊚ | ⊚ | ⊚ | ○ | ⊚ |
| 15-17-9 | ⊚ | ○ | ⊚ | ○ | ○ | ⊚ |
| 15-17-10 | ⊚ | × | ⊚ | ○ | ○ | ⊚ |
| 15-17-11 | ○ | × | ○ | × | ○ | × |
| 15-17-12 | ⊚ | ⊚ | ⊚ | ⊚ | ⊚ | ⊚ |
| 15-17-13 | ⊚ | ⊚ | ⊚ | ⊚ | ⊚ | ⊚ |
| 15-17-14 | ⊚ | ⊚ | ⊚ | ⊚ | ⊚ | ⊚ |
| 15-17-15 | ⊚ | ⊚ | ⊚ | ⊚ | ⊚ | ⊚ |
| 15-17-16 | × | × | × | × | × | × |
| 15-17-17 | ○ | × | ○ | × | ○ | × |
| 15-17-18 | ⊚ | ⊚ | ⊚ | ⊚ | ⊚ | ⊚ |
| 15-17-19 | ⊚ | ⊚ | ⊚ | ⊚ | ⊚ | ⊚ |
| 15-17-20 | ⊚ | ⊚ | ⊚ | ⊚ | ⊚ | ⊚ |
| 15-17-21 | × | × | × | × | × | × |
| 15-17-22 | × | × | × | × | × | × |
| 15-17-23 | ⊚ | ⊚ | ⊚ | ⊚ | ⊚ | ⊚ |
| 15-17-24 | ⊚ | ⊚ | ⊚ | ⊚ | ⊚ | ⊚ |
| 15-17-25 | ⊚ | ⊚ | ⊚ | ⊚ | ⊚ | ⊚ |

EXAMPLE 16-1

One part by weight of fine crystalline powder of a diacetylene derivative represented by the formula $C_{12}H_{25}-C\equiv C-C\equiv C-C_8H_{16}-COOH$ and 1 part by weight of the polymethine compound represented by the above formula 5-1-14 were added to 4 parts by weight of methylene chloride, followed by thorough stirring, to prepare a coating solution.

Next, a disc substarte made of a glass (thickness 1.5 mm, diameter 200 mm) was mounted on a spinner coating machine, and the above coating solution was added in a small amount dropwise at the central portion of the disc substrate and thereafter the spinner was rotated at a predetermined rotational number for a predetermined time to effect coating, followed by drying at normal temperature, to prepare optical recording media with thicknesses of coated films after drying of 500 Å, 1000 Å, 2000 Å, respectively.

On the recording media thus obtained, first UV-rays of 254 nm were irradiated uniformly and sufficiently such that polymerization of DA compound in recording layers changes recording layers to blue films, and then recording was practiced following an input information under the recording conditions shown below.
Semiconductor laser (HLP-1500, produced by Hitachi Seisakusho)
Laser wavelength: 830 nm
Laser beam diameter: 1 μm
Laser output: 3 mW
Irradiation time of laser beam per 1 bit: 300 ns When laser beam was irradiated on the blue optical recording medium surface, the irradiated portion was changed to red color to effect recording writing. Evaluation of recording writing was practiced as follows. For the recorded density, the optical density at the recorded (red) portion was measured. For the resolution and the sensitivity, correspondence of the recorded image to the laser beam diameter was judged by microscopic observation, and very good correspondence was rated as ⊚, good correspondence as ◯, incapability of recording or inferior correspondence as X. Evaluation of the recording results is shown in Table 16-1.

EXAMPLE 16-2

On the three kinds of optical recording media prepared in Example 16-1, UV-ray of 254 nm was irradiated uniformly and sufficiently to make the recording layers blue films, followed by practice of recording writing under the conditions shown below following the input information.
Semiconductor laser (HLP-7802, produced by Hitachi Seisakusho)
Laser wavelength: 800 nm
Laser beam diameter: 1 μm
Laser output: 3 mW
Irradiation time of laser beam per 1 bit: 300 ns Evaluation of recording was practiced according to the same standards as in Example 16-1 and the evaluation results are shown in Table 16-1.

EXAMPLE 16-3 AND COMPARATIVE EXAMPLES 16-1, 16-2

Recording was practiced under the same conditions as in Example 16-1 except for changing the laser used for recording to those shown below, respectively, and the evaluation results are shown in Table 16-1.
Example 16-3: Semiconductor laser (GA-As laser (W-hetero structure), trially prepared), laser wavelength: 890 nm;
Comparative example 16-1: Semiconductor laser (Ga-As laser (W-hetero structure), trially prepared), laser wavelength: 950 nm;
Comparative example 16-2: Xenon gas laser, laser wavelength: 752 nm

EXAMPLE 16-4

On the same disc made of a glass as used in Example 16-1, first a coated film thickness of 1000 Å after drying was formed in the same manner as in Example 16-1 by use of a coating solution obtained by 1 part by weight of the polymethine compound represented by the formulas 5-1-14 in 2 parts by weight of methylene chloride. Subsequently, a coating solution by dispersing and dissolving 1 part by weight of the fine crystalline powder of the diacetylene derivative compound as used in Example 16-1 and 1 parts by weight of nitrocellulose as the the binder in 4 parts by weight of methylene chloride was applied similarly as previously on the coated film of the polymethine compound to form a coated film with a thickness after drying of 1000 Å to prepare an optical recording medium having a recording layer of the two layer separated structure. After the recording layer of the optical recording medium was converted to a blue film, recording was practiced under the same recording conditions as in Example 16-1. Evaluation of recording was performed according to the same standards as in Example 16-1 to obtain the results shown in Table 16-1.

COMPARATIVE EXAMPLE 16-3

Without use of the polymethine compound, by use of a solution obtained by dissolving 1 part by weight of the diacetylene derivative and 1 part by weight of nitrocellulose in 1 part by weight of methylene chloride, optical recording media was prepared according to the same method as in Example 16-1. On these recording media, recording was practiced under the conditions of Example 16-1, Comparative examples 16-1 and 16-2, respectively. The evaluation results are shown in Table 16-1.

TABLE 16-1

| Example No. | Thickness of recording layer | Recording condition | Sensitivity | Resolution | Image density |
|---|---|---|---|---|---|
| Example 16-1 | 500 Å | Example 16-1 | ⊚ | ⊚ | 1.5 |
| | 1000 Å | Example 16-1 | ⊚ | ⊚ | 2.6 |
| | 2000 Å | Example 16-1 | ⊚ | ⊚ | 2.5 |
| Example 16-2 | 500 Å | Example 16-2 | ◯ | ⊚ | 1.2 |
| | 1000 Å | Exmaple 16-2 | ◯ | ⊚ | 1.9 |
| | 2000 Å | Example 16-2 | ⊚ | ⊚ | 2.4 |
| Example 16-3 | 500 Å | Example 16-3 | ◯ | ⊚ | 1.3 |
| | 1000 Å | Example 16-3 | ◯ | ⊚ | 1.8 |
| | 2000 Å | Example 16-3 | ◯ | ⊚ | 2.3 |

TABLE 16-1

| Example No. | Thickness of recording layer | Recording condition | Sensitivity | Resolution | Image density |
|---|---|---|---|---|---|
| Comparative example 16-1 | 500 Å | Comparative example 16-1 | × | × | - |
| | 1000 Å | Comparative example 16-1 | × | × | - |
| | 2000 Å | Comparative example 16-1 | × | × | - |
| Comparative example 16-2 | 500 Å | Comparative example 16-2 | × | × | - |
| | 1000 Å | Comparative example 16-2 | × | × | - |
| | 2000 Å | Comparative example 16-2 | × | × | - |
| Example 16-4 | 1000 Å | Example 16-1 | ◎ | ◎ | 2.4 |
| Comparative example 16-3 | 1000 Å | Example 16-1 | × | × | - |
| | 1000 Å | Comparative example 16-1 | × | × | - |
| | 1000 Å | Comparative example 16-2 | × | × | - |

COMPARATIVE EXAMPLE 16-4

Without use of the diacetylene derivative, by use of a solution obtained by dissolving 1 part by weight of the polymethine compound and 1 part by weight of nitrocellulose in 1 part by weight of methylene chloride, as the coating solution, an optical recording medium with a thickness of the recording layer of 1000 Å was prepared according to the same method as in Example 16-1.

On this optical recording medium, without practicing irradiation of UV-rays, recording by formation of pits was practiced by irradiating a semiconductor laser beam directly following the input information at the same output as in Example 16-1 at the predetermined position of the optical recording medium surface with the wavelength and the irradiation time being changed variously (irradiation time 500 ns-5 μs/bit). As the result, when this optical recording medium was observed by a microscope, it was found that an irradiation time of 4 μs or longer is required for formation of one distinct pit.

EXAMPLE 16-5 according to the same procedure as in Example 16-1 except for using a diacetylene derivative compound represented by $C_8H_{17}$—C≡C—C≡C—$C_2H_4$—COOH in place of the diacetylene derivative compound represented by $C_{12}H_{25}$—C≡C—C≡C—$C_8H_{16}$—COOH, optical recording media was prepared. Recording was practiced on the recording media under the same recording conditions as in Example 16-1. The evaluation results are shown in Table 16-2.

EXAMPLE 16-6 TO 16-10

According to the same procedure as in Example 16-1 except for using the polymethine compounds repesented by the formulae 5-1-1, 5-1-5, 5-1-18 and 5-1-26, respectively, in place of the polymethine compound represented by the formula 5-1-14, optical recording media was prepared. On each of these recording media, recording was practiced under the same conditions as in Example 16-1. The evaluation results are shown in Table 16-2.

TABLE 16-2

| Optical recording medium | Film thickness | Sensitivity | Resolution | Image density |
|---|---|---|---|---|
| Example 16-5 | 500 Å | ◎ | ◎ | 1.4 |
| | 1000 Å | ◎ | ◎ | 2.0 |
| | 2000 Å | ◎ | ◎ | 2.4 |
| Example 16-6 | 500 Å | ◎ | ○ | 1.4 |
| | 1000 Å | ◎ | ○ | 2.1 |
| | 2000 Å | ◎ | ○ | 2.6 |
| Example 16-7 | 500 Å | ◎ | ◎ | 1.5 |
| | 1000 Å | ◎ | ◎ | 2.0 |
| | 2000 Å | ◎ | ◎ | 2.5 |
| Example 16-8 | 500 Å | ○ | ◎ | 1.5 |
| | 1000 Å | ○ | ◎ | 2.6 |
| | 2000 Å | ○ | ◎ | 2.6 |
| Example 16-9 | 500 Å | ○ | ◎ | 1.5 |
| | 1000 Å | ○ | ◎ | 2.0 |
| | 2000 Å | ○ | ○ | 2.6 |

We claim:

1. An optical recording method comprising a step of irradiating with light corresponding to recording information on an optical recording medium having a recording layer containing at least one selected from the group consisting of azulenium salt compounds, pyrylium dyes, diene compounds, croconic methine dyes or polymethine compounds (hereinafter called the group B) and a diacetylene compound to thereby form a pit on said recording layer.

2. An optical recording method according to claim 1, wherein said diacetylene compound is represented by the formula (0):

R—C≡C—C≡C—R'  (0)

werein R and R' each represent an alkyl group, an olefinic hydrocarbon group, a phenyl, a fused polycyclic aromatic hydrocarbon group, a linear polycylic phenyl group, a carboxyl group or a metal salt or amine salt thereof, a sulfonic acid group or a metal salt or amine salt thereof, a sulfoamide group, an amide group, an amino group, an imino group, a hydroxy group, a quaternary ammonium group, an oxyamino group, a diazonium group, a guanidine group, a hydrazine group, a phosphoric acid group, a silicic acid group, an aluminic acid group, a nitrile group or a thioalcoholic group.

3. An optical recording method according to claim 1, wherein the azulenium salt compounds of said group B are represented by the formula (1):

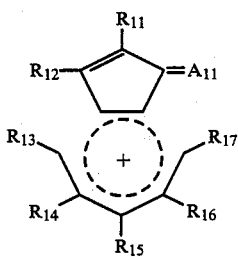
(1)

(wherein $R_{11}$–$R_{17}$ each represent a hydrogen atom, a halogen atom or a monovalent organic radical and $A_{11}$ represents a divalent organic residue bonded through a double bond.

4. An optical recording method according to claim 1, wherein the pyrylium dyes of said group B have the basic structure represented by the formula (2) shown below:

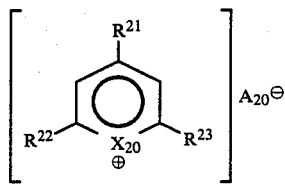
(2)

(wherein $X_{20}$ represents an oxygen atom, a sulfur atom or a selenium atom, $R^{21}$, $R^{22}$, and $R^{23}$ represent an organic radical, and $A_{20}$ represents an anion).

5. An optical recording method according to claim 1, wherein the diene compounds of said group B are represented by the formula (3-1) or (3-2) shown below:

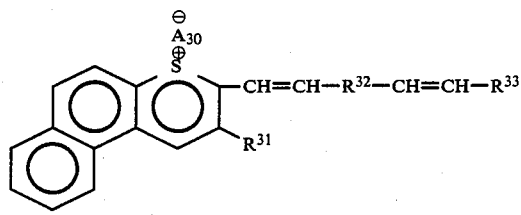
(3-1)

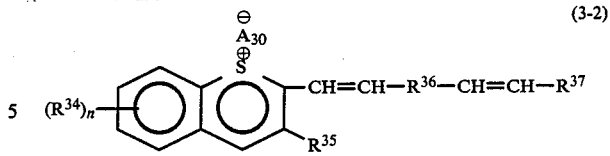
(3-2)

wherein $R^{31}$ represents an alkyl group, a phenyl group or a styryl group which is optionally substituted; $R^{32}$ and $R^{36}$ each represent an arylene group which may have a substituent for forming a conjugated double bond system together with the two —CH=CH— groups adjacent thereto; $R^{33}$ and $R^{37}$ represent a phenyl group or a naphthyl group which is optionally substituted; $R^{34}$ represents an alkoxy group; $R^{35}$ represents an alkyl group; and $A_{30}$ represents an anion radical.

6. An optical recording method according to claim 1, wherein croconic methine dyes of said group B have the basic structure represented by the formula (4) shown below:

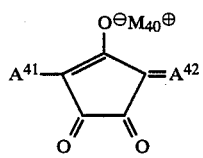
(4)

(wherein $M_{40}^{\oplus}$ represents a metal ion, $A^{41}$ and $A^{42}$ each represent a substituent containing an aromatic ring and-/or a heterocyclic ring).

7. An optical recording method according to claim 1, wherein polymethine compounds of said group B are represented by the formula (5-1) or (5-2) shown below:

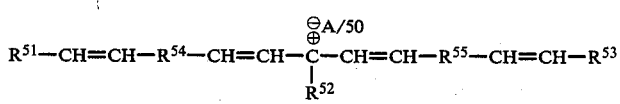

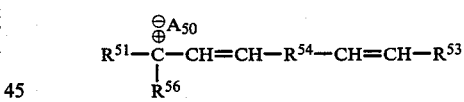
(5-2)

wherein $R^{51}$, $R^{52}$ and $R^{53}$ each independently represent an aryl group which is optionally substituted; $R^{54}$ and $R^{55}$ each represent an arylene group which may have substituent for forming a conjugated double bond system together with the two —C=CH— groups adjacent thereto; $R^{56}$ represents hydrogen or an aryl group which is optionally substituted; and $A_{50}$ represents anion radical.

8. An optical recording method according to claim 1, wherein said recording layer is formed by the Langmuir-Blodgett method.

9. An optical recording method according to claim 1, wherein said recording layer is formed by coating of the compound selected from the group B or the diacetylene derivative compound.

10. An optical recording method for forming a color change and a structural change on a recording medium comprising the steps of:
irradiating with light, controlled in a dose corresponding to recording information, onto an optical recording medium having a recording layer containing at least one selected from the group consisting of azulenium salt compounds, pyrylium dyes, diene compounds, cronconic methine dyes and polymethine compounds, hereinafter called the group B, and a diacetylene compound;

providing a dose $Q_1$ for changing the color at an exposed portion of the recording medium; and providing a dose $Q_2$ for forming a pit at an exposed portion of the recording medium, wherein $Q_1 > Q_2$.

11. An optical recording method according to claim 10, wherein said diacetylene compound is represented by the formula (0):

$$R-C\equiv C-C\equiv C-R' \qquad (0)$$

wherein R and R' each represent an alkyl group, an olefinic hydrocarbon group, phenyl, a fused polycyclic aromatic hydrocarbon group, a linear polycylic phenyl group, a carboxyl group or a metal salt or amine salt thereof, a sulfonic acid group or a metal salt or amine salt thereof, a sulfoamide group, an amide group, an amino group, an imino group, a hydroxy group, a quaternary ammonium group, an oxyamino group, a diazonium group, a guanidine group, a hydrazine group, a phosphoric acid group, a silicic acid group, an aluminic acid group, a nitrile group or a thioalcoholic group.

12. An optical recording method according to claim 10, wherein the azulenium salt compounds of said group B are represented by the formula (1):

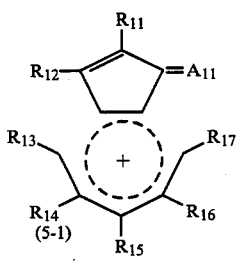

(wherein $R_{11}-R_{17}$ each represent a hydrogen atom, a halogen atom or a monovalent organic radical and $A_{11}$ represents a divalent organic residue).

13. An optical recording method according to claim 10, wherein the pyrylium dyes of said group B have the basic structure represented by the formula (2) shown below:

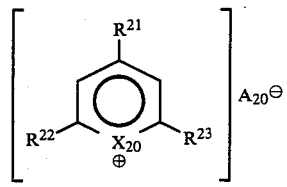

(wherein $X_{20}$ represents an oxygen atom, a sulfur atom or a selenium atom, $R^{21}$, $R^{22}$ and $R^{23}$ represent organic radical, and $A_{20}$ represents an anion).

14. An optical recording method according to claim 10, wherein the diene compounds of said group B are represented by the formula (3-1) or (3-2) shown below:

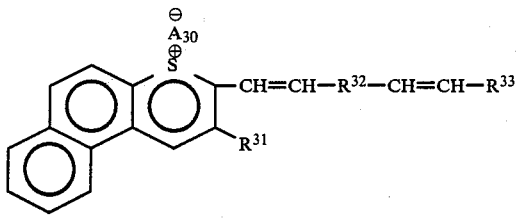

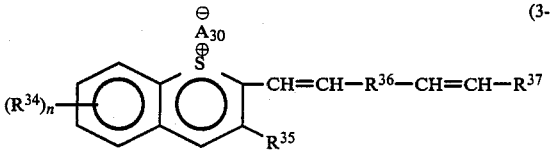

wherein $R^{31}$ represents an alkyl group, a phenyl group or a styryl group which is optionally substituted $R^{32}$ and $R^{36}$ represent an arylene group which may have a substituent for forming a conjugated double bond system together with the two —CH=CH— groups adjacent thereto; $R^{33}$ and $R^{37}$ represent a phenyl group or a naphthyl group which is optionally substituted; $R^{34}$ represents an alkoxy group; $R^{35}$ represents an alkyl group; and $A_{30}$ represents an anion radical.

15. An optical recording method according to claim 10, wherein the croconic methine dyes of said group B have a basic structure represented by the formula (4) shown below:

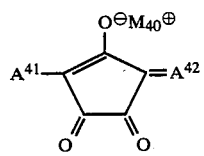

(wherein $M_{40}^{\oplus}$ represents a metal ion, $A^{41}$ and $A^{42}$ represent substituents containing an aromatic ring and-/or a heterocyclic ring).

16. An optical recording method according to claim 10, wherein polymethine compounds of said group B are represented by the formula (5-1) or (5-2) shown below:

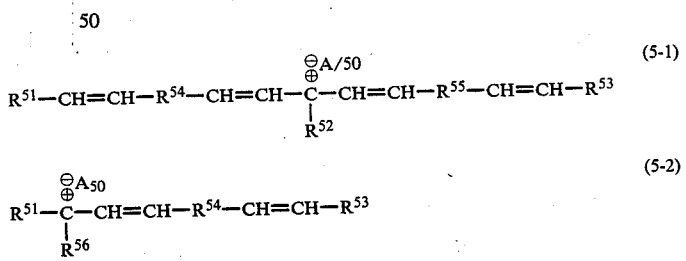

wherein $R^{51}$, $R^{52}$ and $R^{53}$ each independently represent an aryl group which is optionally substituted; $R^{54}$ and $R^{55}$ each represent an arylene group which may have a substituent for forming a conjugated double bond system together with the two —CH=CH— groups adjacent thereto; $R^{56}$ represents hydrogen or a aryl group which is optionally substituted; and A50 represents an anion radical.

17. A optical recording method according to claim 10, wherein said recording layer is formed by the Langmuir-Blodgett method.

18. An optical recording method according to claim 10, wherein said recording layer is formed by coating of the compound selected from the group B or the diacetylene derivative compound.

19. An optical recording method according claim 2, wherein said olefinic hydrocarbon group is selected from the group consisting of vinyl, vinylidene, and ethynyl, said fused polycyclic aromatic hydrocarbon group is selected from the group consisting of naphthyl, and anthranyl and said linear polycyclic phenyl group is selected from the group consisting of biphenyl and terphenyl.

20. An optical recording method according claim 11, wherein said olefinic hydrocarbon group is selected from the group consisting of vinyl, vinylidene, and ethynyl, said fused polycyclic aromatic hydrocarbon group is selected from the group consisting of naphthyl, and anthranyl, and said linear polycyclic phenyl group is selected from the group consisting of biphenyl and terphenyl.

* * * * *